US012170064B2

(12) United States Patent
Guo et al.

(10) Patent No.: US 12,170,064 B2
(45) Date of Patent: Dec. 17, 2024

(54) PIXEL CIRCUIT AND DRIVING METHOD THEREFOR, AND DISPLAY PANEL

(71) Applicant: YUNGU (GU'AN) TECHNOLOGY CO., LTD., Hebei (CN)

(72) Inventors: Enqing Guo, Langfang (CN); Cuili Gai, Langfang (CN); Kangguan Pan, Langfang (CN); Junfeng Li, Langfang (CN); Rubo Xing, Langfang (CN)

(73) Assignee: YUNGU (GU'AN) TECHNOLOGY CO., LTD., Langfang (CN)

( * ) Notice: Subject to any disclaimer, the term of this patent is extended or adjusted under 35 U.S.C. 154(b) by 0 days.

(21) Appl. No.: 18/345,369

(22) Filed: Jun. 30, 2023

(65) Prior Publication Data

US 2023/0343294 A1 Oct. 26, 2023

Related U.S. Application Data

(63) Continuation of application No. PCT/CN2022/101979, filed on Jun. 28, 2022.

(30) Foreign Application Priority Data

Jun. 30, 2021 (CN) ......................... 202110738517.0
Nov. 25, 2021 (CN) ......................... 202111415701.8
Dec. 7, 2021 (CN) ......................... 202111485817.9

(51) Int. Cl.
*G09G 3/3233* (2016.01)
*G09G 3/3266* (2016.01)

(52) U.S. Cl.
CPC ......... *G09G 3/3233* (2013.01); *G09G 3/3266* (2013.01); *G09G 2300/0426* (2013.01);
(Continued)

(58) Field of Classification Search
CPC ...... G09G 3/3233; G09G 3/3208; G09G 3/32; G09G 2320/045
See application file for complete search history.

(56) References Cited

U.S. PATENT DOCUMENTS

2015/0009108 A1 1/2015 Song
2018/0144684 A1 5/2018 Jeon et al.
(Continued)

FOREIGN PATENT DOCUMENTS

CN 106531074 A 3/2017
CN 110277060 A 9/2019
(Continued)

OTHER PUBLICATIONS

International Search Report issued on Aug. 12, 2022, in corresponding International Application No. PCT/CN2022/101912, 6 pages.
(Continued)

*Primary Examiner* — Koosha Sharifi-Tafreshi
(74) *Attorney, Agent, or Firm* — Maier & Maier, PLLC

(57) ABSTRACT

A pixel circuit, a driving method for a pixel circuit, and a display panel. The pixel circuit includes a drive module, a data write module, a first compensation module, a second compensation module, a light-emitting module, a storage module and a coupling module. The data write module is configured to write a voltage related to a data voltage to a control terminal of the drive module. The drive module is configured to provide a drive signal to the light-emitting module according to the voltage of the control terminal to drive the light-emitting module to emit light. A first terminal of the second compensation module is connected to the control terminal of the drive module, a second terminal of the second compensation module is connected to a first terminal of the first compensation module.

20 Claims, 39 Drawing Sheets

(52) U.S. Cl.
CPC ............... *G09G 2300/0819* (2013.01); *G09G 2300/0852* (2013.01); *G09G 2310/08* (2013.01); *G09G 2320/0233* (2013.01); *G09G 2320/0247* (2013.01); *G09G 2340/0435* (2013.01)

(56) References Cited

U.S. PATENT DOCUMENTS

| | | | |
|---|---|---|---|
| 2018/0151123 A1 | 5/2018 | Li et al. | |
| 2019/0164491 A1 | 5/2019 | Kim et al. | |
| 2022/0051625 A1* | 2/2022 | Lai | G09G 3/3233 |
| 2022/0406254 A1* | 12/2022 | Wang | H01L 27/1255 |

FOREIGN PATENT DOCUMENTS

| | | | |
|---|---|---|---|
| CN | 111445848 | A | 7/2020 |
| CN | 111710296 | A | 9/2020 |
| CN | 111724745 | A | 9/2020 |
| CN | 111883044 | A | 11/2020 |
| CN | 112164361 | A | 1/2021 |
| CN | 112289267 | A | 1/2021 |
| CN | 112382235 | A | 2/2021 |
| CN | 112397025 | A | 2/2021 |
| CN | 112397028 | A | 2/2021 |
| CN | 112419982 | A | 2/2021 |
| CN | 112509518 | A | 3/2021 |
| CN | 212724668 | U | 3/2021 |
| CN | 112639951 | A | 4/2021 |
| CN | 112735314 | A | 4/2021 |
| CN | 112820242 | A | 5/2021 |
| CN | 112885304 | A | 6/2021 |
| CN | 112908265 | A | 6/2021 |
| CN | 112992055 | A | 6/2021 |
| CN | 113140179 | A | 7/2021 |
| CN | 113192460 | A | 7/2021 |
| CN | 113223457 | A | 8/2021 |
| CN | 113223458 | A | 8/2021 |
| CN | 113284454 | A | 8/2021 |
| CN | 113314073 | A | 8/2021 |
| CN | 113314074 | A | 8/2021 |
| CN | 113362765 | A | 9/2021 |
| CN | 114023260 | A | 2/2022 |
| CN | 216119516 | U | 3/2022 |
| CN | 216928002 | U | 7/2022 |
| KR | 1020200015862 | A | 2/2020 |
| WO | 2020233024 | A1 | 11/2020 |

OTHER PUBLICATIONS

International Search Report issued on Sep. 2, 2022, in corresponding International Application No. PCT/CN2022/101978, 6 pages.
International Search Report issued on Sep. 16, 2022, in corresponding International Application No. PCT/CN2022/101979, 4 pages.
Office Action issued on Nov. 2, 2022, in corresponding Chinese Application No. 202111415701.8, 16 pages.
Office Action issued on Jan. 12, 2023, in corresponding Chinese Application No. 202111415701.8, 8 pages.
Office Action issued on Jun. 28, 2024 in corresponding Korean Application No. 10-2023-7023471, 14 pages.
Extended European Search Report issued on Jul. 5, 2024, in corresponding European Application No. 22832054.5, 12 pages.
Chinese Search Report issued on Aug. 12, 2024, in corresponding Chinese Application No. 202110738517.0, 8 pages.
Office Action issued on Aug. 14, 2024 in corresponding Chinese Application No. 202110738517.0, 24 pages.
Office Action issued on Jun. 26, 2024 in corresponding Korean Application No. 10-2023-7021808, 13 pages.

* cited by examiner

PIXEL CIRCUIT AND DRIVING METHOD THEREFOR, AND DISPLAY PANEL

CROSS-REFERENCE TO RELATED APPLICATIONS

This application is a continuation of International Patent Application No. PCT/CN2022/101979, filed on Jun. 28, 2022, which claims priority to Chinese Patent Application No. 202111415701.8 filed on Nov. 25, 2021, Chinese Patent Application No. 202110738517.0 filed on Jun. 30, 2021, and Chinese Patent Application No. 202111485817.9 filed on Dec. 7, 2021, disclosures of all of which are incorporated herein by reference in their entireties.

TECHNICAL FIELD

Embodiments of the present application relate to the field of display technologies, for example, to a pixel circuit, a driving method for a pixel circuit, and a display panel.

BACKGROUND

Since the organic light-emitting diode display panel emits light by means of current driving, the characteristics of the driving device may affect the displayed gray scale brightness, and when the feature difference of driving devices corresponding to different pixels is too large, the phenomenon of uneven picture quality is easily caused.

In the related art, the brightness uniformity of the entire display picture is generally improved by compensating a threshold voltage of a pixel circuit, however, the threshold voltage of the pixel circuit cannot be completely compensated, and the brightness uniformity displayed at the low gray scale is poor.

SUMMARY

An embodiment of the present application provides a pixel circuit, a driving method for a pixel circuit, and a display panel.

In a first aspect, an embodiment of the present application provides a pixel circuit. The pixel circuit includes a drive module, a data write module, a first compensation module, a second compensation module, a light-emitting module, a storage module and a coupling module. The data write module is configured to write a voltage related to a data voltage to a control terminal of the drive module. The drive module is configured to provide a drive signal to the light-emitting module according to the voltage of the control terminal to drive the light-emitting module to emit light. A first terminal of the second compensation module is connected to the control terminal of the drive module, a second terminal of the second compensation module is connected to a first terminal of the first compensation module, a second terminal of the first compensation module is connected to a first terminal of the drive module, and the first compensation module is configured to perform a threshold compensation on the drive module. The storage module is configured to store the voltage of the control terminal of the drive module, and the coupling module is configured to couple a jump voltage or a fixed voltage to at least one of the second terminal of the second compensation module or an internal node of the second compensation module.

In a second aspect, an embodiment of the present application further provides a driving method for a pixel circuit. The pixel circuit includes a drive module, a data write module, a first compensation module, a second compensation module, a light-emitting module, a storage module and a coupling module. The data write module is connected to the drive module, a first terminal of the second compensation module is connected to a control terminal of the drive module, a second terminal of the second compensation module is connected to a first terminal of the first compensation module, a second terminal of the first compensation module is connected to a first terminal of the drive module, the storage module is connected to the control terminal of the drive module, a first terminal of the coupling module is configured to receive a jump voltage, and a second terminal of the coupling module is connected to the second terminal of the second compensation module or an internal node of the second compensation module. The driving method for the pixel circuit includes that: in a data write and threshold compensation stage, the data write module is controlled to write a voltage related to a data voltage to a control terminal of the drive module, and the first compensation module is controlled to perform a threshold compensation on the drive module; in a compensation adjustment stage, the coupling module is controlled to couple the jump voltage or a fixed voltage to at least one of the second terminal of the second compensation module or the internal node of the second compensation module.

In a third aspect, an embodiment of the present application further provides a display panel including the pixel circuit provided in the first aspect of the present application.

According to the technical schemes provided in the embodiments of the present disclosure, after a threshold voltage of the drive module is compensated, the coupling module is configured to couple the jump voltage to the at least one of the second terminal of the second compensation module or the internal node of the second compensation module, so as to change a potential of the second terminal of the second compensation module or the internal node of the second compensation module. Since the second compensation module is connected to the control terminal of the drive module, when the potential of the second terminal or the internal node of the second compensation module is changed, a potential of the control terminal of the drive module can be adjusted finely, so as to improve the threshold compensation effect, so that in a case of the low gray scale, the drive module can, under the action of the fine adjustment of the voltage of the control terminal of the drive module, ensure that drive currents generated by different pixel circuits under a same gray scale voltage are the same, whereby the light-emitting brightness of the light-emitting module is the same, and thus the uniformity of brightness is improved, which is conductive to improving the display effect. Even if the drive frequency varies, the good compensation effect can be achieved by means of reasonable level coupling.

DETAILED DESCRIPTION

As described in the background art, the pixel circuit suffers from the poor brightness uniformity at the low gray scale. In the related art, a pixel circuit, which generally adopts a 7T1C architecture, compensates for a threshold voltage of a drive module (drive transistor), and when a compensation module is turned on, a data voltage associated with the threshold voltage of the drive module is written into a storage capacitor, and thus, threshold voltage information of the drive module is stored in the capacitor. However, since a row scan time corresponding to the compensation module is relatively short, the error of the threshold voltage information stored in the capacitor is relatively large, so that the threshold voltage of the drive module is not completely compensated. Moreover, in an operation process of the pixel circuit, the subthreshold swing (SS) of the drive module fluctuates, so that drive currents generated by different drive modules are inconsistent at a same gray scale, which makes the compensation effect not ideal, and further leads to the poor brightness uniformity displayed at the low gray scale.

Figure 1:
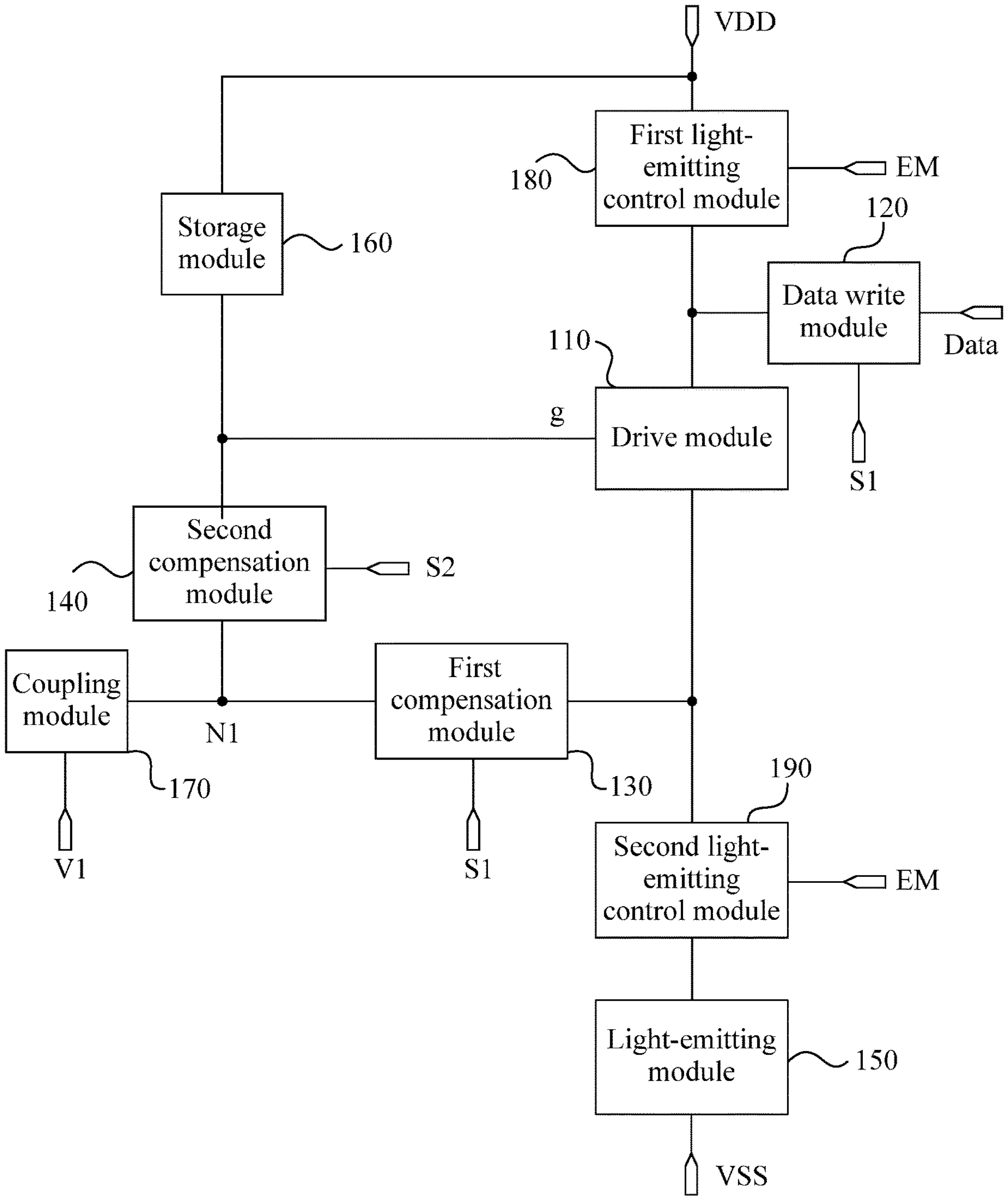
FIG. 1 is a schematic structural diagram of a pixel circuit according to an embodiment of the present application.

In view of the above-described problems, an embodiment of the present application provides a pixel circuit, to improve the uniformity of display brightness and improve the display effect. FIG. 1 is a schematic structural diagram of a pixel circuit according to an embodiment of the present application. Referring to FIG. 1, the pixel circuit provided in the embodiment of the present application includes a drive module 110, a data write module 120, a first compensation module 130, a second compensation module 140, a light-emitting module 150, a storage module 160, and a coupling module 170. The data write module 120 is configured to write a voltage related to a data voltage to a control terminal g of the drive module 110. The drive module 110 is configured to provide a drive signal to the light-emitting module 150 according to the voltage of the control terminal g to drive the light-emitting module 150 to emit light.

A first terminal of the second compensation module 140 is connected to the control terminal g of the drive module 110, a second terminal of the second compensation module 140 is connected to a first terminal of the first compensation module 130, a second terminal of the first compensation module 130 is connected to a first terminal of the drive module 110, and the first compensation module 130 is configured to perform a threshold compensation on the drive module 110. The storage module 160 is configured to store the voltage of the control terminal g of the drive module 110, and the coupling module 170 is configured to couple a jump voltage V1 to at least one of the second terminal of the second compensation module or an internal node of the second compensation module 170.

Exemplarily, the first compensation module 130 and the second compensation module 140 are connected between the control terminal g of the drive module 110 and the first terminal of the drive module 110 in sequence, the coupling module 170 is connected to an end at which the first compensation module 130 and the second compensation module 140 are connected, and the coupling module 170 is configured to couple the jump voltage V1 to at least one of the second terminal of the second compensation module 140 or the internal node of the second compensation module 140 after the first compensation module 130 compensates for the threshold of the drive module 110, so as to function as a fine adjustment of the voltage of the control terminal g of the drive module 110. The data write module 120 may be connected to a second terminal of the drive module 110, and the data write module 120 is configured to write a voltage related to a data voltage on a data line Data to the control terminal g of the drive module 110, and to store a voltage related to the threshold of the drive module 110 in the storage module 160.

In this embodiment, the pixel circuit may at least include a data write and threshold compensation stage, a compensation adjustment stage, and a light-emitting stage in the time of displaying a frame of picture. In the data write and threshold compensation stage, the data write module 120, the first compensation module 130 and the second compensation module 140 are turned on, and the data voltage on the data line Data is written to the control terminal g of the drive module 110 through the data write module 120, the drive module 110, the first compensation module 130 and the second compensation module 140, and a threshold voltage of the drive module 110 is compensated through the first compensation module 130.

In the compensation adjustment stage, the coupling module 170 is configured to couple the jump voltage V1 to at least one of the second terminal of the second compensation module 140 or the internal node of the second compensation module 140, so as to change a potential of the second terminal of the second compensation module 140 and/or the internal node of the second compensation module 140, thereby finely adjusting the voltage of the control terminal g of the drive module 110. Exemplarily, in a compensation process, the voltage of the control terminal g of the drive module 110 after being compensated should be Vdata+Vth, where Vdata is the data voltage on the data line Data, and Vth is the threshold voltage of the drive module 110. However, the voltage of the control terminal g of the drive module 110 is not equal to Vdata+Vth due to the short turn-on time of the first compensation module 130, and there is a large error between the voltage of the control terminal g of the drive module 110 and Vdata+Vth after the data write and compensation stage ends due to the subthreshold swing problem of the drive module 110, so that drive currents generated by different drive modules 110 at the same gray scale voltage are different. At the low gray scale, small errors may cause a large change in the drive current due to the low data voltage Vdata. The voltage of the control terminal g of the drive module 110 is adjusted finely in the compensation adjustment stage to ensure that the drive current generated by the drive module 110 according to the voltage of the control terminal g of the drive module 110 is consistent in the light-emitting stage, whereby the uniformity of display brightness is improved, and further the display effect is improved.

According to the pixel circuit provided in the embodiment of the present application, after the threshold voltage of the drive module is compensated, the coupling module is configured to couple the jump voltage to the at least one of the second terminal of the second compensation module or the internal node of the second compensation module, so as to change the potential of the second terminal of the second compensation module or the internal node of the second compensation module. Since the second compensation module is connected to the control terminal of the drive module, when the potential of the second terminal or the internal node of the second compensation module is changed, a potential of the control terminal of the drive module can be adjusted finely, so as to improve the threshold compensation effect, so that in a case of the low gray scale, the drive module can, under the action of fine tuning the voltage of the control terminal of the drive module, ensure that drive currents generated by different pixel circuits under the same gray scale voltage are the same, whereby the light-emitting brightness of the light-emitting module is the same, and thus the uniformity of brightness is improved, which is conductive to improving the display effect. Even if the drive frequency varies, the good compensation effect can be achieved by means of reasonable level coupling.

Optionally, in this embodiment, the jump voltage V1 is jumped after the second compensation module 140 is turned off. In other words, after the pixel circuit completes the threshold compensation of the drive module 110 through the first compensation module 130 and the second compensation module 140, the second compensation module 140 is turned off, and at this time, the jump voltage V1 is jumped from a high level to a low level, or from a low level to a high level (which may be set according to practical conditions). Since a potential of a first terminal of the coupling module 170 is changed, the coupling action of the coupling module 170 is triggered, and a change amount of the voltage at the first terminal of the coupling module 170 is coupled to a second terminal of the coupling module 170, that is, a potential of a first node N1 is coupled by the coupling module 170, therefore, the voltage of the control terminal g of the drive module 110 can be adjusted finely to improve the threshold compensation effect.

Figure 2:
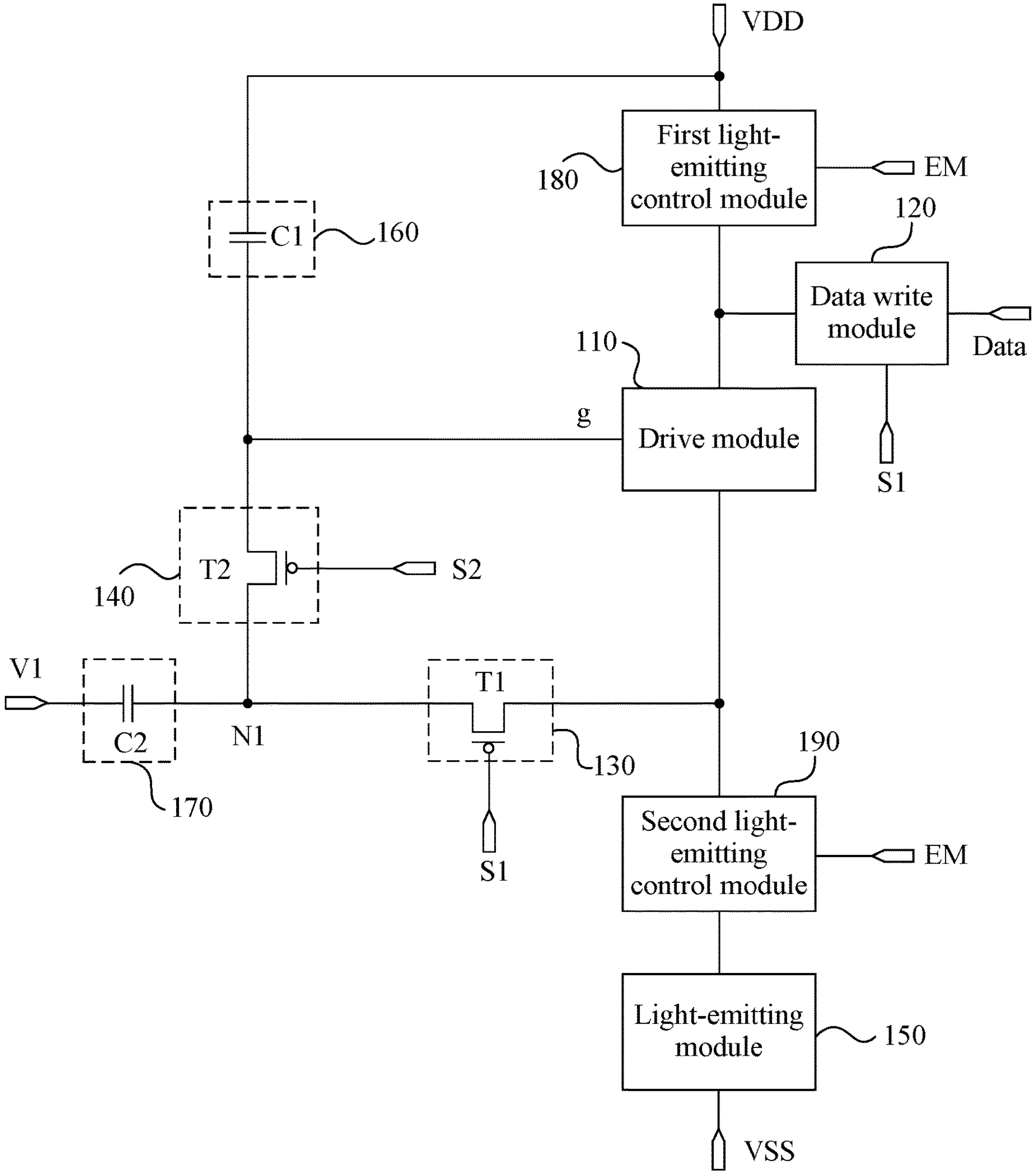
FIG. 2 is a schematic structural diagram of another pixel circuit according to an embodiment of the present application.

Optionally, FIG. 2 is a schematic structural diagram of another pixel circuit according to an embodiment of the present disclosure. Referring to FIG. 2, on the basis of the above-described technical schemes, the first compensation module 130 includes a first transistor T1, the second compensation module 140 includes a second transistor T2, the storage module 160 includes a first capacitor C1, and the coupling module 170 includes a second capacitor C2. A gate of the first transistor T1 is connected to a first scan line S1, a first electrode of the first transistor T1 is connected to the first terminal of the drive module 110, a second electrode of the first transistor T1 is connected to a second electrode of the second transistor T2, a first electrode of the second transistor T2 is connected to the control terminal g of the drive module 110, and a gate of the second transistor T2 is connected to a second scan line S2. A first electrode of the first capacitor C1 is connected to a fixed voltage, a second electrode of the first capacitor C1 is connected to the control terminal g of the drive module 110, a first electrode of the second capacitor C2 is configured to receive a pulse voltage, and a second electrode of the second capacitor C2 is connected to the second electrode of the second transistor T2.

Exemplarily, the first capacitor C1 is connected between the fixed voltage and the control terminal g of the drive module 110, and the first capacitor C1 is configured to store the voltage of the control terminal g of the drive module 110, where the fixed voltage may be a first power supply voltage VDD supplied from a first power supply line or an external voltage. In the data write and compensation stage, the data write module 120 and the first transistor T1 are turned on in response to a scan signal on the first scan line S1, the second transistor T2 is turned on in response to a scan signal on the second scan line S2, and the data voltage on the data line Data is written to the control terminal g of the drive module 110 through the data write module 120, the drive module 110, the first transistor T1 and the second transistor T2. Then, the data write module 120 and the first transistor T1 are turned off in response to the scan signal on the first scan line S1. When the second transistor T2 is turned off in response to the scan signal on the second scan line S2, a pulse voltage at the first electrode of the second capacitor C2 is jumped, and a potential of the first node N1 is changed. Since the second transistor T2 is in an off state, and the potential of the control terminal g of the drive module 110 is not equal to the potential of the first node N1, the voltage of the control terminal g of the drive module 110 can be adjusted finely under the action of the electric leakage of the second transistor T2, and the drive current generated by the drive module 110 is made to be consistent for different pixel circuits at the low gray scale, so as to make up a case that the threshold compensation on the drive module 110 is insufficient in the data write and compensation stage, thereby improving the compensation effect, and thus being conductive to improving the uniformity of display brightness.

Table 1 is the brightness values of nine points in the panel at 32 gray scale obtained by using the 7T1C pixel circuit, and Table 2 is the brightness values of the same nine points in the panel obtained by using the pixel circuit provided in the embodiments of the present application at 32 gray scale.

TABLE 1

| | | | |
|---|---|---|---|
| Brightness value | 5.556 | 5.681 | 5.393 |
| | 5.803 | 5.829 | 5.694 |
| | 6.239 | 6.439 | 6.349 |
| Uniformity | | 83.76% | |

TABLE 2

| | | | |
|---|---|---|---|
| Brightness value | 5.525 | 5.563 | 5.425 |
| | 5.586 | 5.607 | 5.482 |
| | 5.671 | 5.768 | 5.664 |
| Uniformity | | 94.05% | |

According to the data in Table 1 and Table 2, it can be seen that by adjusting the voltage of the control terminal G of the drive module 110 after being compensated, under the same gray scale, the uniformity of panel brightness can be significantly improved, thereby improving the compensation effect.

In this embodiment, the jump voltage V1 is a pulse signal having a jump capability, i.e., a pulse voltage. When the second transistor T2 is turned off in response to the scan signal on the second scan line S2, a rising edge or a falling edge of the pulse voltage comes, so that a voltage at the first electrode of the second capacitor C2 is jumped.

Figure 3:
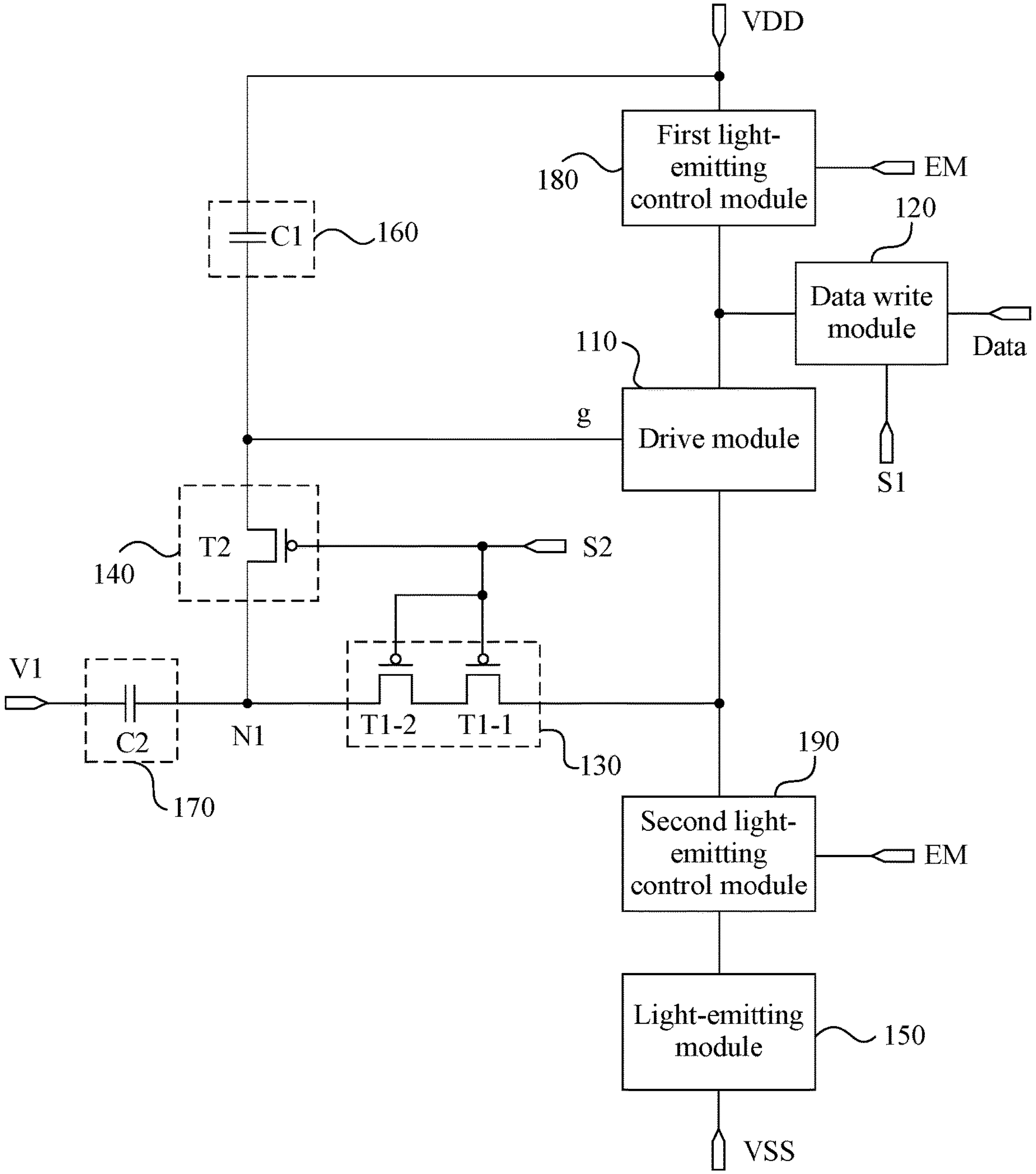
FIG. 3 is a schematic structural diagram of another pixel circuit according to an embodiment of the present application.

In the above-described technical schemes, the first compensation module 130 and the second compensation module 140 are responsive to different scan signals, and the first compensation module 130 and the second compensation module 140 are not turned on simultaneously. Of course, the first compensation module 130 and the second compensation module 140 may also be connected to the same scan line to achieve the state synchronization of both the first compensation module 130 and the second compensation module 140. FIG. 3 is a schematic structural diagram of another pixel circuit according to an embodiment of the present application. Referring to FIG. 3, the first compensation module 130 includes a first transistor T1, the second compensation module 140 includes a second transistor T2, the storage module 160 includes a first capacitor C1, and the coupling module 170 includes a second capacitor C2. A gate of the first transistor T1 is connected to a second scan line S2, a first electrode of the first transistor T1 is connected to the first terminal of the drive module 110, a second electrode of the first transistor T1 is connected to a second electrode of the second transistor T2, a first electrode of the second transistor T2 is connected to the control terminal g of the drive module 110, and a gate of the second transistor T2 is connected to the second scan line S2. A first electrode of the first capacitor C1 is connected to the fixed voltage, a second electrode of the first capacitor C1 is connected to the control terminal g of the drive module 110, a first electrode of the second capacitor C2 is configured to receive the pulse voltage, and a second electrode of the second capacitor C2 is connected to the second electrode of the second transistor T2.

Exemplarily, in this embodiment, the first transistor T1 may be a double-gate transistor, and in conjunction with FIG. 3, the first transistor T1 includes two sub-transistors, i.e., a sub-transistor T1-1 and a sub-transistor T1-2, and gates of the two sub-transistors are short-circuited. The first transistor T1 is set as the double-gate transistor, it is possible to reduce the electric leakage of the first transistor T1 after the first transistor T1 is turned off, so as to maintain the stability of the voltage of the control terminal g of the drive module 110 and prevent the generation of large interference for the coupling module 170 and the second transistor T2 to adjust the voltage of the control terminal g. Moreover, the first transistor T1 and the gate of the second transistor T2 are connected to the same scan line (the second scan line S2), so that the first transistor T1 and the second transistor T2 are turned on or off simultaneously. The operation process thereof may refer to the relevant description in the above-described technical schemes, and will not be described in detail. Optionally, the short-circuited gates of the sub-transistor T1-1 and the sub-transistor T1-2 of the first transistor T1 may be connected to the first scan line S1.

Figure 4:
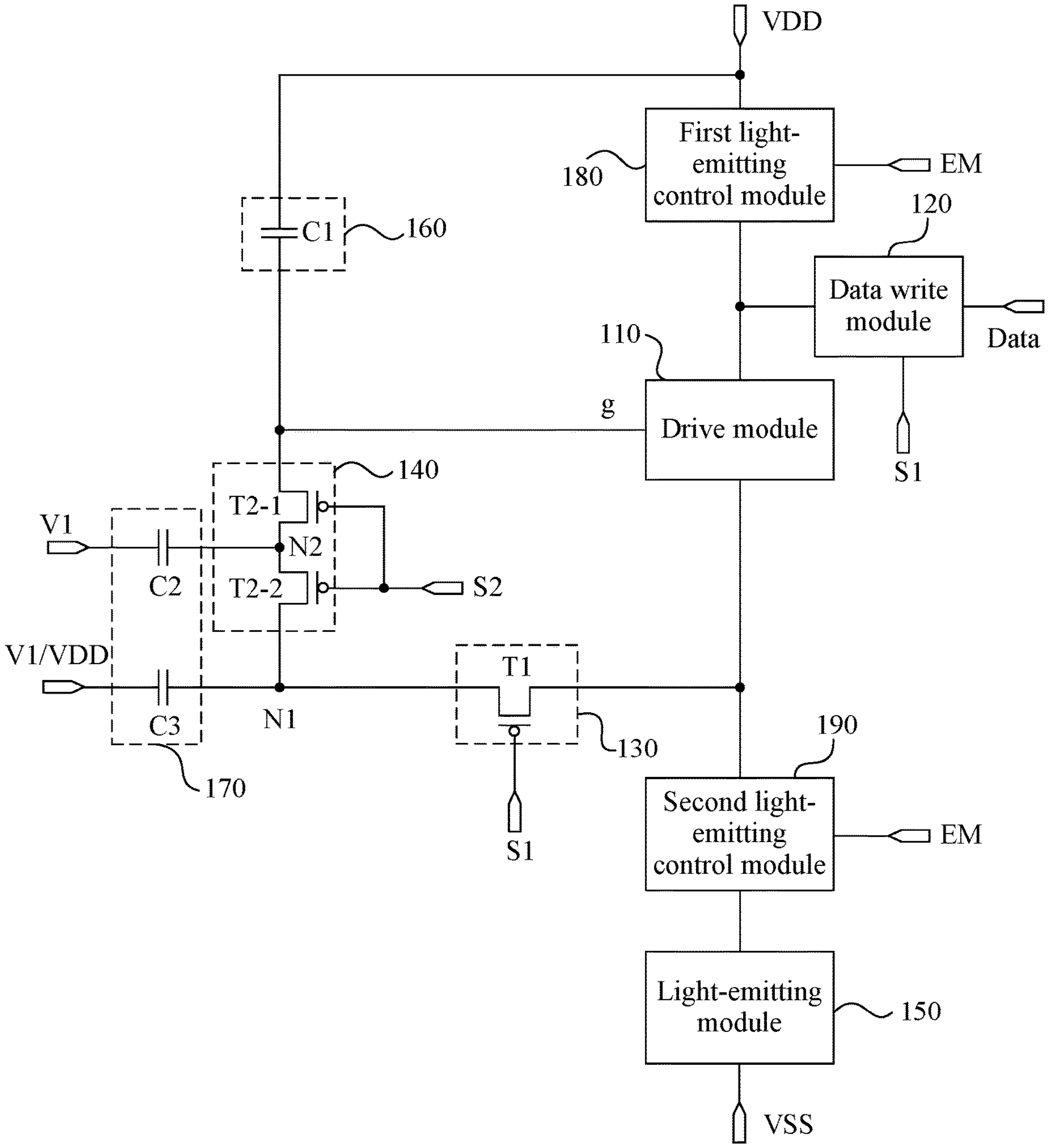
FIG. 4 is a schematic structural diagram of another pixel circuit according to an embodiment of the present application.

Optionally, FIG. 4 is a schematic structural diagram of another pixel circuit according to an embodiment of the present application. Referring to FIG. 4, the first compensation module 130 includes a first transistor T1, the second compensation module 140 includes a second transistor T2, the second transistor T2 is a double-gate transistor, and the second transistor T2 includes a first sub-transistor T2-1 and a second sub-transistor T2-2. A first electrode of the first transistor T1 is connected to the first terminal of the drive module 110, a second electrode of the first transistor T1 is connected to a second electrode of the second sub-transistor T2-2, a first electrode of the second sub-transistor T2-2 is connected to a second electrode of the first sub-transistor T2-1, and a first electrode of the first sub-transistor T2-1 is connected to the control terminal g of the drive module 110. A gate of the first transistor T1 is connected to a first scan line S1, and a gate of the second transistor T2 is connected to a second scan line S2.

The coupling module 170 is configured to couple the jump voltage V1 to the second electrode of the first sub-transistor T2-1 or the second electrode of the second sub-transistor T2-2.

Exemplarily, the second transistor T2 is the double-gate transistor, has a smaller electric leakage, and can better adjust finely the voltage of the control terminal g of the drive module 110 at the low gray scale to improve the adjustment accuracy of the voltage. In this embodiment, the storage module 160 includes a first capacitor C1, and the coupling module 170 includes a second capacitor C2 and a third capacitor C3. A first electrode of the first capacitor C1 is connected to the fixed voltage, a second electrode of the first capacitor C1 is connected to the control terminal g of the drive module 110, a first electrode of the second capacitor C2 is configured to receive the pulse voltage, and a second electrode of the second capacitor C2 is connected to the second electrode of the first sub-transistor T2-1. A first electrode of the third capacitor C3 is configured to receive the pulse voltage, and a second electrode of the third capacitor C3 is connected to the second electrode of the second sub-transistor T2-2. Since the second capacitor C2 and the third capacitor C3 are both connected to the pulse voltage, after the first sub-transistor T2-1 and the second sub-transistor T2-2 are turned off, the level of the pulse voltage is jumped, the second capacitor C2 is configured to couple a voltage change amount of the jump voltage V1 to a second node N2, the third capacitor C3 couples the voltage change amount of the jump voltage V1 to the first node N1, and potentials of the second node N2 and the first node N1 are changed simultaneously to adjust finely the voltage of the control terminal g of the drive module 110.

With continued reference to FIG. 4, the first electrode of the third capacitor C3 may also be connected to the fixed voltage, for example, the first electrode of the third capacitor C3 is connected to the first supply voltage VDD supplied form the first power supply line. Of course, in other embodiments, the fixed voltage may be another voltage having a stable value. Since the fixed voltage does not jump, the third capacitor C3 can maintain the stability of the potential of the first node N1, thereby reducing the electric leakage between the control terminal g of the drive module 110 and the second compensation module 140, which is conductive to adjust finely the voltage of the control terminal g of the drive module 110.

Figure 5:
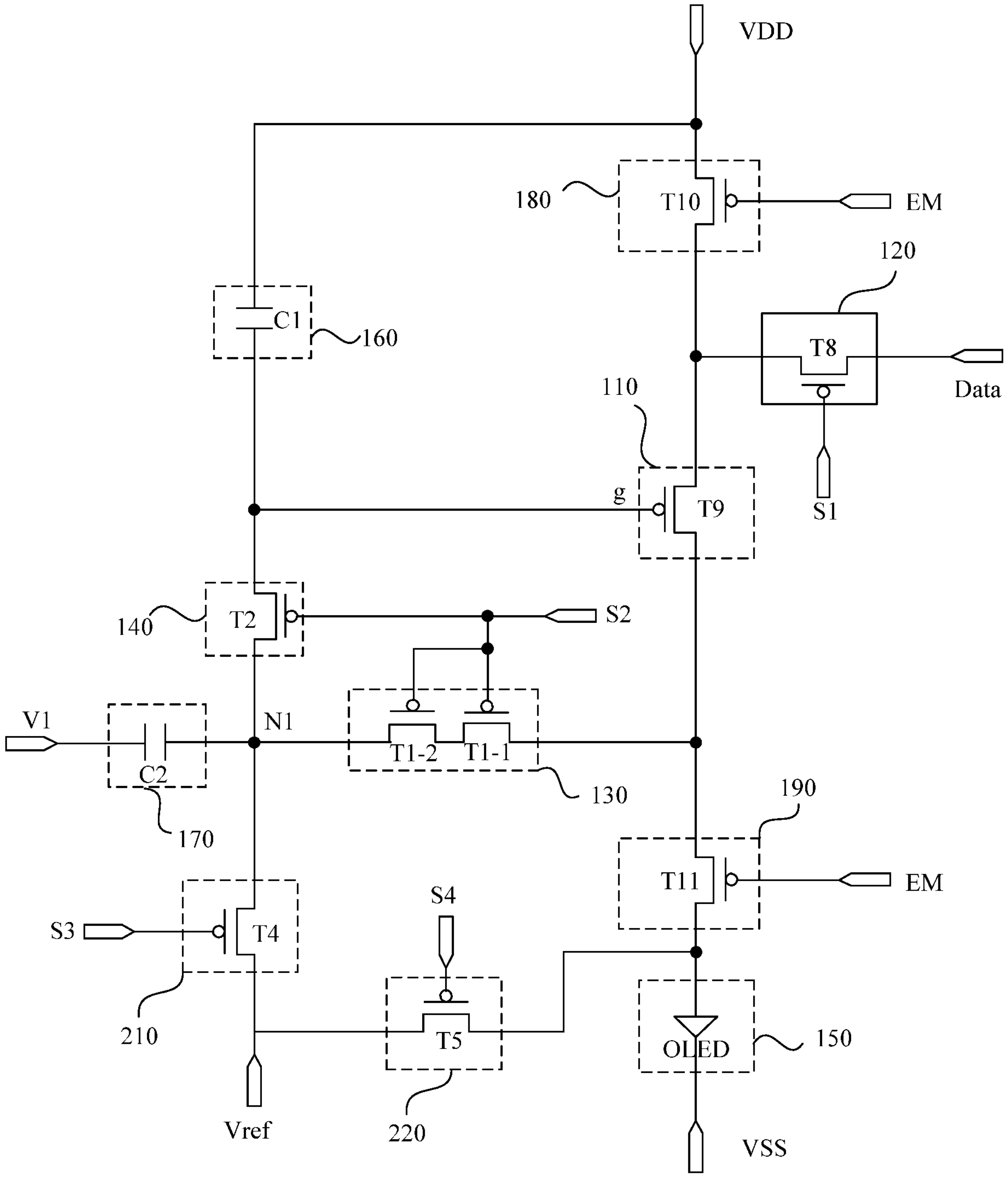
FIG. 5 is a schematic structural diagram of another pixel circuit according to an embodiment of the present application.

Optionally, FIG. 5 is a schematic structural diagram of another pixel circuit according to an embodiment of the present application. Referring to FIG. 5, on the basis of each of the above-described technical schemes, the pixel circuit further includes a first initialization module 210 and a second initialization module 220. The first initialization module 210 includes a fourth transistor T4, and the second initialization module 220 includes a fifth transistor T5. A gate of the fourth transistor T4 is connected to a third scan line S3, a first electrode of the fourth transistor T4 is connected to an initialization signal line Vref, and a second electrode of the fourth transistor T4 is connected to a second electrode of the second transistor T2. A gate of the fifth transistor T5 is connected to a fourth scan line S4, a first electrode of the fifth transistor T5 is connected to the initialization signal line Vref, and a second electrode of the fifth transistor T5 is connected to a first terminal of the light-emitting module 150. Optionally, the fourth transistor T4 may be the double-gate transistor.

The pixel circuit provided in the embodiment of the present application further includes a first light-emitting control module 180 and a second light-emitting control module 190. The data write module 120 includes an eighth transistor T8, the drive module 110 includes a ninth transistor T9, the first light-emitting control module 180 includes a tenth transistor T10, and the second light-emitting control module 190 includes an eleventh transistor T11. A first electrode of the tenth transistor T10 is connected to a first power supply line, a second electrode of the tenth transistor T10 is connected to a first electrode of the ninth transistor T9, a second electrode of the ninth transistor T9 is connected to the first terminal of the light-emitting module 150 through the eleventh transistor T11, a second terminal of the light-emitting module 150 is connected to a second power supply line, and a gate of the tenth transistor T10 and a gate of the eleventh transistor T11 are connected to a light-emitting control signal line EM.

Figure 6:
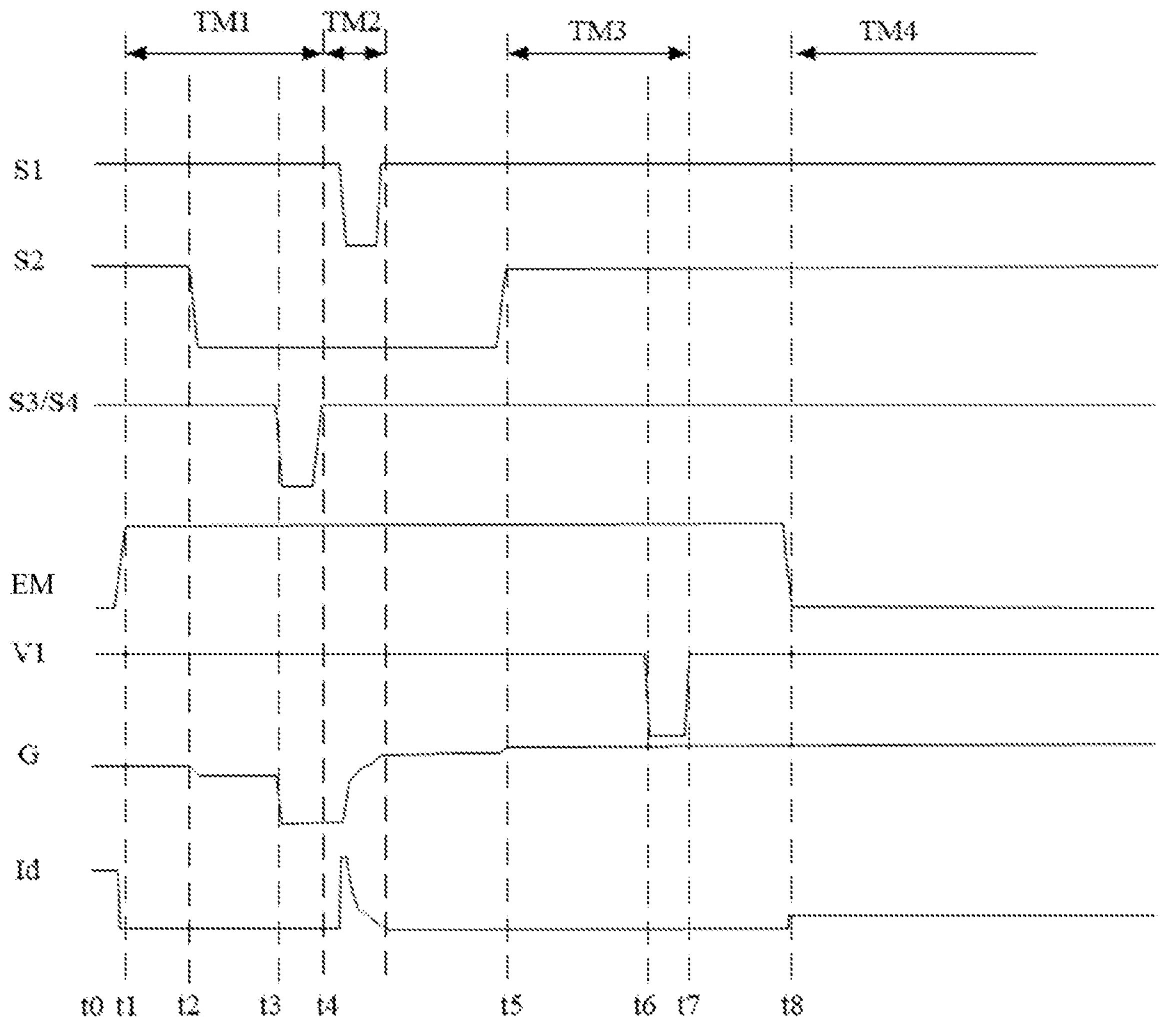
FIG. 6 is a control timing diagram of a pixel circuit according to an embodiment of the present application.

FIG. 6 is a control timing diagram of a pixel circuit according to an embodiment of the present application, and is applicable to the pixel circuit shown in FIG. 5. This embodiment exemplarily shows that the first transistor T1, the second transistor T2, the fourth transistor T4, the fifth transistor T5, the eighth transistor T8, the ninth transistor T9, the tenth transistor T10, and the eleventh transistor T11 are all P-transistors. Referring to FIGS. 5 and 6, the operation process of the pixel circuit provided in the embodiments of the present application may include an initialization stage TM1, a data write and threshold compensation stage TM2, a compensation adjustment stage TM3, and a light-emitting stage TM4. For ease of description, the initialization signal line and the initialization voltage supplied from the initialization signal line are represented by the same reference numeral, the scan line and the scan signal supplied from the scan line are represented by the same reference numeral, and the light-emitting control signal line and the light-emitting control signal supplied from the light-emitting control signal line are represented by the same reference numeral.

In the initialization stage TM1, the first initialization module 210 and the second initialization module 220 transmit an initialization voltage Vref supplied from the initialization signal line to the control terminal g of the drive module 110 and the light-emitting module 150, respectively, to achieve the initialization of the control terminal g of the drive module 110 and the light-emitting module 150. At a moment t1, the light-emitting control signal EM, the first scan signal S1, the second scan signal S2, the third scan signal S3 and the fourth scan signal S4 are all high levels, the first transistor T1, the second transistor T2, the fourth transistor T4, the fifth transistor T5, the eighth transistor T8, the ninth transistor T9, the tenth transistor T10 and the eleventh transistor T11 are all in an off state, and a gate voltage of the ninth transistor T9 maintains a state of a previous frame. At a moment t2, a falling edge of the second scan signal S2 arrives, and the second transistor T2 and the first transistor T1 are turned on (in this embodiment, the first transistor T1 may be connected to the first scan line S1 or to the second scan line S2), so that part of charges of the gate g of the ninth transistor T9 can be released, and the voltage of the gate g of the ninth transistor T9 is reduced. At a moment t3, falling edges of the third scan signal S3 and the fourth scan signal S4 arrive, the fourth transistor T4 and the fifth transistor T5 are turned on, and the initialization voltage Vref is transmitted to the gate g of the ninth transistor T9 and the first electrode (anode) of the organic light-emitting diode (OLED), respectively, so that the potential initialization of the gate g of the ninth transistor T9 and the first electrode of the organic light-emitting diode (OLED) is completed.

In the data write and threshold compensation stage TM2, the data write module 120, the first compensation module 130 and the second compensation module 140 are respectively responsive to the corresponding scan signals, to enable the data voltage to be written into the gate g of the ninth transistor T9, and to enable the threshold compensation of the ninth transistor T9. At a moment t4, the fourth transistor T4 and the fifth transistor T5 are turned off in response to the high-level signal, a falling edge of the first scan signal S1 arrives, the eighth transistor T8 is turned on in response to the low-level first scan signal S1, the data voltage on the data line Data is transmitted to the gate g of the ninth transistor T9, and the threshold compensation of the ninth transistor T9 is achieved by the first transistor T1 and the second transistor T2, and at this time, the gate voltage of the ninth transistor T9 is Vdata+Vth', and the first capacitor C1 stores the compensated gate voltage.

Exemplarily, due to the short turn-on duration of the eighth transistor T8, a threshold voltage Vth of the ninth transistor T9 is not completely compensated, and is only compensated by Vth'. That is, at this time, the gate voltage of the ninth transistor T9 is raised (the threshold voltage Vth of the ninth transistor T9 is a negative value). As can be seen from the formula of the drive current, when the gate voltage of the ninth transistor T9 is increased, the drive current is decreased, so that the display brightness is decreased, and thus the uniformity of brightness is affected.

In the compensation adjustment stage TM3, the jump voltage V1 is coupled to the first node N1 through the coupling module 170 to adjust finely the gate voltage of the ninth transistor T9. In this embodiment, the jump voltage V1 is a pulse voltage, and a pulse of its voltage signal follows a pulse on the second scan signal S2 transmitted by the second scan line. At a moment t5, a rising edge of the second scan signal S2 arrives, the second transistor T2 is turned off, and after a moment t6, a falling edge of the pulse signal arrives, the pulse voltage is jumped from the high level to the low level, and the second capacitor C2 couples the pulse voltage to the second electrode according to the voltage change amount of the first electrode thereof. According to the charge conservation principle, a voltage of the first node N1 is decreased, so that there is a voltage difference between the gate g of the ninth transistor T9 and the first node N1. Due to the electric leakage action of the second transistor T2, the gate voltage of the ninth transistor T9 is enabled to be adjusted finely by the voltage of the first node N1, so that the gate voltage of the ninth transistor T9 is reduced to increase the drive current, thereby compensating for the reduction of the drive current due to incomplete compensation of the threshold voltage Vth of the ninth transistor T9, improving the compensation effect, and ensuring the uniformity of display brightness. At a moment t7, the pulse voltage is jumped from the low level to the high level, where a width of the pulse voltage (i.e., a time difference between the moment t7 and the moment t6) may be set according to the subthreshold swing fluctuation range of the drive module 110 to solve the problem of the subthreshold swing fluctuation of the drive module 110 by means of the jump of the pulse voltage. The moment t7 is before the moment t8, so that a condition that causes the instability of a gate potential of the ninth transistor T9 after the organic light-emitting diode OLED emits light, and thus causes the display non-uniformity is prevented.

Of course, in other embodiments, it is also possible to increase the gate voltage of the ninth transistor T9 by the coupling action to reduce the drive current, which will not be described in this embodiment in detail and will be understood with reference to the above-described related description.

Optionally, in the compensation adjustment stage TM3, the pulse voltage V1 is jumped from the high level to the low level in a case where the second compensation module 140 is turned off, and is jumped from the low level to the high level before the light-emitting module 150 emits light; or the pulse voltage V1 is jumped from the low level to the high level in a case where the second compensation module 140 is turned off, and is jumped from the high level to the low level before the light-emitting module 150 emits light.

In the light-emitting stage TM4, the light-emitting control signal EM is at a low level, the tenth transistor T10 and the eleventh transistor T11 are turned on, the first transistor T1, the second transistor T2, the fourth transistor T4, the fifth transistor T5 and the eighth transistor T8 are turned off, and the ninth transistor T9 generates a drive current to drive the organic light-emitting diode OLED to emit light. As can be seen from the above analysis, since the threshold compensation effect is improved, the drive current at the same gray scale is kept to be consistent at the low gray scale, and thus, the uniformity of display brightness is improved. Moreover, the compensation effect is achieved by adjusting finely the gate voltage of the ninth transistor T9 after the threshold voltage of the ninth transistor T9 is compensated, so that a problem of the subthreshold swing fluctuation of the ninth transistor T9 can be solved, and the threshold compensation effect is improved.

Figure 7:
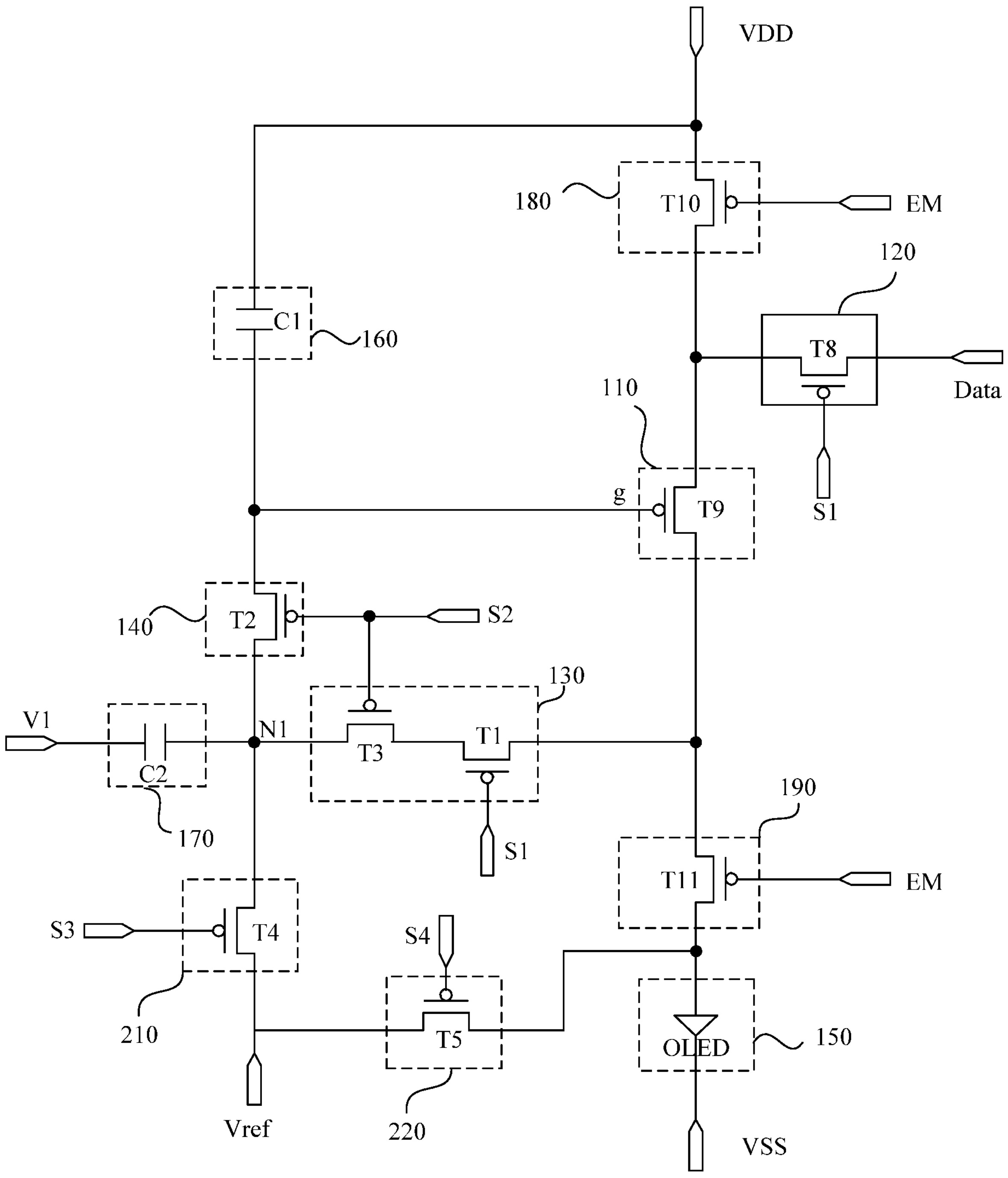
FIG. 7 is a schematic structural diagram of another pixel circuit according to an embodiment of the present application.

Optionally, FIG. 7 is a schematic structural diagram of another pixel circuit according to an embodiment of the present application. Referring to FIG. 7, on the basis of the above-described technical schemes, the first compensation module 130 further includes a third transistor T3, a gate of the third transistor T3 is connected to the second scan line S2, a first electrode of the third transistor T3 is connected to the second electrode of the first transistor T1, and a second electrode of the third transistor T3 is connected to a second electrode of the second transistor T2. Unlike the pixel circuit shown in FIG. 5, the first transistor T1 and the second transistor T2 are connected to different scan signal lines, and the second transistor T2 and the third transistor T3 are connected to the same scan signal line. The first transistor T1 may be a double-gate transistor or a single-gate transistor. Optionally, similar to the embodiment shown in FIG. 5, the fourth transistor T4 may be a double-gate transistor, that is, the fourth transistor T4 includes two sub-transistors, and the short-circuited gates of the two sub-transistors are connected to the third scan line S3. The pixel circuit shown in FIG. 7 in this embodiment is also applicable to the control timing shown in FIG. 6, which may be referred to the related description of the above-described embodiments, and will not be described here in detail.

Optionally, the first compensation module may include a first transistor, the second compensation module may include a second transistor, the second transistor includes a double-gate transistor, and the double-gate transistor includes a first sub-transistor and a second sub-transistor. A first electrode of the first transistor is connected to the first terminal of the drive module, a second electrode of the first transistor is connected to a second electrode of the second sub-transistor, a first electrode of the second sub-transistor is connected to a second electrode of the first sub-transistor, and a first electrode of the first sub-transistor is connected to the control terminal of the drive module. A gate of the first transistor is connected to a first scan line, and a gate of the second transistor is connected to a second scan line. The coupling module includes a third capacitor. A first electrode of the third capacitor is connected to the jump voltage or the fixed voltage, and a second electrode of the third capacitor is connected to the second electrode of the second sub-transistor.

Optionally, the coupling module may further include a second capacitor, a first electrode of the second capacitor is configured to receive the pulse voltage, and a second electrode of the second capacitor is connected to the second electrode of the first sub-transistor. The first compensation module may further include a third transistor, a gate of the third transistor is connected to the second scan line, a first electrode of the third transistor is connected to the second electrode of the first transistor, and a second electrode of the third transistor is connected to a second electrode of the second transistor. In a case where the first electrode of the third capacitor is configured to receive the fixed voltage, the fixed voltage is a first power supply voltage on a first power supply line or an initialization voltage on an initialization signal line. In a case where the first electrode of the third capacitor is configured to receive the jump voltage, the jump voltage is a pulse voltage.

Figure 8:
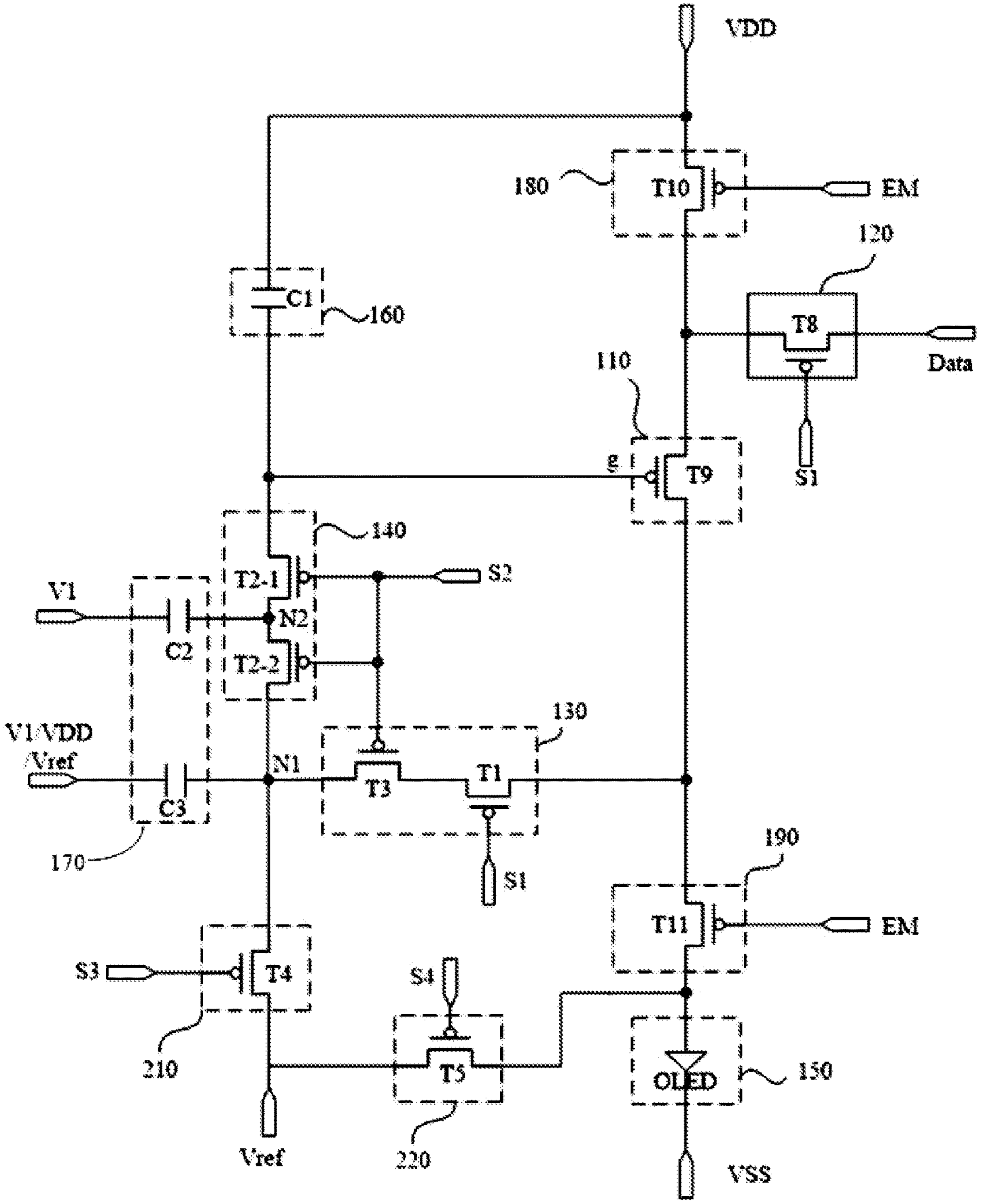
FIG. 8 is a schematic structural diagram of another pixel circuit according to an embodiment of the present application.

Optionally, FIG. 8 is a schematic structural diagram of another pixel circuit according to an embodiment of the present application. Referring to FIG. 8, on the basis of the above-described technical schemes, the second compensation module 140 includes a second transistor T2, the second transistor T2 is a double-gate transistor, and the second transistor T2 includes a first sub-transistor T2-1 and a second sub-transistor T2-2. A first electrode of the first transistor T1 is connected to the first terminal of the drive module 110, a second electrode of the first transistor T1 is connected to a second electrode of the second sub-transistor T2-2, a first electrode of the second sub-transistor T2-2 is connected to a second electrode of the first sub-transistor T2-1, and a first electrode of the first sub-transistor T2-1 is connected to the control terminal g of the drive module 110. The coupling module 170 includes a second capacitor C2 and a third capacitor C3, a first electrode of the second capacitor C2 is connected to the pulse voltage, and a second electrode of the third capacitor C3 is connected to the second electrode of the first sub-transistor T2-1. As shown in FIG. 8, a first electrode of the third capacitor C3 is connected to the pulse voltage or the fixed voltage. When the first electrode of the third capacitor C3 is connected to the fixed voltage, for example, the first electrode of the third capacitor C3 is connected to the first power supply voltage VDD on the first power supply line or the initialization voltage Vref on the initialization signal line, since the fixed voltage does not jump, the third capacitor C3 can maintain the stability of the potential of the first node N1, and a second electrode of the third capacitor C3 is connected to the second electrode of the second sub-transistor T2-2. On the basis of the structure of the pixel circuit shown in FIG. 8, the fourth transistor T4 may also be a double-gate transistor. Referring to FIGS. 6 and 8, the operation process of the pixel circuit provided in the embodiments of the present application may include an initialization stage TM1, a data write and threshold compensation stage TM2, a compensation adjustment stage TM3, and a light-emitting stage TM4.

In the initialization stage TM1, the first initialization module 210 and the second initialization module 220 transmit the initialization voltage Vref supplied from the initialization signal line to the control terminal g of the drive module 110 and the light-emitting module 150, respectively, to achieve the initialization of the control terminal g of the drive module 110 and the light-emitting module 150. At a moment t1, the light-emitting control signal EM, the first scan signal S1, the second scan signal S2, the third scan signal S3 and the fourth scan signal S4 are all high levels, the first transistor T1, the second transistor T2, the fourth transistor T4, the fifth transistor T5, the eighth transistor T8, the ninth transistor T9, the tenth transistor T10 and the eleventh transistor T11 are all in an off state, and a gate voltage of the ninth transistor T9 maintains a state of a previous frame. At a moment t2, a falling edge of the second scan signal S2 arrives, and the second transistor T2 and the third transistor T3 are turned on, so that part of charges of the gate g of the ninth transistor T9 can be released, and the voltage of the gate g of the ninth transistor T9 is reduced. At a moment t3, falling edges of the third scan signal S3 and the fourth scan signal S4 arrive, the fourth transistor T4 and the fifth transistor T5 are turned on, and the initialization voltage Vref is transmitted to the gate g of the ninth transistor T9 and the first electrode (anode) of the organic light-emitting diode OLED, respectively, so that potential initialization of the gate g of the ninth transistor T9 and the first electrode of the organic light-emitting diode OLED is completed.

In the data write and threshold compensation stage TM2, the data write module 120, the first compensation module 130 and the second compensation module 140 are respectively responsive to the corresponding scan signals, to enable the data voltage to be written into the gate g of the ninth transistor T9, and to enable the threshold compensation of the ninth transistor T9. At a moment t4, the fourth transistor T4 and the fifth transistor T5 are turned off in response to the high-level signal, a falling edge of the first scan signal S1 arrives, the first transistor T1 and the eighth transistor T8 are turned on in response to the low-level first scan signal S1, the data voltage on the data line Data is transmitted to the gate g of the ninth transistor T9, and the threshold compensation of the ninth transistor T9 is achieved by the first transistor T1 and the second transistor T2, and at this time, the gate voltage of the ninth transistor T9 is Vdata+Vth', and the first capacitor C1 stores the compensated gate voltage.

In the compensation adjustment stage TM3, the pulse voltage is coupled to the first node N1 through the coupling module 170 to adjust finely the gate voltage of the ninth transistor T9. When the second capacitor C2 and the third capacitor C3 are both connected to the pulse voltage, at a moment t5, a rising edge of the second scan signal S2 arrives, the second transistor T2 and the third transistor T3 are turned off, and after a moment t6, the pulse voltage is jumped from the high level to the low level, the second capacitor C2 couples a voltage change amount of the first electrode of the second capacitor C2 to the second electrode, and the third capacitor C3 couples the voltage change amount of the first electrode of the third capacitor C3 to the second electrode. According to the charge conservation principle, voltages of the first node N1 and the second node N2 change, so that there is a voltage difference between the gate g of the ninth transistor T9 and the first node N1, and there is a voltage difference between the gate g of the ninth transistor T9 and the second node N2. Due to the electric leakage action of the first sub-transistor T2-1 and the second sub-transistor T2-2, so that the gate voltage of the ninth transistor T9 is changed with respect to the first node N1 or the second node N2 to achieve a fine-adjusting effect, and the gate voltage of the ninth transistor T9 is changed, whereby the drive current is changed, a phenomenon that the drive current is not uniform due to incomplete compensation of the threshold voltage Vth of the ninth transistor T9 is compensated, and further, the compensation effect is improved, and the uniformity of display brightness is ensured.

Optionally, when the first electrode of the third capacitor C3 is connected to the fixed voltage, for example, the first electrode of the third capacitor C3 is connected to the first power supply voltage VDD or the initialization voltage Vref, since the fixed voltage does not jump, the third capacitor C3 can maintain the stability of the potential of the first node N1, thereby reducing the electric leakage between the control terminal g of the drive module 110 and the second compensation module 140, and facilitating fine adjustment of the voltage of the control terminal g of the drive module 110 by the voltage change of the second node N2.

In the light-emitting stage TM4, the light-emitting control signal EM is at a low level, the tenth transistor T10 and the eleventh transistor T11 are turned on, the first transistor T1, the second transistor T2, the fourth transistor T4, the fifth transistor T5 and the eighth transistor T8 are turned off, and the ninth transistor T9 generates a drive current to drive the organic light-emitting diode OLED to emit light. As can be seen from the above analysis, since the threshold compensation effect is improved, the drive current at the same gray scale is kept to be consistent at the low gray scale, and thus, the uniformity of display brightness is improved. Moreover, the compensation effect is achieved by adjusting finely the gate voltage of the ninth transistor T9 after the threshold voltage of the ninth transistor T9 is compensated, so that a problem of the subthreshold swing fluctuation of the ninth transistor T9 can be solved, and the threshold compensation effect is improved.

In this embodiment, the first transistor T1 and the fourth transistor T4 may be double-gate transistors, so as to reduce the electric leakage, which is conductive to maintaining the stability of the gate voltage of the ninth transistor T9, and preventing the flicker phenomenon caused by unstable drive current of the organic light-emitting diode OLED.

In this embodiment, the fourth scan signal S4 and the third scan signal S3 are the same signal, are provided by the same scan line, which is capable of saving a number of scan lines, and advantageously improving a pixels per inch (PPI). Of course, in other embodiments, the fourth scan signal S4 may also be the same as the first scan line signal S1, and is provided by the first scan signal line, which is likewise capable of saving a number of scan lines, and completing the initialization operation on the first electrode of the organic light-emitting diode OLED at the same time of data write in the operation process of the pixel circuit.

Figure 9:
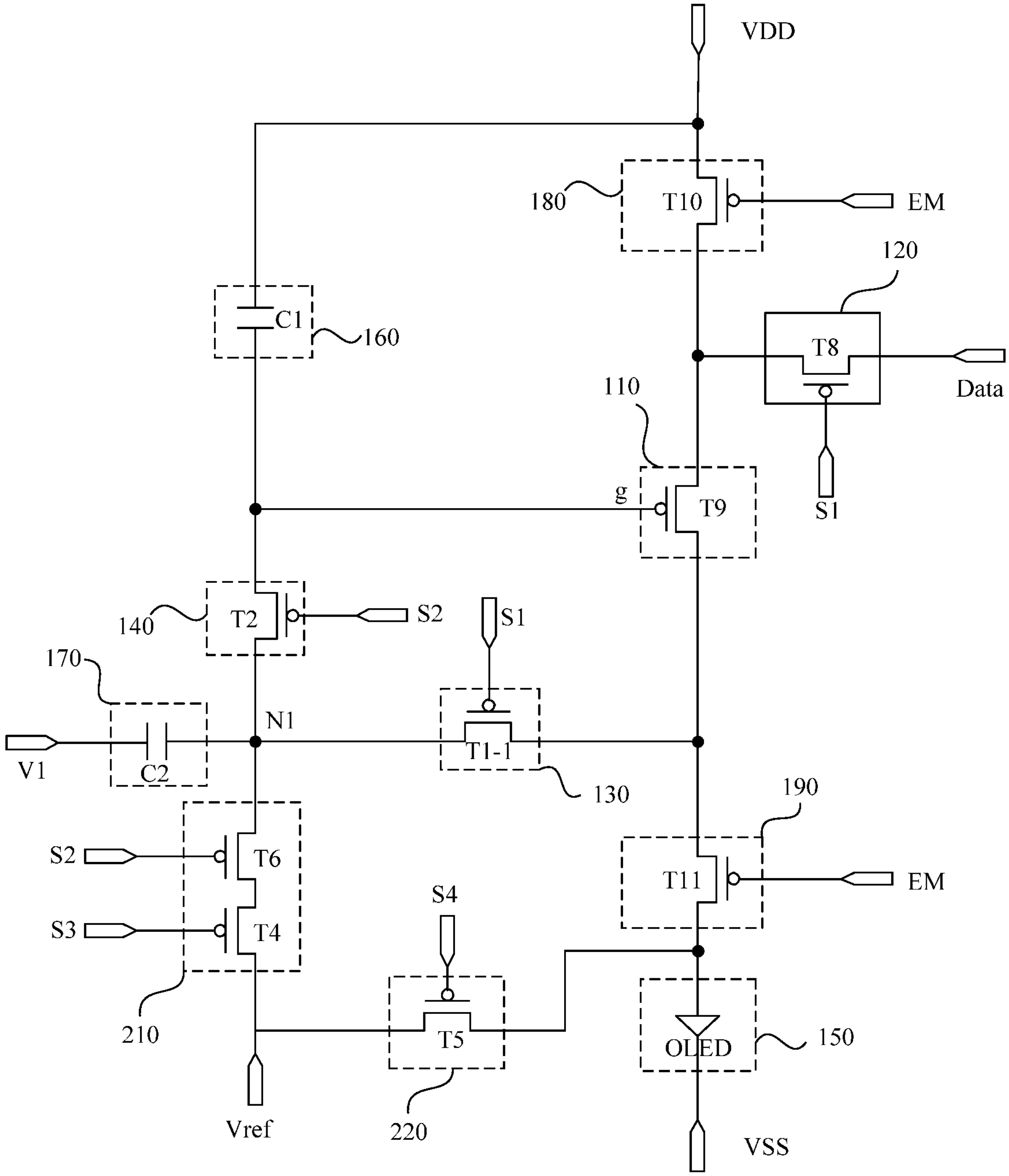
FIG. 9 is a schematic structural diagram of another pixel circuit according to an embodiment of the present application.

Optionally, FIG. 9 is a schematic structural diagram of another pixel circuit according to an embodiment of the present application. Referring to FIG. 9, on the basis of each of the above-described technical schemes, the first initialization module 210 further includes a sixth transistor T6, a gate of the sixth transistor T6 is connected to the second scan line S2, a first electrode of the sixth transistor T6 is connected to the second electrode of the fourth transistor T4, and a second electrode of the sixth transistor T6 is connected to the second electrode of the second transistor T2. The pixel circuit shown in FIG. 9 is also applicable to the control timing shown in FIG. 6, when the second scan signal S2 is at a low level, the second transistor T2 and the sixth transistor T6 are turned on simultaneously, and the operation principle thereof is similar to that described above and will not be described here in detail.

In this embodiment, the technical schemes provided in FIG. 8 and FIG. 9 may be combined, and the operation principle thereof may be referred to the related description of each of the above-described technical schemes, and will not be described here in detail.

Figure 10:
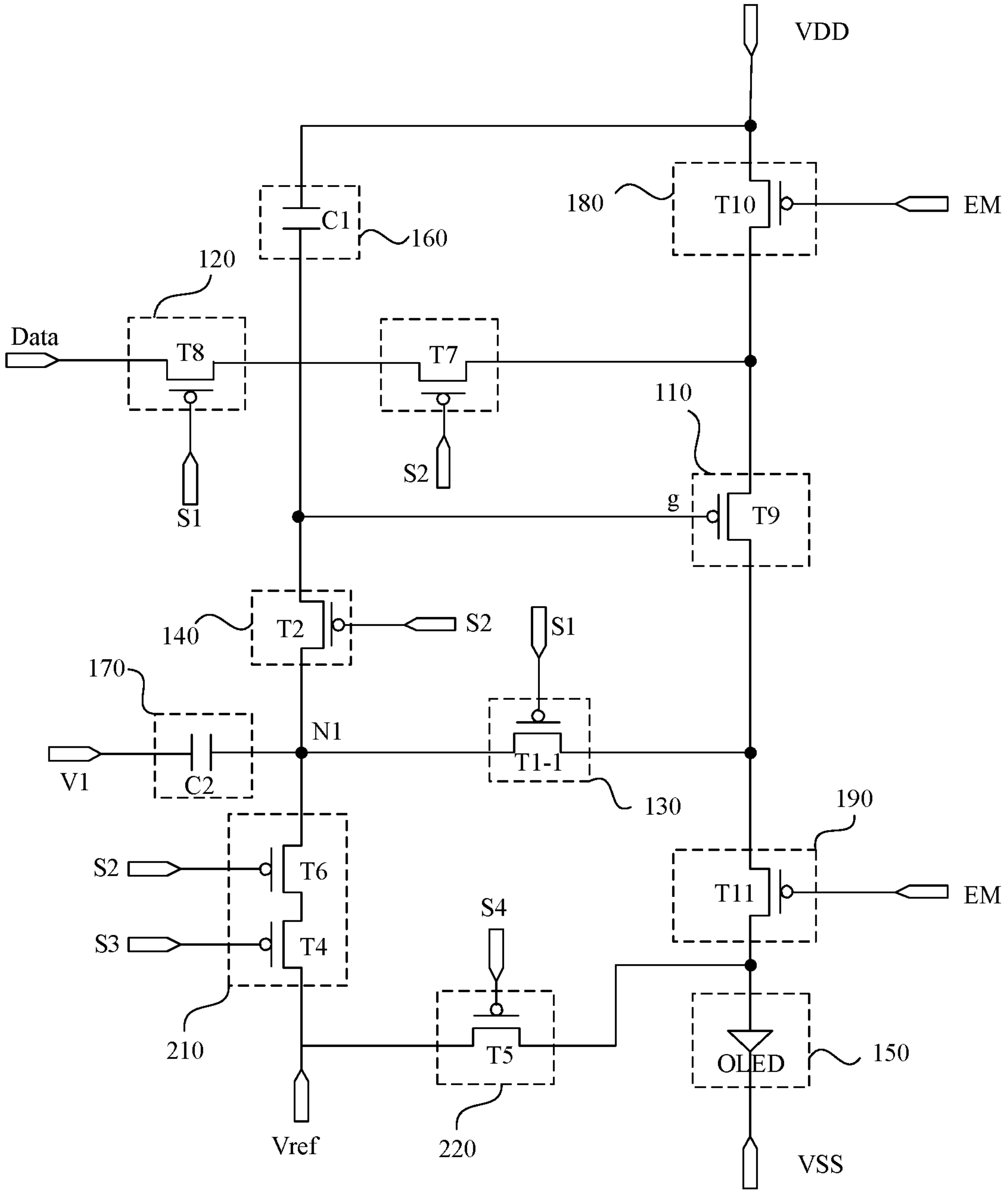
FIG. 10 is a schematic structural diagram of another pixel circuit according to an embodiment of the present application.

Optionally, FIG. 10 is a schematic structural diagram of another pixel circuit according to an embodiment of the present application. Referring to FIG. 10, on the basis of each of the above-described technical schemes, the pixel circuit according to the embodiment of the present application further includes a seventh transistor T7, and the data write module 120 includes an eighth transistor T8. A gate of the seventh transistor T7 is connected to the second scan line S2, a second electrode of the seventh transistor T7 is connected to the second terminal of the drive module 110, a first electrode of the seventh transistor T7 is connected to a second electrode of the eighth transistor T8, a first electrode of the eighth transistor T8 is connected to the data line Data, and a gate of the eighth transistor T8 is connected to the first scan line S1. The seventh transistor T7, the second transistor T2 and the sixth transistor T6 are all connected to the second scan line S2. In this embodiment, the seventh transistor T7 and the sixth transistor T6 do not affect the operation process of the pixel circuit. In the layout overall arrangement, the difficulty of the manufacturing process can be reduced by increasing the transistors, and thus the overall arrangement of the layout can be improved. Optionally, a position of the seventh transistor T7 and a position of the eighth transistor T8 are interchanged. The data write module 120 includes an eighth transistor T8. The gate of the seventh transistor T7 is connected to the second scan line S2, the first electrode of the seventh transistor T7 is connected to the data line Data, the second electrode of the seventh transistor T7 is connected to a first electrode of the eighth transistor T8, a second electrode of the eighth transistor T8 is connected to the second terminal of the drive module 110, and a gate of the eighth transistor T8 is connected to the first scan line S1.

Optionally, the first terminal of the coupling module 170 is not connected to the jump voltage V1 but connected to the fixed voltage VDD. Since the circuit of the fixed voltage VDD is simpler with respect to the jump voltage, the effect of simplifying the pixel circuit can be achieved.

It should be understood that the technical schemes provided in any of the embodiments of the present application can be combined with each other, so that the compensation effect can be improved, and the uniformity of display brightness can be improved.

Figure 11:
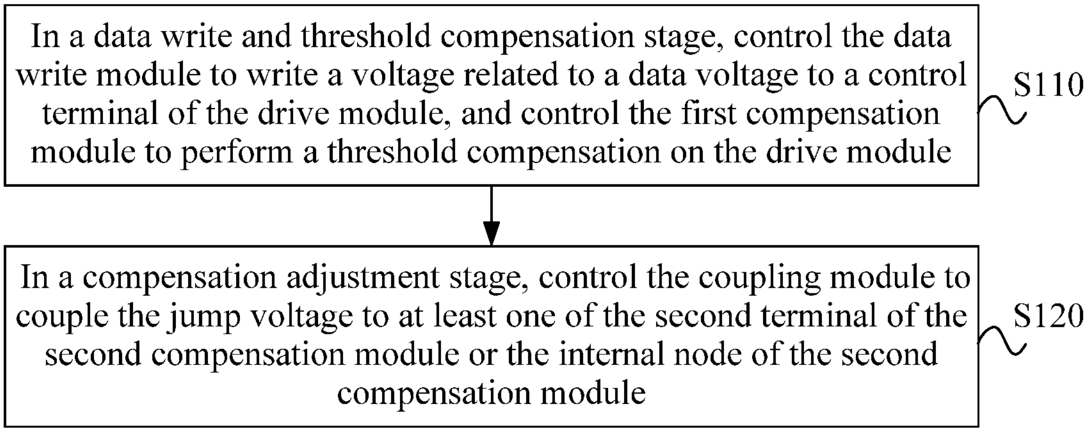
FIG. 11 is a flowchart of a driving method for a pixel circuit according to an embodiment of the present application.

Optionally, an embodiment of the present application further provides a driving method for a pixel circuit. FIG. 11 is a flowchart of a driving method for a pixel circuit according to an embodiment of the present application. Referring to FIGS. 1 and 11, the pixel circuit includes a drive module 110, a data write module 120, a first compensation module 130, a second compensation module 140, a light-emitting module 150, a storage module 160 and a coupling module 170. The data write module 120 is connected to the drive module 110, a first terminal of the second compensation module 140 is connected to the control terminal g of the drive module 110, a second terminal of the second compensation module 140 is connected to a first terminal of the first compensation module 130, a second terminal of the first compensation module 130 is connected to the first terminal of the drive module 110, the storage module 160 is connected to the control terminal g of the drive module 110, a first terminal of the coupling module 170 is configured to receive the jump voltage, a second terminal of the coupling module 170 is connected to the second terminal of the second compensation module 140 or an internal node of the second compensation module 140.

The driving method for a pixel circuit provided in the embodiments of the present application includes steps described below.

In S110, in a data write and threshold compensation stage, the data write module is controlled to write a voltage related to a data voltage to a control terminal of the drive module, and the first compensation module is controlled to perform a threshold compensation on the drive module.

In S120, in a compensation adjustment stage, the coupling module is controlled to couple the jump voltage to at least one of the second terminal of the second compensation module or the internal node of the second compensation module.

The driving method for the pixel circuit is applicable to the pixel circuit provided in any of the embodiments of the present application. A control method for the pixel circuit may be referred to the related description described above, and will not be described here in detail.

According to the driving method for the pixel circuit provided in the embodiments of the present application, after a threshold voltage of the drive module is compensated, the coupling module is configured to couple the jump voltage to the at least one of the second terminal of the second compensation module or the internal node of the second compensation module, so as to change a potential of the second terminal of the second compensation module or the internal node of the second compensation module. Since the second compensation module is connected to the control terminal of the drive module, when the potential of the second terminal or the internal node of the second compensation module is changed, a potential of the control terminal of the drive module can be adjusted finely, so as to improve the threshold compensation effect, so that in a case of the low gray scale, the drive module can, under the action of the fine adjustment of the voltage of the control terminal of the drive module, ensure that drive currents generated by different pixel circuits under a same gray scale voltage are the same, whereby the light-emitting brightness of the light-emitting module is the same, and thus the uniformity of brightness is improved, which is conductive to improving the display effect.

Referring to FIG. 5 and FIG. 9, the pixel circuit further includes a first initialization module 210, a second initialization module 220, a first light-emitting control module 180 and a second light-emitting control module 190. A control terminal of the first initialization module 210 is connected to the third scan line S3, a first terminal of the first initialization module 210 is connected to the initialization signal line Vref, a second terminal of the first initialization module 210 is connected to a second terminal of the second compensation module 140, a control terminal of the second initialization module 220 is connected to a fourth scan line S4, a first terminal of the second initialization module 220 is connected to the initialization signal line Vref, and a second terminal of the second initialization module 220 is connected to the first terminal of the light-emitting module 150. A control terminal of the first light-emitting control module 180 and a control terminal of the second light-emitting control module 190 are both connected to a light-emitting control signal line EM, a first terminal of the first light-emitting control module 180 is connected to a first power supply line VDD, a second terminal of the first light-emitting control module 180 is connected to a second terminal of the drive module 110, a first terminal of the second light-emitting control module 190 is connected to a first terminal of the drive module 110, a second terminal of the second light-emitting control module 190 is connected to a first terminal of the light-emitting module 150, and a second terminal of the light-emitting module 150 is connected to a second power supply line VSS. The control terminal of the data write module 120 is connected to the first scan line S1, the control terminal of the first compensation module 130 is connected to the first scan line S1 or the second scan line S2, and the control terminal of the second compensation module 140 is connected to the second scan line S2.

The first compensation module 130 includes a first transistor T1, the second compensation module 140 includes a second transistor T2, the first initialization module 210 includes a fourth transistor T4, the second initialization module 220 includes a fifth transistor T5, the data write module 120 includes an eighth transistor T8, the drive module 110 includes a ninth transistor T9, the first light-emitting control module 180 includes a tenth transistor, the second light-emitting control module 190 includes an eleventh transistor T11, the storage module 160 includes a first capacitor C1, and the coupling module 170 includes a second capacitor C2. In conjunction with the control timing of FIG. 6, the driving method for the pixel circuit includes steps described below.

In the initialization stage TM1, the third scan signal S3 output from the third scan line controls the first initialization module 210 to be turned on, and the fourth scan signal S4 output from the fourth scan line controls the second initialization module 220 to be turned on. The first initialization module 210 and the second initialization module 220 transmit the initialization voltage Vref supplied from the initialization signal line to the control terminal g of the drive module 110 and the light-emitting module 150, respectively, to achieve the initialization of the control terminal g of the drive module 110 and the light-emitting module 150. At a moment t1, the light-emitting control signal EM, the first scan signal S1, the second scan signal S2, the third scan signal S3 and the fourth scan signal S4 are all high levels, the first transistor T1, the second transistor T2, the fourth transistor T4, the fifth transistor T5, the eighth transistor T8, the ninth transistor T9, the tenth transistor T10 and the eleventh transistor T11 are all in an off state, and a gate voltage of the ninth transistor T9 maintains a state of a previous frame. At a moment t2, a falling edge of the second scan signal S2 arrives, the second transistor T2 and the first transistor T1 are turned on (in this embodiment, the first transistor T1 may be connected to the first scan line S1 or may be connected to the second scan line S2), so that part of charges of the gate g of the ninth transistor T9 can be released, and the voltage of the gate g of the ninth transistor T9 is reduced. At a moment t3, falling edges of the third scan signal S3 and the fourth scan signal S4 arrive, the fourth transistor T4 and the fifth transistor T5 are turned on, and the initialization voltage Vref is transmitted to the gate g of the ninth transistor T9 and the first electrode (anode) of the organic light-emitting diode OLED, respectively, so that potential initialization of the gate g of the ninth transistor T9 and the first electrode of the organic light-emitting diode OLED is completed.

In the data write and threshold compensation stage TM2, the first scan signal S1 output from the first scan line controls the data write module 120 to be turned on, the first scan signal S1 output from the first scan line or the second scan signal S2 output from the second scan line controls the first compensation module 130 to be turned on, and the second scan signal S2 output from the second scan line controls the second compensation module 140 to be turned on. The data write module 120, the first compensation module 130 and the second compensation module 140 are respectively responsive to the corresponding scan signals, to enable the data voltage to be written into the gate g of the ninth transistor T9, and to enable the threshold compensation of the ninth transistor T9. At a moment t4, the fourth transistor T4 and the fifth transistor T5 are turned off in response to the high-level signal, a falling edge of the first scan signal S1 arrives, the eighth transistor T8 is turned on in response to the low-level first scan signal S1, the data voltage on the data line Data is transmitted to the gate g of the ninth transistor T9, and the threshold compensation of the ninth transistor T9 is achieved by the first transistor T1 and the second transistor T2, and at this time, the gate voltage of the ninth transistor T9 is Vdata+Vth', and the first capacitor C1 stores the compensated gate voltage.

Since the turn-on time of the eighth transistor T8 is short, the threshold voltage Vth of the ninth transistor T9 is not completely compensated, and is only compensated by Vth'. That is, at this time, the gate voltage of the ninth transistor T9 is raised (the threshold voltage Vth of the ninth transistor T9 is a negative value). As can be seen from the formula of the drive current, when the gate voltage of the ninth transistor T9 is increased, the drive current is decreased, so that the display brightness is decreased, and thus the uniformity of brightness is affected.

In the compensation adjustment stage TM3, the first scan signal S1 output from the first scan line or the second scan signal S2 output from the second scan line controls the first compensation module 130 to be turned off, the second scan signal S2 output from the second scan line controls the second compensation module 140 to be turned off, and the coupling module 170 couples the jump voltage V1 to at least one of the second terminal of the second compensation module 140 or the internal node of the second compensation module 140. The jump voltage V1 is coupled to the first node N1 through the coupling module 170 to adjust finely the gate voltage of the ninth transistor T9. In this embodiment, the jump voltage V1 is a pulse voltage, and a pulse of its voltage signal follows a pulse on the second scan signal S2 transmitted by the second scan line. At a moment t5, a rising edge of the second scan signal S2 arrives, the second transistor T2 is turned off, and after a moment t6, a falling edge of the pulse signal arrives, the pulse voltage is jumped from the high level to the low level, and the second capacitor C2 couples the pulse voltage to the second electrode according to the voltage change amount of the first electrode thereof. According to the charge conservation principle, a voltage of the first node N1 is decreased, so that there is a voltage difference between the gate g of the ninth transistor T9 and the first node N1. Due to the electric leakage action of the second transistor T2, the gate voltage of the ninth transistor T9 is enabled to be adjusted finely by the voltage of the first node N1, so that the gate voltage of the ninth transistor T9 is reduced to increase the drive current, thereby compensating for the reduction of the drive current due to incomplete compensation of the threshold voltage Vth of the ninth transistor T9, improving the compensation effect, and ensuring the uniformity of display brightness.

Figure 12:
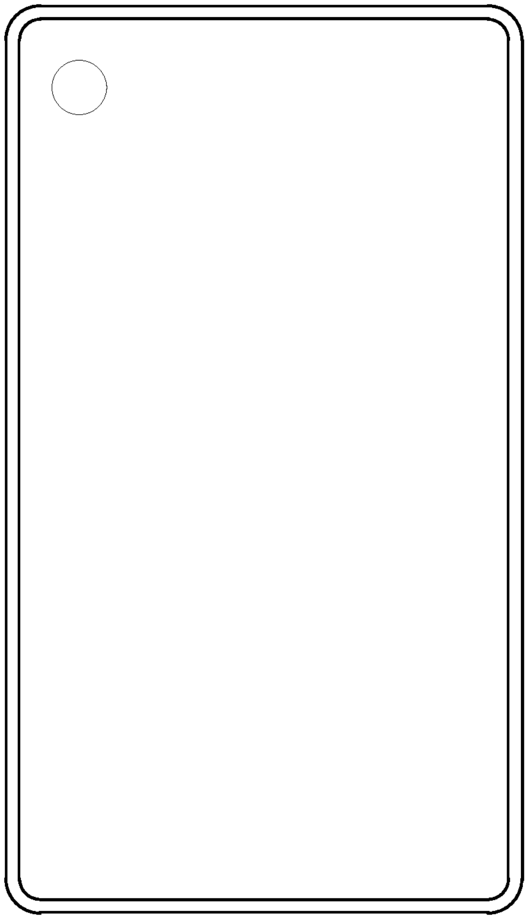
FIG. 12 is a schematic structural diagram of a display panel according to an embodiment of the present application.

In the light-emitting stage TM4, the light-emitting control signal EM output from the light-emitting control signal line controls the first light-emitting control module 180 and the second light-emitting control module 190 to be turned on. The ninth transistor T9 generates a drive current to drive the organic light-emitting diode OLED to emit light. As can be seen from the above analysis, since the threshold compensation effect is improved, the drive current at the same gray scale is kept to be consistent at the low gray scale, and thus, the uniformity of display brightness is improved. Moreover, the compensation effect is achieved by adjusting finely the gate voltage of the ninth transistor T9 after the threshold voltage of the ninth transistor T9 is compensated, so that a problem of the subthreshold swing fluctuation of the ninth transistor T9 can be solved, and the threshold compensation effect is improved. Optionally, an embodiment of the present application further provides a display panel including the pixel circuit provided in the embodiments of the present application. FIG. 12 is a schematic structural diagram of a display panel according to an embodiment of the present application. The display panel may be applied to a tablet computer, a mobile phone, a watch, a wearable apparatus, and other display-related apparatuses such as an in-vehicle display, a camera display, a television, and a computer screen.

Figure 13:
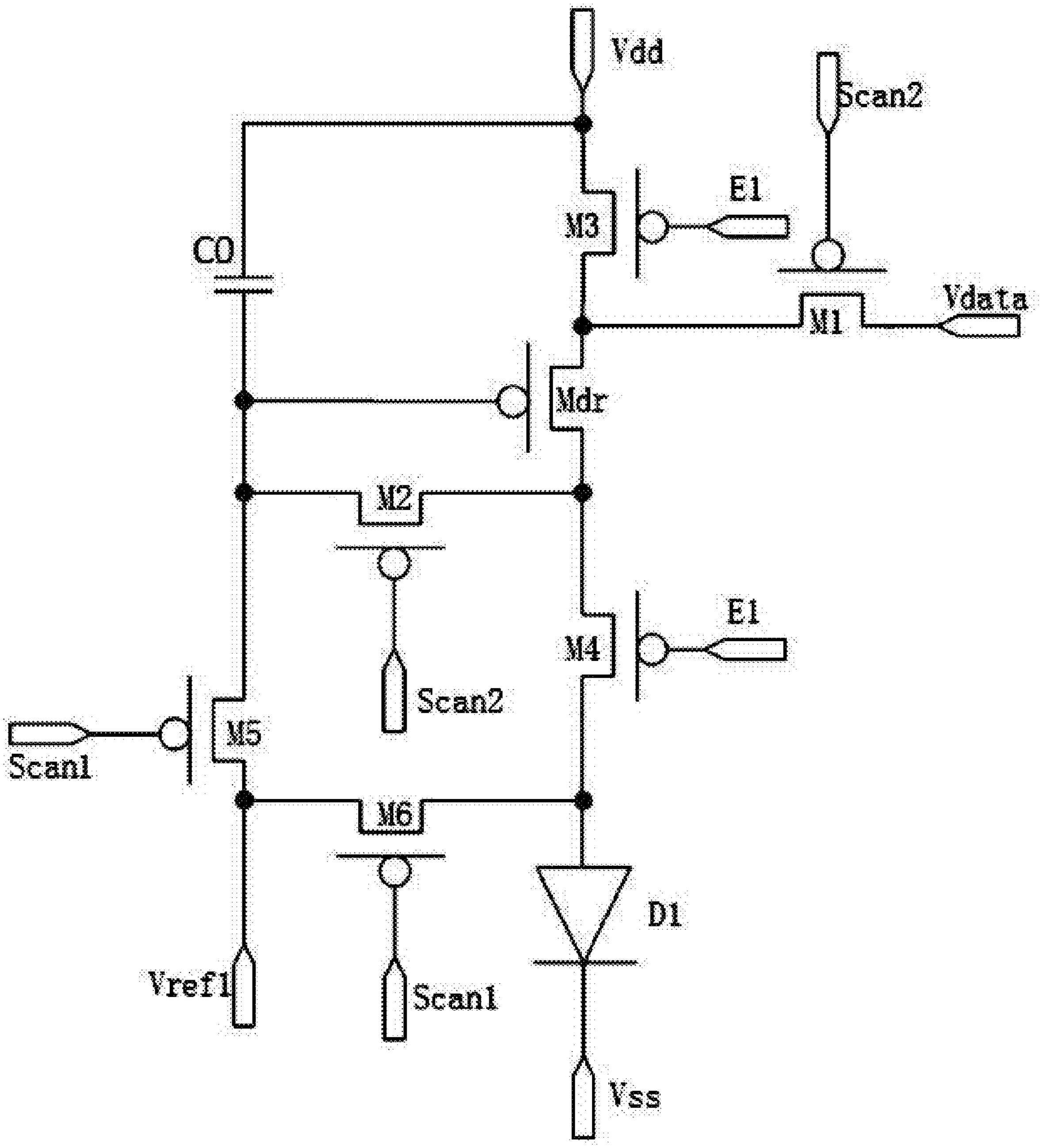
FIG. 13 (prior art)
FIG. 13 is a schematic structural diagram of a pixel circuit in the related art.

FIG. 13 is a schematic structural diagram of a pixel circuit in the related art. As shown in FIG. 13, the pixel driving circuit includes a drive transistor Mdr, a first switch transistor M1, a second switch transistor M2, a third switch transistor M3, a fourth switch transistor M4, a fifth switch transistor M5, a sixth switch transistor M6, a capacitor C0 and a light-emitting device D1. The drive transistor Mdr, the first switch transistor M1, the second switch transistor M2, the third switch transistor M3, the fourth switch transistor M4, the fifth switch transistor M5 and the sixth switch transistor M6 are exemplarily shown as P-type transistors. A first electrode of the fifth switch transistor is connected to a reference voltage signal line Vref1, and a first electrode of the first switch transistor M1 is connected to a data signal line Vdata. In an operation process of the pixel driving circuit, in the light-emitting stage, a first scan signal supplied from a first scan signal input terminal Scan1 is at a high level, a second scan signal supplied from a second scan signal input terminal Scan2 is at a high level, and a light-emitting control signal supplied from a light-emitting control signal input terminal E1 is at a low level. At this time, the third switch transistor M3 and the fourth switch transistor M4 are turned on, and the third switch transistor M3 outputs a first power supply voltage supplied from the first power supply line Vdd to a source of the drive transistor Mdr. A cathode of the light-emitting device D1 is electrically connected to a second power supply line Vss, and at this time, the drive transistor Mdr supplies a drive current to the light-emitting device D1 to drive the light-emitting device D1 to emit light. In the light-emitting stage, the second switch transistor M2 and the fifth switch transistor M5 are turned off, but there is still an electric leakage between the second switch transistor M2 and the fifth switch transistor M5, two leakage paths make a voltage at a gate of the drive transistor Mdr to be decreased, thereby causing a change in the drive current output by the drive transistor Mdr, and resulting in a problem that the light-emitting device D1 flickers when the light-emitting device D1 emits light.

Figure 14:
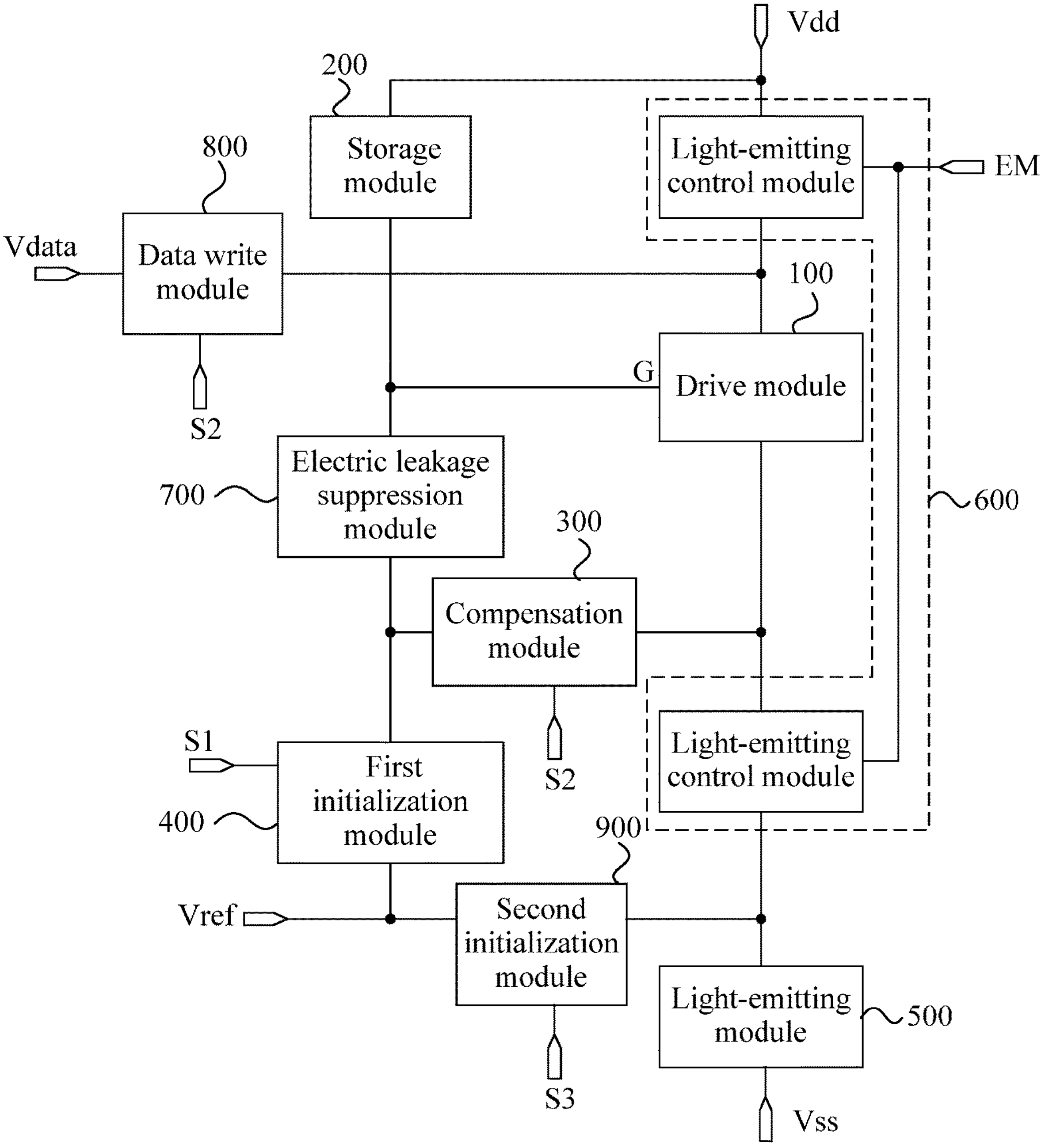
FIG. 14 is a schematic structural diagram of a pixel circuit according to another embodiment of the present application.

An embodiment of the present application provides a pixel circuit. FIG. 14 is a schematic structural diagram of a pixel circuit according to another embodiment of the present application. Referring to FIG. 14, the pixel circuit includes a drive module 100, a storage module 200, a compensation module 300, a first initialization module 400, a light-emitting module 500, a light-emitting control module 600, an electric electric leakage suppression module 700 and a data write module 800. The storage module 200 is connected to the control terminal G of the drive module 100, and the storage module 200 is configured to store a voltage of the control terminal G of the drive module 100. The light-emitting control module 600, the drive module 100 and the light-emitting module 500 are connected between the first power supply line Vdd and the second power supply line Vss, and the light-emitting control module 600 is configured to control the light-emitting module 500 to emit light according to a drive signal output by the drive module 100 according to the signal on the light-emitting control signal line EM. A first terminal of the first initialization module 400 is connected to the initialization signal line Vref, a second terminal of the first initialization module 400 is connected to the control terminal G of the drive module 100 through the electric leakage suppression module 700, and the first initialization module 400 is configured to write an initialization voltage supplied from the initialization signal line Vref to the control terminal G of the drive module 100 according to a signal on the first scan line S1. A first terminal of the compensation module 300 is connected to a first terminal of the drive module 100, a second terminal of the compensation module 300 is connected to the control terminal G of the drive module 100 through the electric leakage suppression module 700, and the compensation module 300 is configured to perform a threshold compensation on the drive module 100 according to a signal on the second scan line S2. The electric leakage suppression module 700 is configured to suppress the electric leakage of the storage module 200.

The pixel circuit further includes a second initialization module 900, a first terminal of the data write module 800 is connected to the data signal line Vdata, a second terminal of the data write module 800 is connected to the second terminal of the drive module 100, a control terminal of the data write module 800 is connected to the second scan line S2, and the data write module 800 is configured to write a data voltage supplied from the data signal line Vdata to the drive module 100 according to the signal on the second scan line S2. That is, the data write module 800 may be turned on or off according to the signal on the second scan line S2. When the data write module 800 is turned on, the data voltage supplied from the data signal line Vdata is transmitted to the drive module 100 through the turned-on data write module 800, and the voltage is written to the control terminal of the drive module through the transmission path of the drive module, the compensation module and the leakage suppression module. A first terminal of the second initialization module 900 is connected to the initialization signal line Vref, a second terminal of the second initialization module 900 is connected to a first terminal of the light-emitting module 500, and the second initialization module 900 is configured to write the initialization voltage supplied from the initialization signal line Vref to the first terminal of the light-emitting module 500 according to a signal on the third scan line S3.

Exemplarily, the light-emitting module 500 may be an organic light-emitting diode (OLED), an anode of the OLED serves as the first terminal of the light-emitting module 500, and a cathode of the OLED serves as the second terminal of the light-emitting module 500. The light-emitting module 500 emits light according to a drive signal output by the drive module 100, where the drive signal may be a drive current output by the drive module 100 according to a voltage at the control terminal G and the second terminal of the drive module 100.

Exemplarily, the operation process of the pixel circuit may include three stages. In a first stage (initialization stage), the signal on the first scan line S1 controls the first initialization module 400 to be turned on, and the initialization voltage supplied from the initialization signal line Vref is written to the control terminal of the drive module 100 through the first initialization module 400 and the electric leakage suppression module 700, and the initialization of the control terminal G of the drive module 100 is achieved in the first stage. In a second stage (data voltage write and threshold compensation stage), the signal transmitted from the first scan line S1 controls the first initialization module 400 to be turned off, the signal on the second scan line S2 controls the data write module 800 and the compensation module 300 to be turned on, and the data voltage supplied from the data signal line Vdata is written to the control terminal G of the drive module 100 through the data write module 800, the drive module 100, the compensation module 300 and the electric leakage suppression module 700. Since the compensation module 300 may compensate a threshold of the drive module 100, so that the voltage at the control terminal of the drive module 100 may include a voltage associated with the data voltage and the threshold voltage, thereby achieving the write and threshold compensation of the data voltage of the drive module 100. Optionally, the signal of the third scan line S3 may be the same as the signal of the second scan line S2. In the second stage, the signal on the third scan line S3 controls the second initialization module 900 to be turned on, and the initialization voltage supplied from the initialization signal line Vref is written to the first terminal of the light-emitting module 500 through the second initialization module 900. In the second stage, the initialization of the first terminal of the light-emitting module 500 is achieved, so that the influence of charge remaining at the first terminal of the light-emitting module 500 on the display effect is avoided. In a third stage (light-emitting stage), the signal on the first scan line S1 controls the first initialization module 400 to be turned off, the signal on the second scan line S2 controls the data write module 800 and the compensation module 300 to be turned off, the signal on the third scan line S3 controls the second initialization module 900 to be turned off, the signal on the light-emitting control signal line EM controls the light-emitting control module 600 to be turned on, the light-emitting control module 600 is configured to transmit a first power supply voltage on the first power supply line Vdd to the second terminal of the drive module 100, and the drive module 100 is configured to output the drive signal to drive the light-emitting module 500 to emit light.

In this embodiment, the electric leakage current suppression module is arranged between the control terminal of the drive module and a common terminal of the compensation module and the first initialization module, so as to suppress the electric leakage of the storage module. In comparison with the related art, the storage module may leak electricity through two paths, i.e., the compensation module and the first initialization module. The storage module in this embodiment only leaks electricity through the leakage suppression module, that is, there is only one electric leakage path, so that the electric leakage path and the magnitude of the leakage current are reduced, the stability of the voltage of the control terminal of the drive module is maintained, the voltage holding rate of the control terminal of the drive module is improved, and a phenomenon that the light-emitting module flickers upon emitting light due to the change in the current of the drive module is improved.

Figure 15:
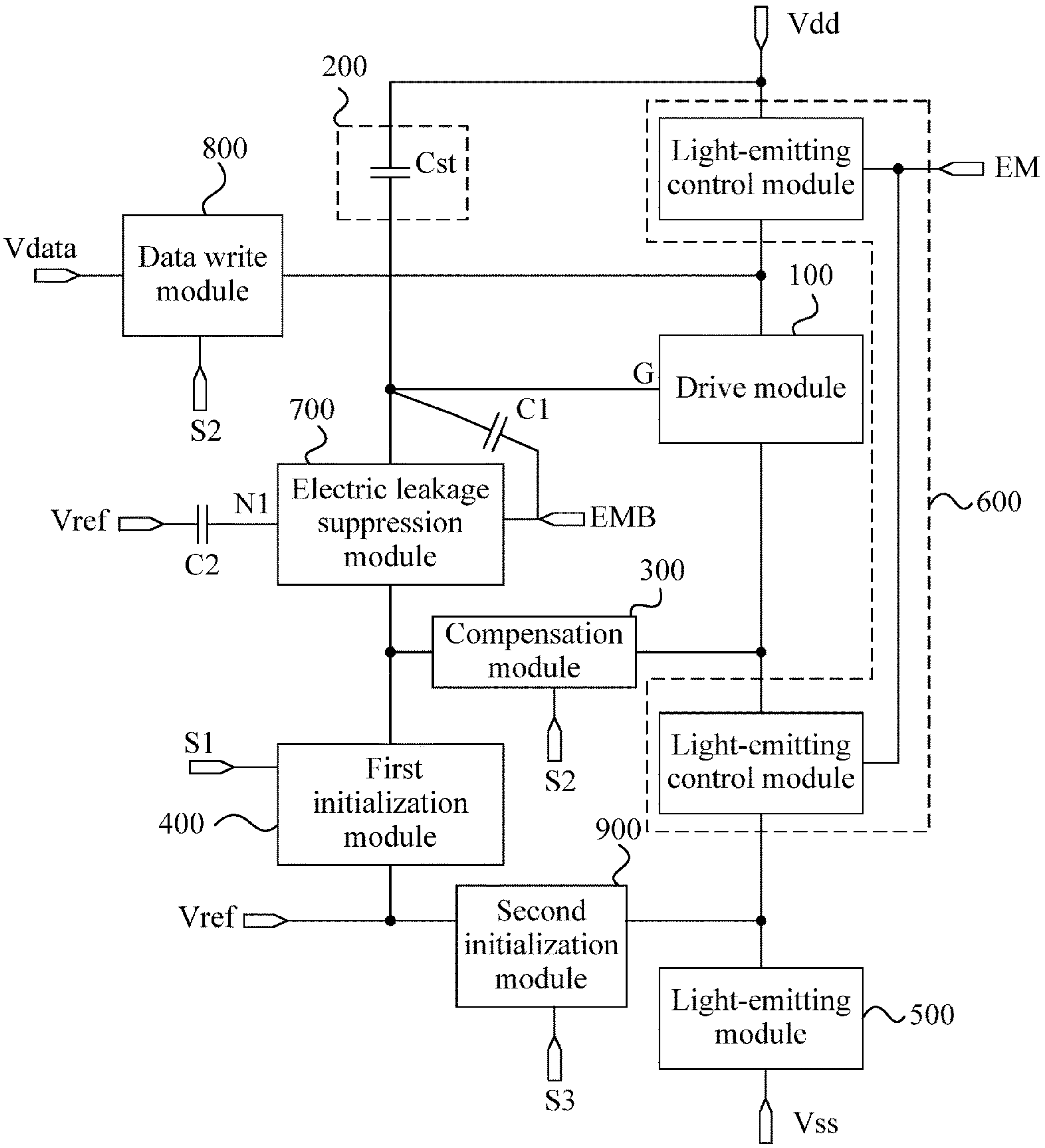
FIG. 15 is a schematic structural diagram of another pixel circuit according to another embodiment of the present application.

FIG. 15 is a schematic structural diagram of another pixel circuit according to another embodiment of the present application. Referring to FIG. 15, optionally, at least one of a node of an internal device of the first initialization module 400, a node of the internal device of the electric leakage suppression module 700, a node connected to the first initialization module 400, a node connected to the control terminal G of the drive module 100, and a node connected to the compensation module 300 is connected to a voltage stabilizing capacitor.

Exemplarily, the pixel circuit in this embodiment includes two voltage stabilizing capacitors, i.e., a first voltage stabilizing capacitor C1 and a second voltage stabilizing capacitor C2. The control terminal of the electric leakage suppression module 700 is connected to an electric leakage control signal line EMB. A first terminal of the first voltage stabilizing capacitor C1 is connected to the control terminal G of the drive module 100, and a second terminal of the first voltage stabilizing capacitor C1 is connected to the electric leakage control signal line EMB. A first terminal of the second voltage stabilizing capacitor C2 is connected to the node N1 of the internal device of the electric leakage suppression module 700, and a second terminal of the second voltage stabilizing capacitor C2 is connected to the initialization signal line Vref. The electric leakage suppression module 700 may include a transistor, the transistor may be a double-gate transistor, and the node N1 of the internal device of the electric leakage suppression module 700 may be a double-gate node of the double-gate transistor.

The first voltage stabilizing capacitor C1 may stabilize the voltage of the control terminal g of the drive module 100 so that the voltage of the control terminal g is not susceptible to other signal is jumped, and the second voltage stabilizing capacitor C2 may stabilize the voltage at the node N1 of the internal device of the electric leakage suppression module 700 so that a voltage at the node N1 of the internal device of the electric leakage suppression module 700 is not susceptible to other signal jumps. When the electric leakage suppression module 700 is turned on, the voltage of the control terminal g of the drive module 100 is equal to the voltage at the node N1 of the internal device of the electric leakage suppression module 700. After the electric leakage suppression module 700 is turned off, the first voltage stabilizing capacitor C1 and the second voltage stabilizing capacitor C2 maintain the voltage of the control terminal g equal to the voltage at the node N1 of the internal device of the electric leakage suppression module 700. A voltage difference between the control terminal G of the drive module 100 and the node N1 of the internal device of the electric leakage suppression module 700 is the smaller, the leakage current of the electric leakage suppression module 700 is the smaller. Further, the first voltage stabilizing capacitor C1 and the second voltage stabilizing capacitor C2 are provided so that the stability of the voltage at the control terminal of the drive module 100 may be maintained, the voltage holding rate of the control terminal G of the drive module 100 is increased, a phenomenon that the light-emitting module 500 flickers upon emitting light is improved, and the display quality is improved.

With continued reference to FIG. 15, optionally, the storage module 200 includes a storage capacitor Cst, and a capacitor value of the voltage stabilizing capacitor is less than a capacitor value of the storage capacitor Cst.

The voltage stabilizing capacitor is different from the storage capacitor Cst, the storage capacitor Cst needs to store the voltage of the control terminal of the drive module 100, and therefore, the capacitor value of the storage capacitor Cst is large. While the voltage stabilizing capacitor is configured to stabilize a voltage at a node connected to the voltage stabilizing capacitor so as to reduce the magnitude of the leakage current, the capacitor value of the voltage stabilizing capacitor may be smaller and may be less than the capacitor value of the storage capacitor Cst. The capacitor value of the voltage stabilizing capacitor is smaller, so that areas of two plates of the capacitor are smaller, and the layout of the voltage stabilizing capacitor in the circuit is simpler.

Figure 16:
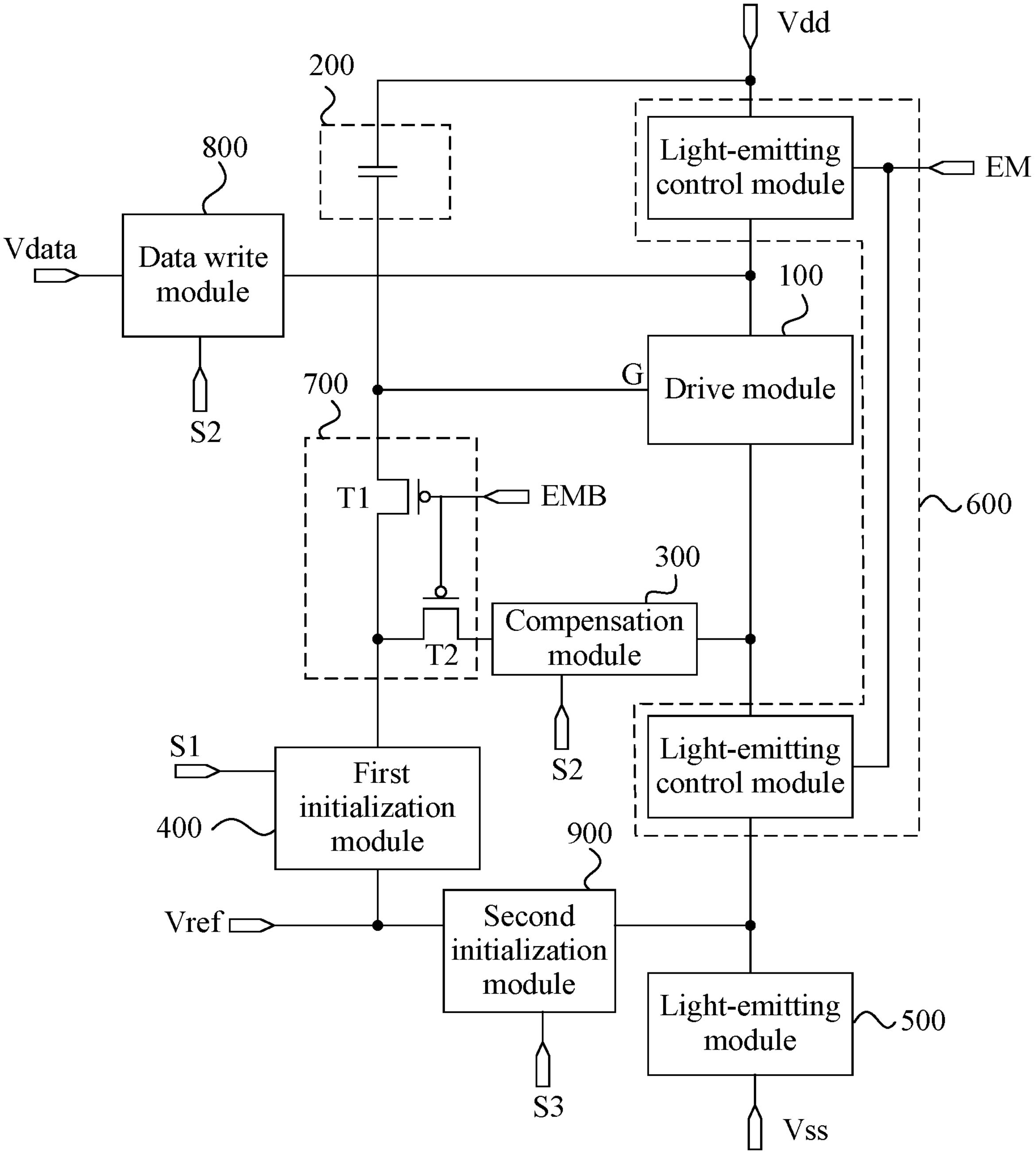
FIG. 16 is a schematic structural diagram of another pixel circuit according to another embodiment of the present application.

FIG. 16 is a schematic structural diagram of another pixel circuit according to another embodiment of the present application. Referring to FIG. 16, optionally, the electric leakage suppression module 700 includes a first transistor T1 and a second transistor T2. A first electrode of the first transistor T1 is connected to the control terminal G of the drive module 100, and a second electrode of the first transistor T1 is connected to a second terminal of the first initialization module 400. A first electrode of the second transistor T2 is connected to the second electrode of the first transistor T1, and a second electrode of the second transistor T2 is connected to a second terminal of the compensation module 300. A gate of the first transistor T1 and a gate of the second transistor T2 are connected to the electric leakage control signal line EMB.

Exemplarily, the first transistor T1 and the second transistor T2 are both P-type transistors. When the signal of the electric leakage control signal line EMB is at a high level, the first transistor T1 and the second transistor T2 are turned off, and when the signal of the electric leakage control signal line EMB is at a low level, the first transistor T1 and the second transistor T2 are turned on. In the first stage of operation of the pixel circuit, the electric leakage control signal line EMB is at a low level, the first transistor T1 and the second transistor T2 are turned on, and the initialization voltage on the initialization signal line Vref is written into the control terminal G of the drive module 100 through the first initialization module 400 and the first transistor T1 which are turned on, so that the initialization of the drive module 100 is achieved. In the second stage, the data voltage on the data signal line Vdata is written to the control terminal of the drive module 100 through the data write module 800, the drive module 100, the compensation module 300, the second transistor T2, and the first transistor T1 which are turned on, so as to achieve the write and threshold compensation of the data voltage.

Only one electric leakage path of the first transistor T1 is present at the control terminal G of the drive module 100 in the pixel circuit of this embodiment, compared to the pixel circuit in FIG. 13, there are two electric leakage paths of the second switch transistor M2 and the fifth switch transistor M5, in the pixel circuit in this embodiment, the electric leakage path is reduced and thus the magnitude of the leakage current is reduced, the magnitude of the change of the voltage of the control terminal G of the drive module 100 is decreased, so that the voltage of the control terminal G of the drive module 100 is stable, the attenuation of the brightness of the light-emitting module 500 within one frame is reduced, further the flicker phenomenon of the light-emitting module 500 is improved, and thus the display quality is improved.

Figure 17:
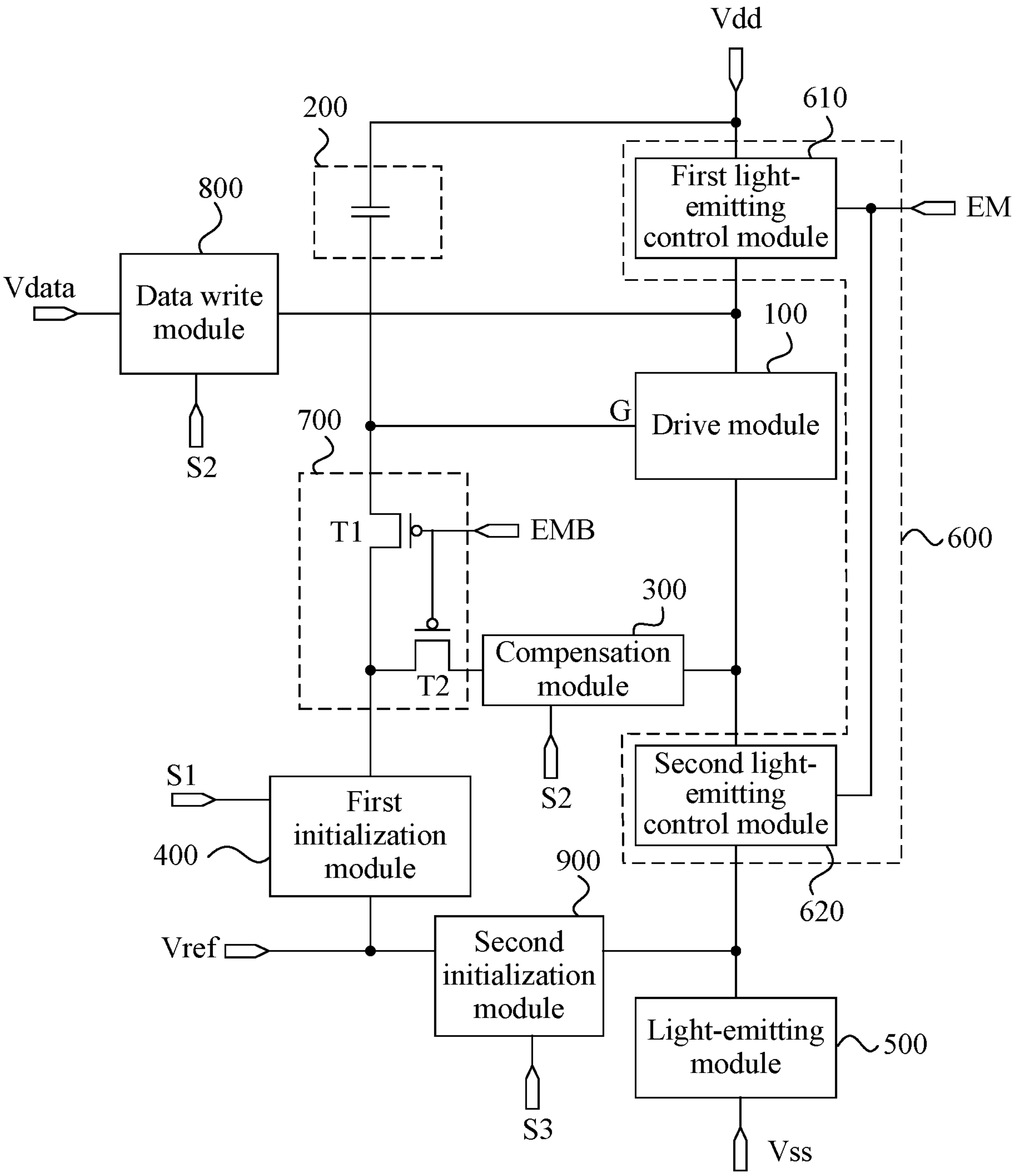
FIG. 17 is a schematic structural diagram of another pixel circuit according to another embodiment of the present application.

FIG. 17 is a schematic structural diagram of another pixel circuit according to another embodiment of the present application. Referring to FIG. 17, optionally, the light-emitting control module 600 includes a first light-emitting control module 610 and a second light-emitting control module 620.

The first light-emitting control module 610 is connected between the first power supply line Vdd and the second terminal of the drive module 100, the second light-emitting control module 620 is connected between the first terminal of the drive module 100 and the first terminal of the light-emitting module 500, the second terminal of the light-emitting module 500 is connected to the second power supply line Vss, and the control terminal of the first light-emitting control module 610 and the control terminal of the second light-emitting control module 620 are connected to the light-emitting control signal line EM.

In the first stage and the second stage of the pixel circuit, the first light-emitting control module 610 and the second light-emitting control module 620 are turned off under the control of the light-emitting control signal line EM. In the third stage, the first light-emitting control module 610 and the second light-emitting control module 620 are turned on under the control of the light-emitting control signal line EM, the first power supply voltage supplied from the first power supply line Vdd is written into the second terminal of the drive module 100 through the first light-emitting control module 610, and the drive module 100 drives the light-emitting module 500 to emit light according to the voltage of the control terminal G of the drive module 100 and the voltage of the second terminal.

Figure 18:
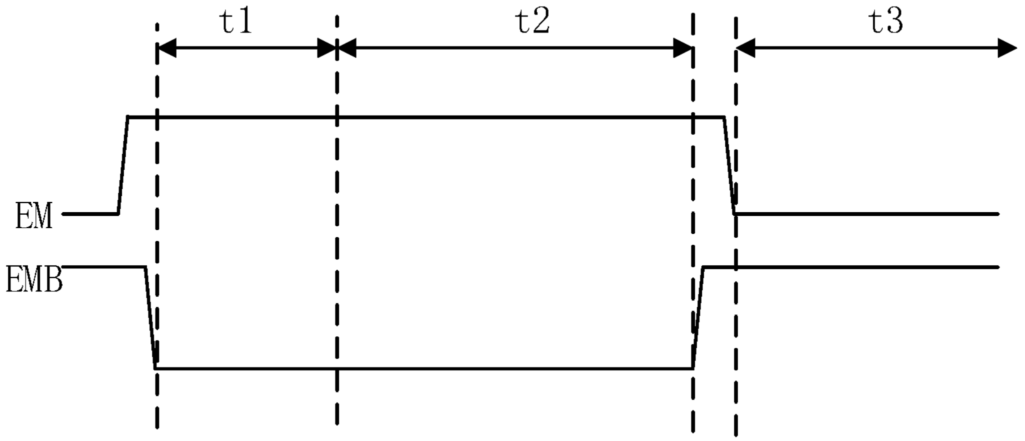
FIG. 18 is a timing diagram of an electric leakage control signal line and a light-emitting control signal line according to another embodiment of the present application.

FIG. 18 is a timing diagram of an electric leakage control signal line and a light-emitting control signal line according to another embodiment of the present application. The timing diagram shown in FIG. 18 is applicable to the pixel circuit shown in FIG. 17. Referring to FIGS. 17 and 18, optionally, within one frame, a time interval of the pulse of the signal on the electric leakage control signal line EMB is within a time interval of the pulse of the signal on the light-emitting control signal line EM.

Exemplarily, the electric leakage suppression module 700 is turned on when the signal on the electric leakage control signal line EMB is at a low level, and is turned off when the signal on the electric leakage control signal line EMB is at a high level. The light-emitting control module 600 is turned on when the signal on the light-emitting control signal line EM is at a low level, and is turned off when the signal on the light-emitting control signal line EM is at a high level. In the first stage t1 and the second stage t2, the signal on the light-emitting control signal line EM is at a high level, the light-emitting control module 600 is turned off, the signal on the electric leakage control signal line EMB is at a low level, and the electric leakage suppression module 700 is turned on, so that in the first stage t1, the initialization voltage is written into the control terminal G of the drive module 100 through the electric leakage suppression module 700, and in the second stage t2, the data voltage is written into the control terminal G of the drive module 100 through the electric leakage suppression module 700. An on-time interval of the electric leakage suppression module 700 is located in an off-time interval of the light-emitting control module 600, so that the light-emitting control module 600 is in the off-state in the first stage t1 and the second stage t2 in which the electric leakage suppression module 700 is turned on, the light-emitting control module 600 is prevented from being turned on in the first stage t1 and the second stage t2, thereby causing the light-emitting module 500 to be turned on. The light-emitting module 500 is lit up when the control terminal G of the drive module 100 has not completed the initialization or the data write and threshold compensation, which affects the display quality. Therefore, the time interval of the pulse of the signal on the electric leakage control signal line EMB is within the time interval of the pulse of the signal on the light-emitting control signal line EM, so that it can be ensured that the light-emitting module 500 is lit up after the drive module completes the initialization, the data write and threshold compensation, which is conductive to improving the display quality.

With continued reference to FIGS. 17 and 18, optionally, the signal on the electric leakage control signal line EMB and the signal on the light-emitting control signal line EM are inverted signals.

Exemplarily, both the electric leakage suppression module 700 and the light-emitting control module 600 are P-type transistors. In the first stage t1, the signal on the electric leakage control signal line EMB is at a low level, the signal on the light-emitting control signal line EM is at a high level, the electric leakage suppression module 700 is turned on, the light-emitting control module 600 is turned off, and the initialization voltage on the initialization signal line Vref is written into the control terminal G of the drive module 100 through the electric leakage suppression module 700. In the second stage t2, the signal on the electric leakage control signal line EMB is at a low level, the signal on the light-emitting control signal line EM is at a high level, the electric leakage suppression module 700 is turned on, the light-emitting control module 600 is turned off, and the data voltage on the data signal line Vdata is written into the control terminal G of the drive module 100 through the electric leakage suppression module 700. In the third stage t3, the signal on the electric leakage control signal line EMB is at a high level, the signal on the light-emitting control signal line EM is at a low level, the electric leakage suppression module 700 is turned off, the light-emitting control module 600 is turned on, the first power supply voltage on the first power supply line Vdd is transmitted to the second terminal of the drive module 100 through the first light-emitting control module 610, and the drive module 100 drives the light-emitting module 500 to emit light according to the voltage of the control terminal G and the voltage of the second terminal thereof. The light-emitting control signal line EM is generally connected to a light-emitting control driver circuit located in the left and right frame regions of the display panel, and the light-emitting control driver circuit may be constituted by a cascaded shift register. The signal on the electric leakage control signal line EMB and the signal on the light-emitting control signal line EM are inverted signals. Only an inverter is arranged at an output terminal of the light-emitting control driver circuit, and the signal output by the light-emitting control driver circuit is output to the electric leakage control signal line EMB through the inverted signal of the inverter. Therefore, a scan circuit composed of a complex shift register for the electric leakage control signal line EMB does not need to be designed, so that the circuit device in the frame region of the display panel can be reduced, and the design of the narrow frame of the display panel can be easily achieved.

Figure 19:
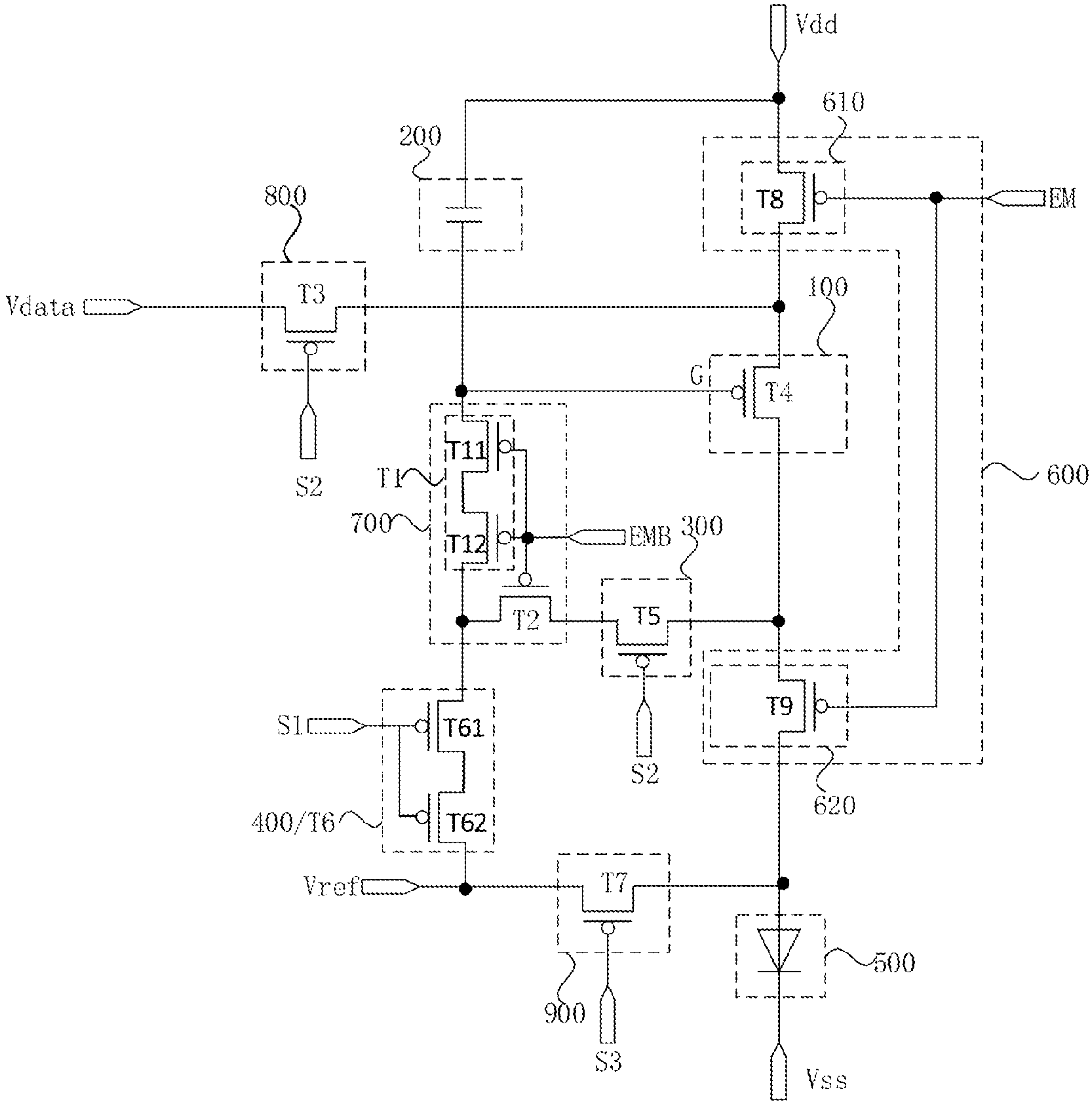
FIG. 19 is a schematic structural diagram of another pixel circuit according to another embodiment of the present application.

FIG. 19 is a schematic structural diagram of another pixel circuit according to another embodiment of the present application. Referring to FIG. 19, optionally, the pixel circuit further includes a data write module 800 and a second initialization module 900. The data write module includes a third transistor T3, and the drive module 100 includes a fourth transistor T4. The compensation module 300 includes a fifth transistor T5, and the first initialization module 400 includes a sixth transistor T6. The second initialization module 900 includes a seventh transistor T7. The first light-emitting control module 610 includes an eighth transistor T8, and the second light-emitting control module 620 includes a ninth transistor T9. A first electrode of the third transistor T3 is connected to the data signal line Vdata, a second electrode of the third transistor T3 is connected to the second terminal of the drive module 100, and a gate of the third transistor T3 is connected to the second scan line S2. A first electrode of the fourth transistor T4 serves as the second terminal of the drive module 100, a second electrode of the fourth transistor T4 serves as the first terminal of the drive module 100, and a gate of the fourth transistor T4 serves as the control terminal G of the drive module 100. A first electrode of the fifth transistor T5 serves as the first terminal of the compensation module 300, a second electrode of the fifth transistor T5 serves as the second terminal of the compensation module 300, and a gate of the fifth transistor T5 is connected to the second scan line S2. A first electrode of the sixth transistor T6 serves as the first terminal of the first initialization module 400, a second electrode of the sixth transistor T6 serves as the second terminal of the first initialization module 400, and a gate of the sixth transistor T6 is connected to the first scan line S1. A first electrode of the seventh transistor T7 is connected to the initialization signal line Vref, a second electrode of the seventh transistor T7 is connected to the first terminal of the light-emitting module 500, and a gate of the seventh transistor T7 is connected to the third scan line S3. A first electrode of the eighth transistor T8 is connected to the first power supply line Vdata, a second electrode of the eighth transistor T8 is connected to the first electrode of the fourth transistor T4, and a gate of the eighth transistor T8 is connected to the light-emitting control signal line EM. A first terminal of the ninth transistor T9 is connected to a second terminal of the fourth transistor T4, a second terminal of the ninth transistor T9 is connected to the first terminal of the light-emitting module 500, and a gate of the ninth transistor T9 is connected to the light-emitting control signal line EM. The first transistor T1 and the sixth transistor T6 are double-gate transistors.

Exemplarily, the first transistor T1 includes a first double-gate transistor T11 and a second double-gate transistor T12, and the sixth transistor T6 includes a third double-gate transistor T61 and a fourth double-gate transistor T62. The first transistor T1, the second transistor T2, the third transistor T3, the fourth transistor T4, the fifth transistor T5, the sixth transistor T6, the seventh transistor T7, the eighth transistor T8 and the ninth transistor T9 may be P-type transistors or N-type transistors, which is not specifically limited here in this embodiment. An example in which each of the transistors described above is a P-type transistor will be described exemplarily.

Figure 20:
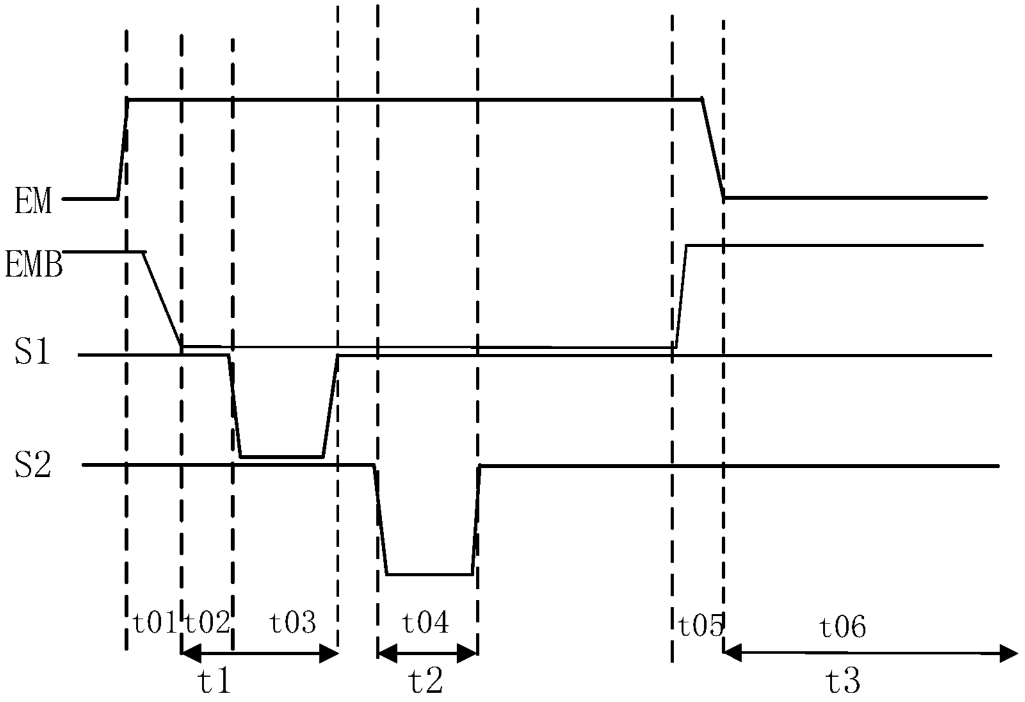
FIG. 20 is a timing diagram of a pixel circuit according to another embodiment of the present application.

FIG. 20 is a timing diagram of a pixel circuit according to another embodiment of the present application. The timing diagram shown in FIG. 20 is applicable to the pixel circuit of FIG. 19, and is described by using an example in which the third scan line S3 and the second scan line S2 have the same signal. Referring to FIGS. 19 and 20, the first stage t1 includes a second sub-stage t02, a third sub-stage t03, a second stage t2 includes a fourth sub-stage t04, and a third stage t3 includes a sixth sub-stage t06.

In the first sub-stage t01, the signal on the light-emitting control signal line EM is raised to a high level, and the eighth transistor T8 and the ninth transistor T9 are turned off. In the second sub-stage t02, the signal on the electric leakage control signal line EMB is dropped to be at a low level, and the first transistor T1 and the second transistor T2 are turned on. In the third sub-stage t03, the signal on the first scan line S1 is at a low level, and the sixth transistor T6 is turned on. In the third sub-stage t03, the initialization voltage supplied from the initialization signal line Vref is transmitted to the gate of the fourth transistor T4 through the sixth transistor T6 and the first transistor T1, and then the gate of the fourth transistor T4 is reset. After the reset is completed, the signal on the first scan line S1 is raised to be at a high level, and the sixth transistor T6 is turned off. In the first stage t1, the signal on the light-emitting control signal line EM and the signal on the second scan line S2 are at high levels, and the third transistor T3, the fifth transistor T5, the seventh transistor T7, the eighth transistor T8 and the ninth transistor T9 are in an off state.

In the fourth sub-stage t04, the signal on the second scan line S2 is at a low level, the third transistor T3 and the fifth transistor T5 are turned on, the signal on the electric leakage control signal line EMB is at a low level, the first transistor T1 and the second transistor T2 are turned on, and the data voltage on the data signal line Vdata is written to the gate of the fourth transistor T4 through the third transistor T3, the fourth transistor T4, the fifth transistor T5, the second transistor T2 and the first transistor T1, so that the voltage related to the data voltage is written to the gate of the fourth transistor T4 and the threshold voltage of the fourth transistor T4 is compensated. In the fourth sub-stage t04, the signal on the third scan line S3 is the same as the signal on the second scan line S2, and is at a low level, the seventh transistor T7 is turned on, and the initialization voltage supplied from the initialization signal line Vref is transmitted to the first terminal of the light-emitting module 500 through the seventh transistor T7 to reset the first terminal of the light-emitting module 500, thereby avoiding the influence of the charge remaining at the first terminal of the light-emitting module 500 on the display effect.

In the fifth sub-stage t05, the signal on the electric leakage control signal line EMB is raised to a high level, and the first transistor T1 and the second transistor T2 are turned off. In the sixth sub-stage t06, the signal on the first scan line S1 and the signal on the second scan line S2 are at a high level, the third transistor T3, the fifth transistor T5, the sixth transistor T6 and the seventh transistor T7 are turned off, signals on the light-emitting control signal line EM are at a low level, the eighth transistor T8 and the ninth transistor T9 are turned on, the first power supply voltage on the first power supply line Vdd is transmitted to the first electrode of the fourth transistor T4 through the eighth transistor T8, and the fourth transistor T4 drives the light-emitting module 500 to emit light according to the voltage of the gate thereof and the voltage of the first electrode thereof.

Figure 21:
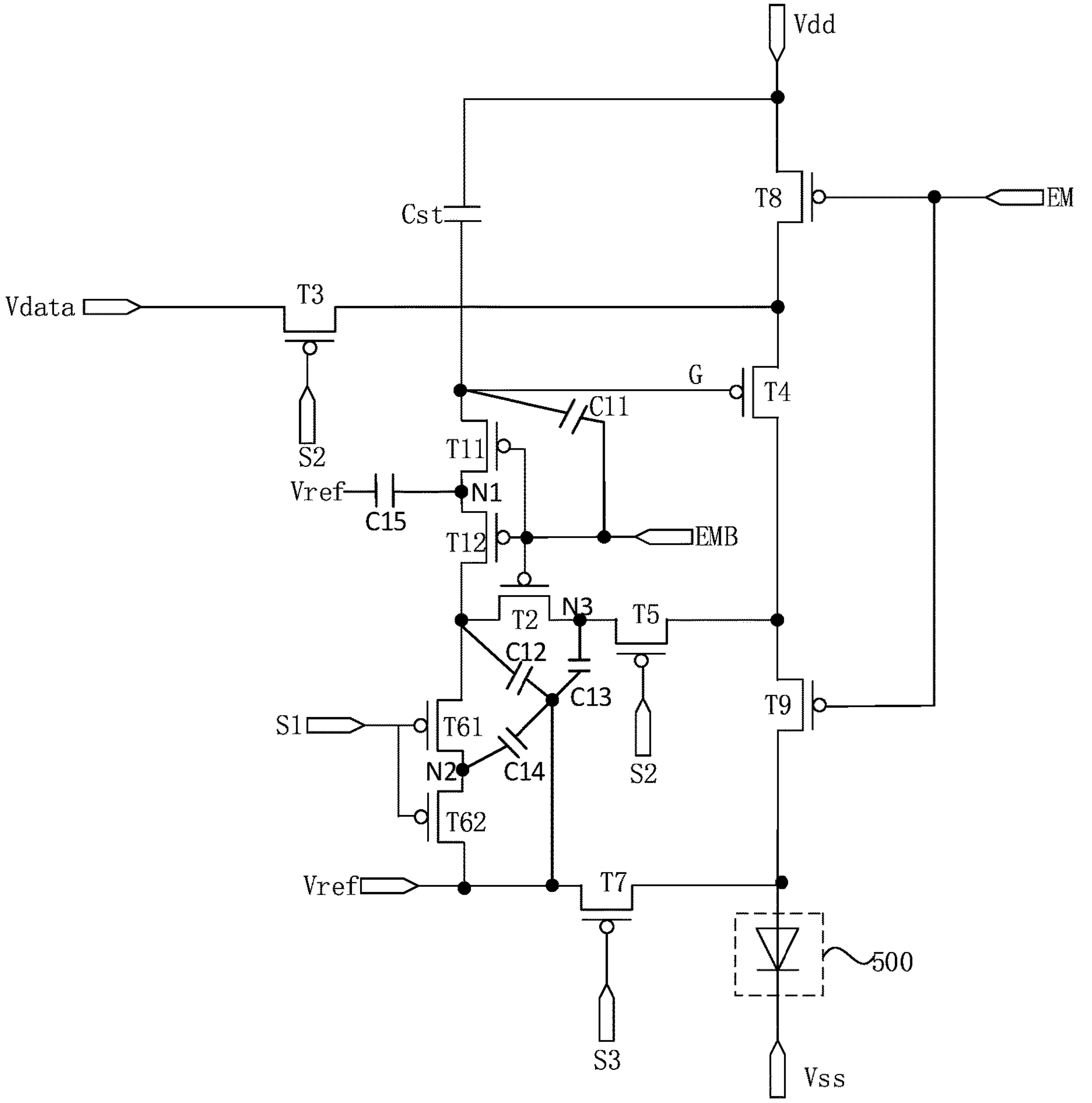
FIG. 21 is a schematic structural diagram of another pixel circuit according to another embodiment of the present application.

FIG. 21 is a schematic structural diagram of another pixel circuit according to another embodiment of the present application. Referring to FIG. 21, optionally, the pixel circuit further includes a first capacitor C11, a second capacitor C12, a third capacitor C13, a fourth capacitor C14 and a fifth capacitor C15.

A first terminal of the first capacitor C11 is connected to the gate of the fourth transistor T4, a second terminal of the first capacitor C11 is connected to the electric leakage control signal line EMB, a first terminal of the second capacitor C12 is connected to the second terminal of the sixth transistor T6, a second terminal of the second capacitor C12 is connected to the initialization signal line Vref, a first terminal of the third capacitor C13 is connected to the second terminal N3 of the second transistor T2, a second terminal of the third capacitor C13 is connected to the initialization signal line Vref, a first terminal of the fourth capacitor C14 is connected to the double-gate node N2 of the sixth transistor T6, a second terminal of the fourth capacitor C14 is connected to the initialization signal line Vref, a first terminal of the fifth capacitor C15 is connected to the initialization signal line Vref, and a second terminal of the fifth capacitor C15 is connected to the double-gate node N1 of the first transistor T1.

In the light-emitting stage, the sizes of the third capacitor C13 and the fourth capacitor C14 are adjusted, so that a voltage of the second electrode N3 of the second transistor T2 is greater than a voltage of the first electrode of the second transistor T2, and the voltage of the first electrode of the second transistor T2 is greater than a voltage of the double-gate node N2 of the sixth transistor T6, the second electrode N3 of the second transistor T2 charges the first electrode of the second transistor T2, the first electrode of the second transistor T2 leaks electricity to the double-gate node N2 of the sixth transistor T6, whereby the charging process of the first electrode of the second transistor T2 is complementary to the electric leakage process, the potential of the first electrode of the second transistor T2 is balanced, the electric leakage of the first electrode of the second transistor T2 is reduced, the voltage holding ratio of the control terminal G of the drive module 100 in the pixel circuit is improved, the flicker phenomenon of the light-emitting module 500 at the low frequency driving is improved, and the display quality is improved.

The first capacitor C11, the second capacitor C12 and the fifth capacitor C15 may stabilize the voltages of the gate of the fourth transistor T4, the double-gate node N1 of the first transistor T1, and the second electrode N3 of the second transistor T2. When the first transistor T1 and the second transistor T2 are turned on, the voltages at the gate of the fourth transistor T4, the double-gate node N1 of the first transistor T1, and the second electrode N3 of the second transistor T2 are equal. Therefore, in the light-emitting stage, after the first transistor T1 and the second transistor T2 are turned off, the first capacitor C11, the second capacitor C12 and the fifth capacitor C15 may maintain the voltages at the gate of the fourth transistor T4, the double-gate node N1 of the first transistor T1, the second electrode N3 of the second transistor T2 equal, further, the electric leakage of the first transistor T1 is reduced, the size of the leakage current of the first transistor T1 is reduced, the stability of the voltage at the gate of the fourth transistor T4 is maintained, the voltage holding ratio of the control terminal G of the drive module 100 in the pixel circuit is improved, the flicker phenomenon of the light-emitting module 500 at the low frequency driving is improved, and the display quality is improved.

Figure 22:
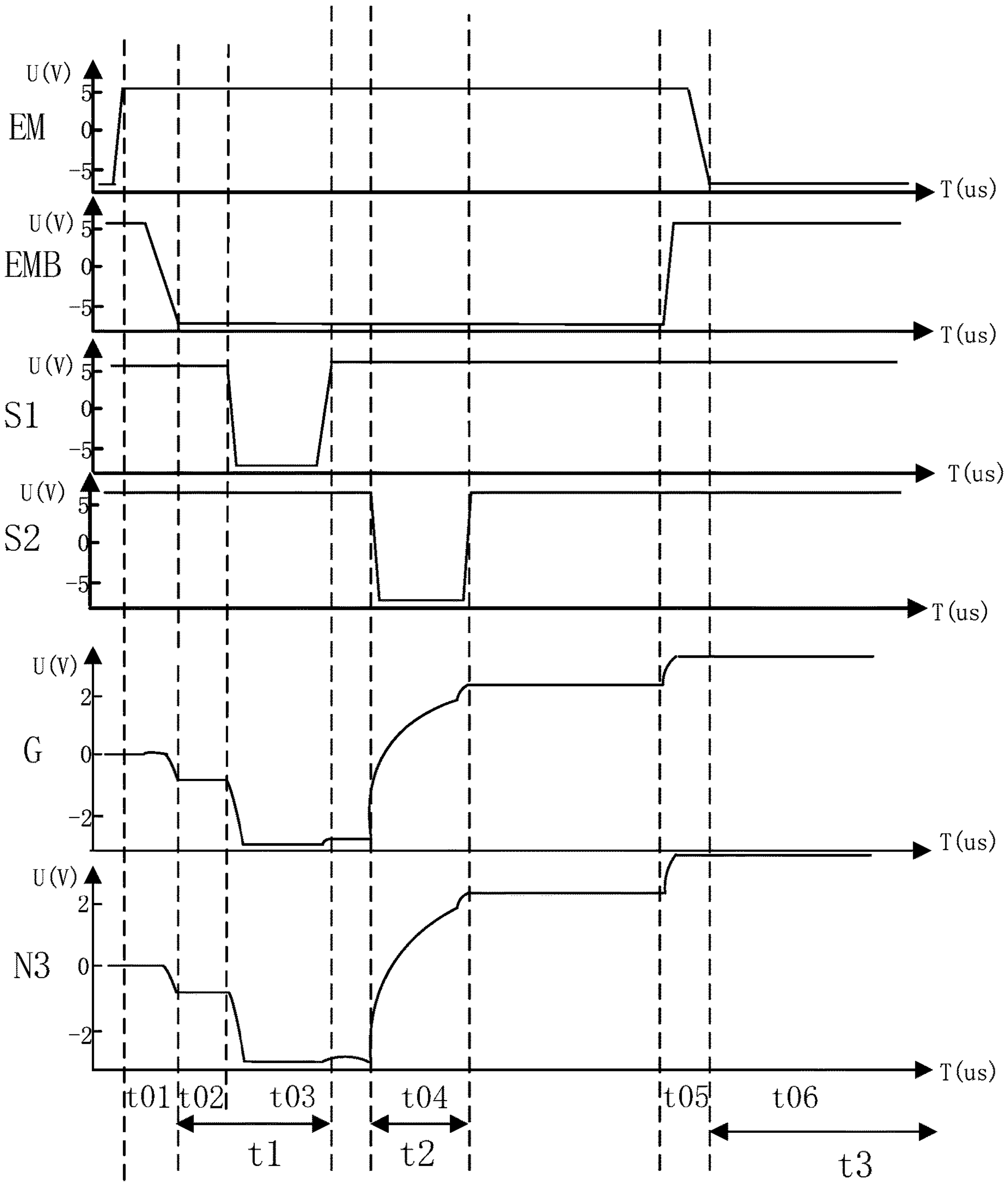
FIG. 22 is a waveform diagram of a simulated signal according to another embodiment of the present application.

FIG. 22 is a waveform diagram of a simulated signal according to another embodiment of the present application. FIG. 22 is a waveform diagram corresponding to the pixel circuit shown in FIG. 21 in operation. It can be seen from FIG. 22 that, in the sixth sub-stage t06, the voltage of the control terminal G (the gate of the fourth transistor T4) of the drive module 100 and the voltage of the second terminal N3 of the second transistor T2 are both maintained in a stable state. It is further explained that the first capacitor C11, the second capacitor C12, the third capacitor C13, the fourth capacitor C14 and the fifth capacitor C15 may maintain the stability of the voltage at the gate of the fourth transistor T4, improve the voltage holding rate of the control terminal G of the drive module 100 in the pixel circuit, improve the flicker phenomenon of the light-emitting module under low-frequency driving, and improve the display quality.

An embodiment of the present application further provides a display panel including the pixel circuit according to any one of the above-described embodiments of the present application.

Figure 23:
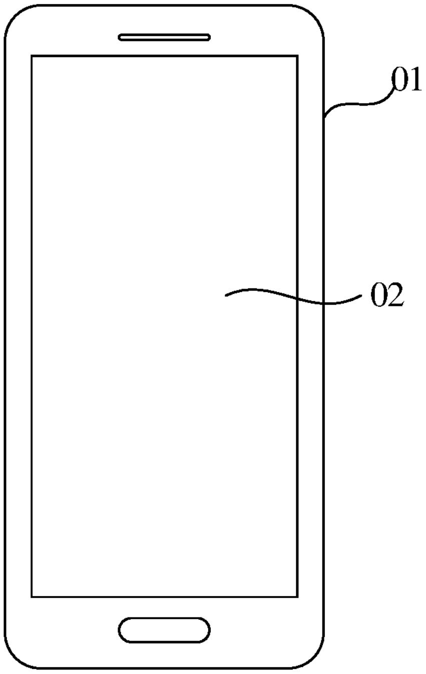
FIG. 23 is a schematic structural diagram of a display device according to another embodiment of the present application.

An embodiment of the present application further provides a display device. FIG. 23 is a schematic structural diagram of a display device according to another embodiment of the present application. Referring to FIG. 23, the display device 01 includes the display panel 02 of the embodiments of the present application. The display device 01 may be the mobile phone shown in FIG. 23, or may be a computer, a television, an intelligent wearable display device, and the like, which is not particularly limited in the embodiments of the present application.

The pixel driving circuit has a serious flicker phenomenon at the low frequency, and the reason for this technical problem is that the pixel driving circuit generally includes the drive transistor, and the gate of the drive transistor has a serious electric leakage phenomenon, so that the potential of the gate of the drive transistor unstable, the change of the potential of the gate of the drive transistor at the low refresh frequency is large, thereby causing the change of the drive current to be large, that is, the light-emitting unit can generate the flicker phenomenon.

The present application proposes the following solutions.

Figure 24:
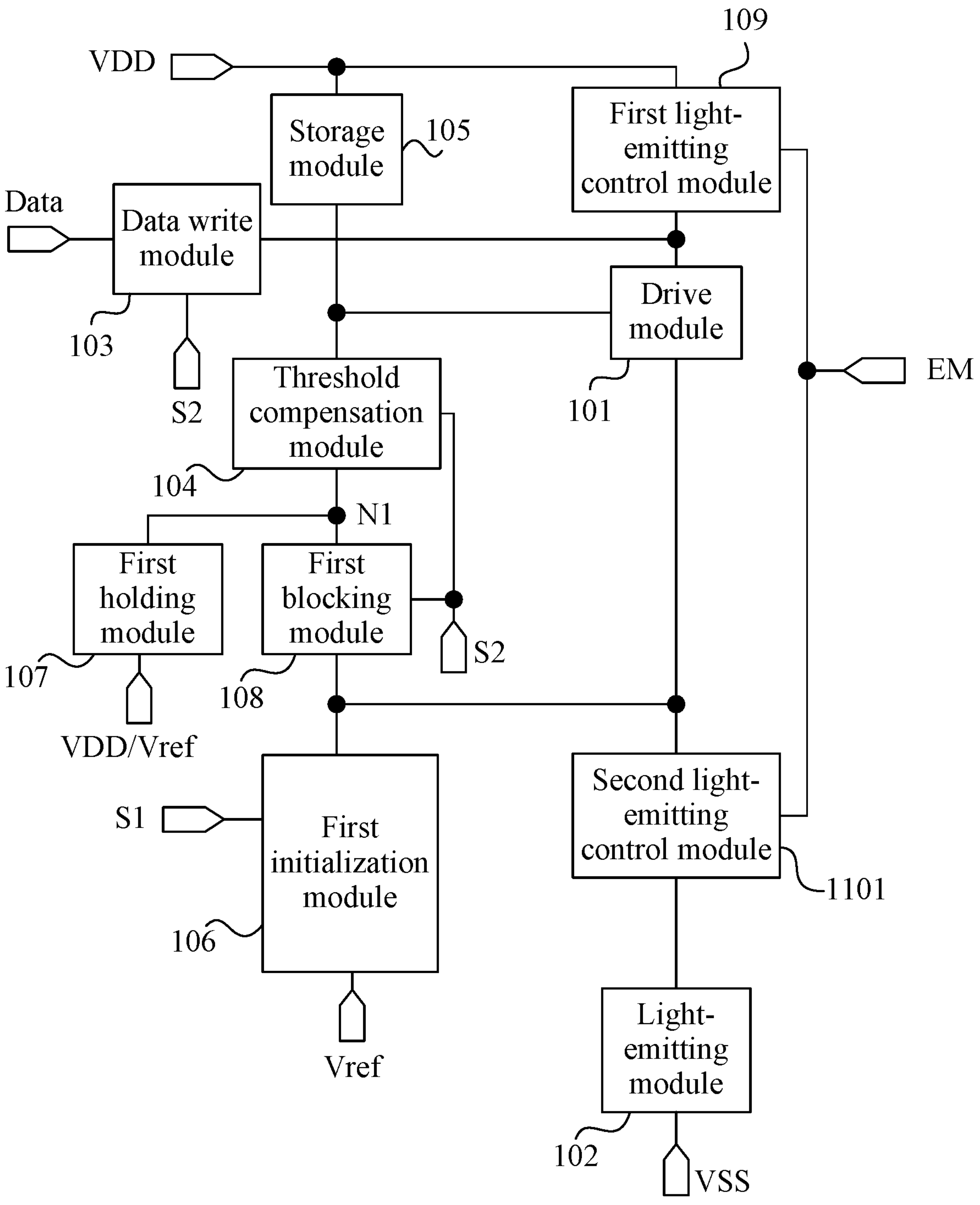
FIG. 24 is a schematic diagram showing a circuit structure of a pixel driving circuit according to another embodiment of the present application.

FIG. 24 is a schematic diagram showing a circuit structure of a pixel driving circuit (i.e., pixel circuit) according to another embodiment of the present application. Referring to FIG. 24, the pixel driving circuit includes: a drive module 101 configured to generate a drive current; a light-emitting module 102 configured to emit light in response to the drive current; a data write module 103 configured to write a voltage corresponding to a data signal to a control terminal of the drive module 101 during a charging stage; a threshold compensation module 104 configured to compensate a threshold voltage of the drive module 101 during a charging stage, the threshold compensation module 104 is connected between an electric leakage prevention node N1 and the control terminal of the drive module 101; a storage module 105 configured to hold a potential of the control terminal of the drive module 101; a first initialization module 106 configured to initialize the control terminal of the drive module 101 at an initialization stage, and the first initialization module 106 is connected between an initialization signal input terminal Vref and the electric leakage prevention node N1; a first holding module 107 configured to hold a potential of the electric leakage prevention node N1; and a first blocking module 108 configured to block a conductive path between the electric leakage prevention node N1 and the light-emitting module 102 during a light-emitting stage.

Exemplarily, the light-emitting module 102 may be, for example, an organic light-emitting diode (OLED), the OLED is a current-type device and emits light in response to a drive current. The light-emitting brightness is different when light-emitting currents are different, so that the light-emitting brightness may be controlled by controlling the magnitude of the light-emitting current, that is, controlling the light-emitting gray scale. A typical OLED may include an anode layer, a hole injection layer, a hole transport layer, an electron blocking layer, a light-emitting layer, a hole blocking layer, an electron transport layer, an electron injection layer and a cathode layer that are stacked in sequence. Holes generated in the anode layer and electrons generated in the cathode layer are recombined in the light-emitting layer to generate excitons, the excitons undergo transition instability to radiate energy outward in the form of light. When the currents are different, the intensities of the radiated light are different. The operation process of the pixel driving circuit at least includes a charging stage and a light-emitting stage. In the charging stage, the data write module 103 is turned on, a data signal input terminal Data inputs a data signal (the data signal may be, for example, a data voltage), and at this time, the drive module 101 is also turned on, a voltage corresponding to the data signal is written to the control terminal of the drive module 101 after the data signal passes through the drive module 101, the first blocking module 108 and the threshold compensation module 104, that is, the voltage written to the control terminal of the drive module 101 here may be a threshold-compensated voltage, this voltage is related to the data signal and the threshold voltage, so that the potential of the control terminal of the drive module 101 is changed. When the potential of the control terminal of the drive module 101 is changed to just so that the drive module 101 is turned off, the data signal stop being written, and at this time, the potential of the control terminal of the drive module 101 contains the information of the threshold voltage of the drive module 101, and is stored on the storage module 105. In the embodiments of the present application, the charging stage may also be referred to as a write stage, the charging stage is an operation stage of transmitting the voltage corresponding to the data signal to the control terminal of the drive module 101, in the charging stage, the potential of the control terminal of the drive module may be variously changed, the cases of increasing the potential or decreasing the potential may both occur; in the light-emitting stage, the drive module 101 generates a drive current, the storage module 105 maintains the potential of the control terminal of the drive module 101, according to the current formula of the drive module 101, at this time the drive current generated by the drive module 101 is independent of the threshold voltage of the drive module 101, so that the light-emitting module 101 performs light emission stably. In order to ensure that the drive module 101 may be turned on smoothly in the charging stage, and in order to eliminate the potential remaining at the control terminal of the drive module 101 when the last frame emits light, the pixel driving circuit is further provided with a first initialization module 106, typically, an initialization stage is set before the charging stage starts, an initialization signal is input through the initialization signal input terminal Vref to initialize the control terminal of the drive module 101. In this embodiment, the threshold compensation module 104 is connected between the electric leakage prevention node N1 and the control terminal of the drive module 101, the first initialization module 106 is connected between the electric leakage prevention node N1 and the initialization signal input terminal Vref, so that in the light-emitting stage, the electric leakage path of the control terminal of the drive module 101 has only one electric leakage path through the threshold compensation module 104, while the conventional pixel driving circuit has two electric leakage paths through the threshold compensation module and through the first initialization module, therefore this embodiment may greatly reduce the electric leakage current. On the other hand, after the threshold compensation module 104 is turned off, electric leakage current will flow to the electric leakage prevention node N1, so that the potential of the electric leakage prevention node N1 is changed, if not controlled, as the electric leakage time extends, the change of the potential of the electric leakage prevention node N1 will be large, so that the potential difference between the electric leakage prevention node N1 and the control terminal of the drive module 101 will also be large, and the electric leakage current will be large, and the increase of the leakage current will in turn accelerate the change of the potential of the electric leakage prevention node N1, so that the drive current is extremely unstable in cycles, which causes flickering of the light-emitting module. In this embodiment, the potential of the electric leakage prevention node N1 is holded through the first holding module 107, so that a difference between the potential of the electric leakage prevention node N1 and the potential of the control terminal of the drive module 101 always remain at one stable value, the leakage current is also maintained at a stable value, so that a problem that the leakage current is increased as the leakage time is extended may be prevented, that is, the first holding module 107 is provided so that the leakage current at the control terminal of the drive module 101 may be reduced, further the flicker phenomenon may be improved, and the display effect may be improved. In addition, in order to prevent the potential of the electric leakage prevention node N1 from affecting the light-emitting module 102 in the light-emitting stage, the conduction path between the electric leakage prevention node N1 and the light-emitting module 102 may be cut off by the first blocking module 108, thereby ensuring that the light-emitting module 102 may stably emit light. The signal received at a control terminal of the threshold compensation module 104 is not particularly limited in this embodiment so long as it may be turned on during the charging stage, and a position of the first blocking module 108 is not limited to the form shown in FIG. 24, and more connection manners thereof will be described later.

According to the technical scheme of this embodiment, the pixel driving circuit used includes: a drive module configured to generate a drive current; a light-emitting module configured to emit light in response to the drive current; a data write module configured to write a voltage corresponding to a data signal to a control terminal of the drive module in a charging stage; a threshold compensation module configured to compensate a threshold voltage of the drive module in a charging stage, the threshold compensation module is connected between the electric leakage prevention node and the control terminal of the drive module; a storage module configured to hold the potential of the control terminal of the drive module; a first initialization module configured to initialize the control terminal of the drive module in an initialization stage, the first initialization module is connected between an initialization signal input terminal and an electric leakage prevention node; a first holding module configured to hold a potential of the electric leakage prevention node; and a first blocking module configured to block a conductive path between the electric leakage prevention node and the light-emitting module in the light-emitting stage. In the light-emitting stage, the control terminal of the drive module has only one electric leakage path, and the electric leakage can be greatly reduced. In addition, the first holding module is provided so that the potential of the electric leakage prevention node can be stabilized, that is, the potential difference between the electric leakage prevention node and the control terminal of the drive module can be stabilized, the leakage current can be prevented from increasing, that is, the electric leakage phenomenon can be improved, thereby improving the flickering phenomenon of the pixel driving circuit.

This embodiment illustrates the present application in conjunction with a circuit. As shown in FIG. 24, a first terminal of the first initialization module 106 is electrically connected to the initialization signal input terminal Vref, and a control terminal of the first initialization module 106 is electrically connected to a first scan signal S1 of the pixel driving circuit. A first terminal of the data write module 103 is electrically connected to the data signal input terminal Data of the pixel driving circuit, a second terminal of the data write module 103 is electrically connected to the first terminal of the drive module 101, and a control terminal of the data write module 101 is electrically connected to the second scan signal input terminal S2 of the pixel driving circuit. A first terminal of the storage module 105 is electrically connected to the first power supply signal input terminal VDD of the pixel driving circuit, and a second terminal of the storage module 105 is electrically connected to the control terminal of the drive module 101. The pixel driving circuit further includes a first light-emitting control module 109 and a second light-emitting control module 1101, where a first terminal of the first light-emitting control module 109 is electrically connected to the first power supply signal input terminal VDD, a second terminal of the first light-emitting control module 109 is electrically connected to the first terminal of the drive module 101, and a control terminal of the first light-emitting control module 109 is electrically connected to the enable signal input terminal EM of the pixel driving circuit. The first terminal of the second light-emitting control module 1101 is electrically connected to the second terminal of the drive module 101, the second terminal of the second light-emitting control module 1101 is electrically connected to the first terminal of the light-emitting module 102, and the control terminal of the second light-emitting control module 1101 is electrically connected to the enable signal input terminal EM. The second terminal of the light-emitting module 102 is electrically connected to the second power signal input terminal VSS of the pixel driving circuit. The first terminal of the first holding module 107 is electrically connected to the initialization signal input terminal Vref or the first power supply signal input terminal VDD, and the second terminal of the first holding module 107 is electrically connected to the electric leakage prevention node N1.

Exemplarily, the first power supply signal input terminal VDD may be set to input a fixed signal, for example, the first power supply signal input terminal VDD may be set to input a first power supply signal, the second power supply signal input terminal VSS may be set to input a second power supply signal, a high-low level of the first power supply signal is different from a high-low level of the second power supply signal, and typically, the first power supply signal may be set to the high level and the second power supply signal may be set to the low level. In the initialization stage and the charging stage, the enable signal input terminal EM controls the first light-emitting control module 109 and the second light-emitting control module 1101 to be turned off, thereby preventing the light-emitting module 102 from misemitting light. In the light-emitting stage, the first light-emitting control module 109 and the second light-emitting control module 1101 are turned on to provide a voltage path for the light-emitting module 102 to emit light so that the drive current generated by the drive module 101 can flow to the light-emitting module 102. The first terminal of the first holding module 107 is configured to receive a constant potential, in order to reduce a number of signal lines in the pixel driving circuit, in this embodiment, the first terminal of the first holding module 107 may be connected to the first power supply signal input terminal VDD or the initialization signal input terminal Vref.

Optionally, with continued reference to FIG. 24, a first terminal of the first blocking module 108 is electrically connected to the electric leakage prevention node N1, the second terminal of the first blocking module 108 is electrically connected to the second terminal of the first initialization module 106 and the second terminal of the drive module 101, and the control terminal of the first blocking module 108 is electrically connected to the second scan signal input terminal S2. The first terminal of the threshold compensation module 104 is electrically connected to the control terminal of the drive module 101, the second terminal of the threshold compensation module 104 is electrically connected to the electric leakage prevention node N1, and the control terminal of the threshold compensation module 104 is electrically connected to the second scan signal input terminal S2.

Figure 25:
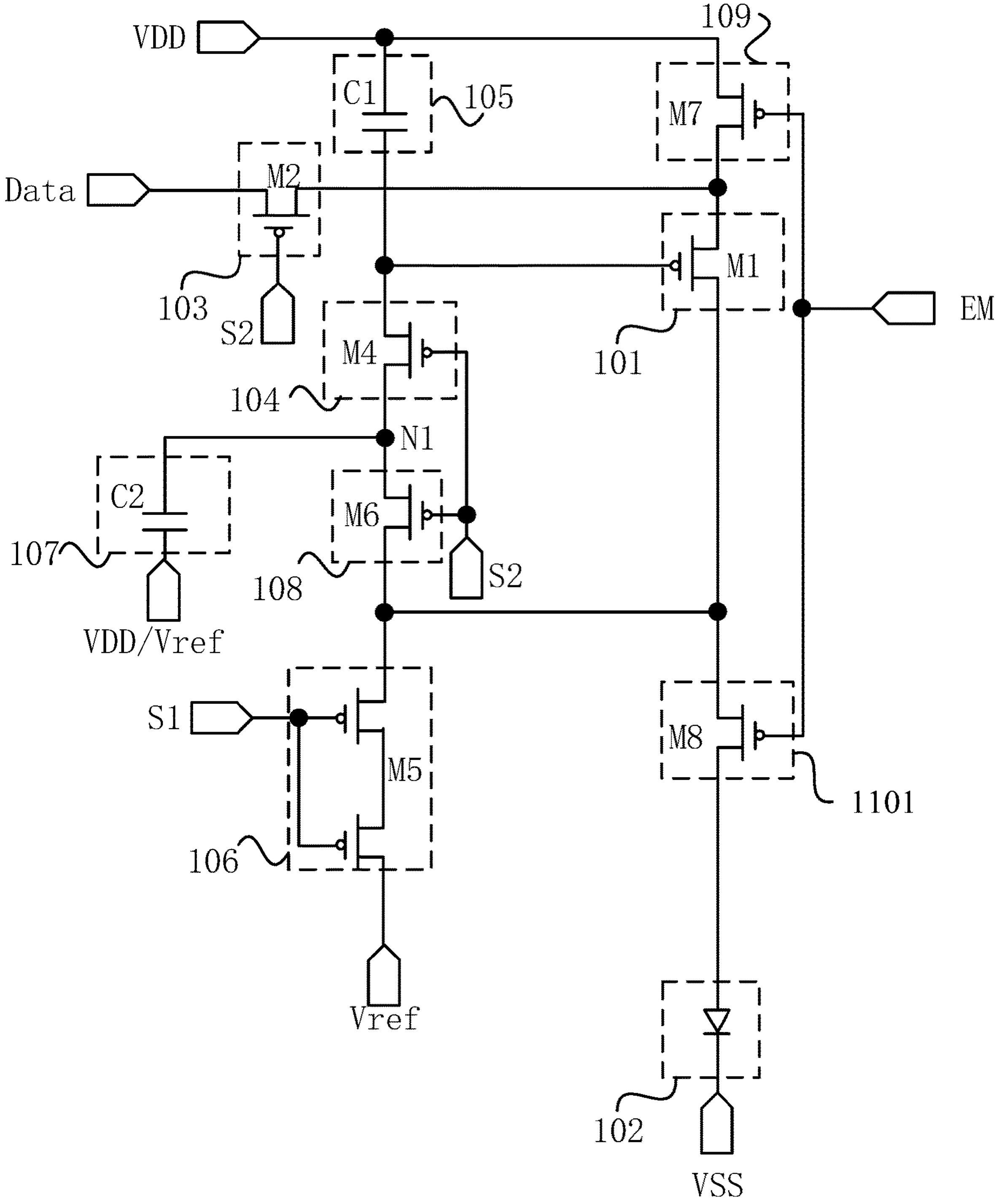
FIG. 25 is a schematic diagram showing a circuit structure of a pixel driving circuit according to another embodiment of the present application.

Exemplarily, in this embodiment, the second terminal of the first initialization module 106 is electrically connected to the electric leakage prevention node N1 through the first blocking module 108. In the initialization stage, the first initialization module 106, the first blocking module 108 and the threshold compensation module 104 need to be turned on simultaneously. Exemplarily, FIG. 25 is a schematic diagram showing a circuit structure of a pixel driving circuit according to another embodiment of the present application. Referring to FIG. 25, the drive module 101 includes a first transistor M1, a first terminal of the first transistor M1 serving as a first terminal of the drive module 101, a second terminal of the first transistor M1 serving as a second terminal of the drive module 101, and a control terminal of the first transistor M1 serves as the control terminal of the drive module 101. The light-emitting module 102 is an OLED. The data write module 103 includes a second transistor M2, a first terminal of the second transistor M2 serves as the first terminal of the data write module 103, a second terminal of the second transistor M2 serves as the second terminal of the data write module 103, and a control terminal of the second transistor M2 serves as the control terminal of the data write module 103. The threshold compensation module 104 includes a third transistor M4, a first terminal of the third transistor M4 serves as the first terminal of the threshold compensation module 104, a second terminal of the third transistor M4 serves as the second terminal of the threshold compensation module 104, and a control terminal of the third transistor M4 serves as the control terminal of the threshold compensation module 104. The storage module 105 includes a first capacitor C1, a first terminal of the first capacitor C1 serves as the first terminal of the storage module 105, and a second terminal of the first capacitor C1 serves as the second terminal of the storage module 105. The first initialization module 106 includes a fifth transistor M5, a first terminal of the fifth transistor M5 serves as the first terminal of the first initialization module 106, a second terminal of the fifth transistor M5 serves as the second terminal of the first initialization module 106, and a control terminal of the fifth transistor M5 serves as the control terminal of the first initialization module 106. The first holding module 107 includes a second capacitor C2, a first terminal of the second capacitor C2 serves as the first terminal of the first holding module 107, and a second terminal of the second capacitor C2 serves as the second terminal of the first holding module 107. The first blocking module 108 includes a sixth transistor M6, a first terminal of the sixth transistor M6 serves as the first terminal of the first blocking module 108, a second terminal of the sixth transistor M6 serves as the second terminal of the first blocking module 108, and a control terminal of the sixth transistor M6 serves as the control terminal of the first blocking module 108. The first light-emitting control module 109 includes a seventh transistor M7, a first terminal of the seventh transistor M7 serves as the first terminal of the first light-emitting control module 109, a second terminal of the seventh transistor M7 serves as the second terminal of the first light-emitting control module 109, and a control terminal of the seventh transistor M7 serves as the control terminal of the first light-emitting control module 109. The second light-emitting control module 1101 includes an eighth transistor M8, a first terminal of the eighth transistor M8 serves as the first terminal of the second light-emitting control module 1101, a second terminal of the eighth transistor M8 serves as the second terminal of the second light-emitting control module 1101, and a control terminal of the eighth transistor M8 serves as the control terminal of the second light-emitting control module 1101.

Figure 26:
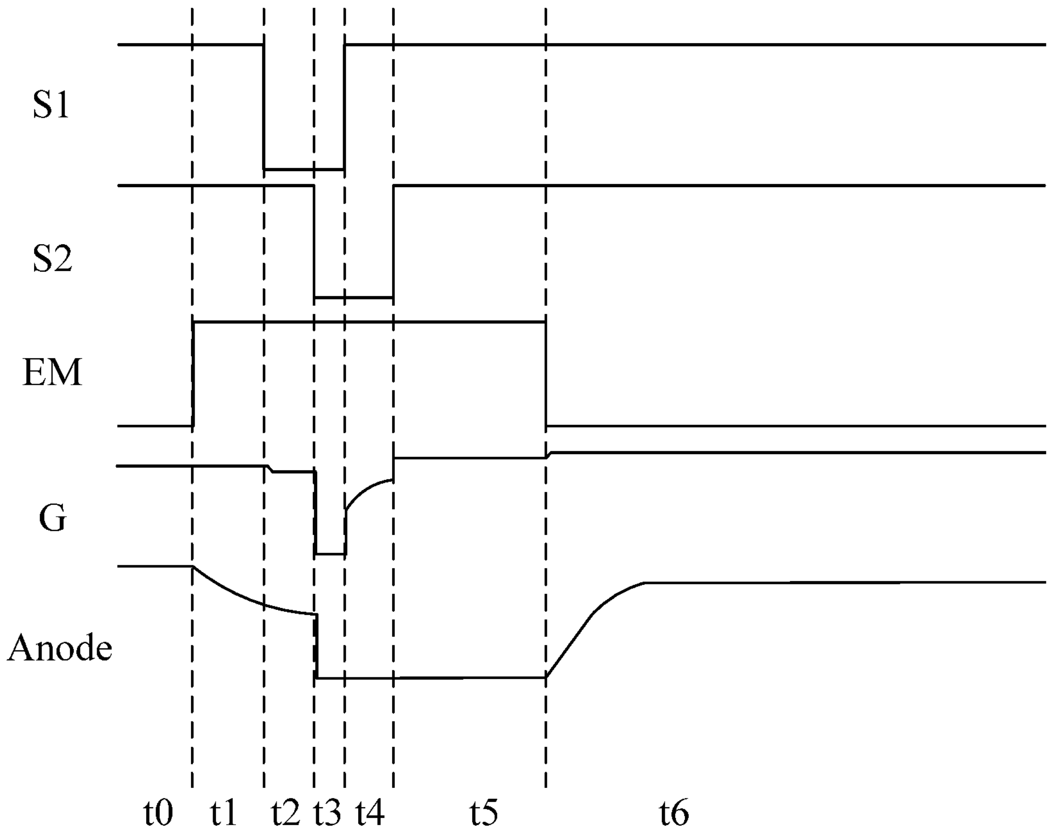
FIG. 26 is a timing diagram of a pixel driving circuit according to another embodiment of the present application.

Exemplarily, each of the first transistor to the eighth transistor may be a P-type transistor or an N-type transistor. Since the manufacturing process of the P-type transistor in the display panel is mature and low in cost, optionally, the first transistor to the eighth transistor may be all P-type transistors. The P-type transistor has the characteristics of being turned off when the control terminal is at a high level, and being turned on when the control terminal is at a low level. Of course, in other embodiments, the first transistor to the eighth transistor may also be N-type transistors. At this time, it is necessary to set each of the scan signal, the enable signal and the power supply signal to a signal of opposite polarity to that when the first transistor to the eighth transistor are P-type transistors. As shown in FIG. 26, FIG. 26 is a timing diagram of a pixel driving circuit according to another embodiment of the present application. FIG. 26 may correspond to FIG. 25, where a waveform G is a waveform of a potential of a control terminal of a drive module 101, and a waveform Anode is a waveform diagram of a drive current flowing through the light-emitting module 102. The operation principle of the pixel driving circuit according to the embodiments of the present application will be described below in conjunction with FIGS. 26 and 25.

In t0 stage, the t0 stage is a light-emitting stage of a previous frame signal.

In t1 stage, in this stage, a rising edge of the enable signal input from the enable signal input terminal EM comes, the first light-emitting control module 109 and the second light-emitting control module 1101 are turned off, the light-emitting module 102 stops emitting light, thereby turning on the display of the present frame.

In t2 stage, this stage is a first sub-stage of the initialization stage, in the t2 stage, the low level of the first scan signal input from the first scan signal input terminal S1 comes, the first initialization module 106 is turned on, but since the threshold compensation module 104 and the first blocking module 108 are located on the path of the first initializing module 106 initializing the control terminal of the drive module 101, and at this time, the second scan signal input from the second scan signal input terminal S2 is a high level, that is, both the threshold compensation module 104 and the first blocking module 108 are turned off, therefore the control terminal of the drive module does not perform the initialization at the t2 stage.

In t3 stage, this stage is a stage in which the charging stage overlaps in time with the initialization stage, i.e. a second sub-stage of the initialization stage, or the first sub-stage of the charging stage. In this embodiment, the charging stage is set to partially overlap in time with the initialization stage, that is, the t3 stage is set, and in this stage, the first scan signal input from the first scan signal input terminal S1 in this stage is at a low level, the first initialization module 106 is turned on, the second scan signal input from the second scan signal input terminal S2 is also a low level, therefore both the first blocking module 108 and the threshold compensation module 104 are turned on in the t3 stage, the initialization signal input from the initialization signal input terminal Vref is written into the control terminal of the drive module 101, it is convenient for the following drive module 101 to be turned on, and at this time, there is a large current passing in the drive module 101, it is avoided that the drive module 101 is in one state for a long time, and the problem of the residual image can be improved.

In t4 stage, this stage is a second sub-stage of the charging stage, in the t4 stage, the first scan signal input from the first scan signal input terminal S1 becomes a high level, the first initialization module 106 is turned off, while the second scan signal input from the second scan signal input terminal S2 is still at a low level, and at this time, the data write module 103, the first blocking module 108 and the threshold compensation module 104 continue to be turned on, the data signal input from the data signal input terminal Data passes through the drive module 101, the first blocking module 108 and the threshold compensation module 104 and then is written into the control terminal of the drive module 101, so that the potential of the control terminal of the drive module 101 is changed. When the potential of the control terminal of the drive module 101 is changed to such a situation that a potential difference between the control terminal of the drive module 101 and the first terminal of the drive module 101 is a threshold voltage of the drive module 101, the drive module 101 is turned off, the data signal stops being written, and at this time, the electric potential of the control terminal of the drive module 101 is related to the threshold voltage of the drive module 101 and is stored on the storage module 105.

In t5 stage, in this stage, both the first scan signal and the second scan signal are at high levels, and the enable signal input from the enable signal input terminal EM is also at a high level, and the ready-to-light-emitting stage is entered.

In t6 stage, in this stage, the enable signal becomes a low level, the first light-emitting control module 109 and the second light-emitting control module 1101 are turned on, the light-emitting module 102 starts to emit light, and in this stage, the drive current generated by the drive module 101 is independent of the threshold voltage of the drive module 101. Due to the holding action of the first holding module 107 at this time, the potential of the electric leakage prevention node N1 is more stable, so that the potential of the control terminal of the drive module 101 is also more stable, that is, the waveform G is more flat, thereby greatly improving the flicker problem.

In this embodiment, the first scan signal and the second scan signal may be set to a group of signals by setting the initialization stage and the charging stage at least partially overlap, that is, the second scan signal may be obtained by shifting the first scan signal. In other words, only one gate panel (Gate in Panel, GIP) circuit is required to produce the scan signal required by the pixel driving circuit, and no additional GIP circuit is required to facilitate implementation of the narrow frame of the display panel.

Optionally, in this embodiment, the first blocking module 108 and the threshold compensation module 104 may be composed of two sub-transistors of a double-gate transistor, respectively, that is, the third transistor M4 and the sixth transistor M6 are two sub-transistors of a double-gate transistor, that is, the first blocking module 108 includes a first sub-transistor of the double-gate transistor, and the threshold compensation module 104 includes a second sub-transistor of the double-gate transistor, so that the process difficulty can be reduced, the layout space can be saved, and the leakage current can be reduced. In addition, The fifth transistor M5 constituting the first initialization module 106 may also be a double-gate transistor, which can reduce the leakage current.

Optionally, a capacitor value of the second capacitor C2 is the larger, the potential holding action of the electric leakage prevention node N1 is the better, and therefore the capacitor value of the second capacitor C2 may be set to be larger, and typically, for example, the capacitor value of the second capacitor C2 may be set to be greater than a capacitor value of the storage module 105.

Figure 27:
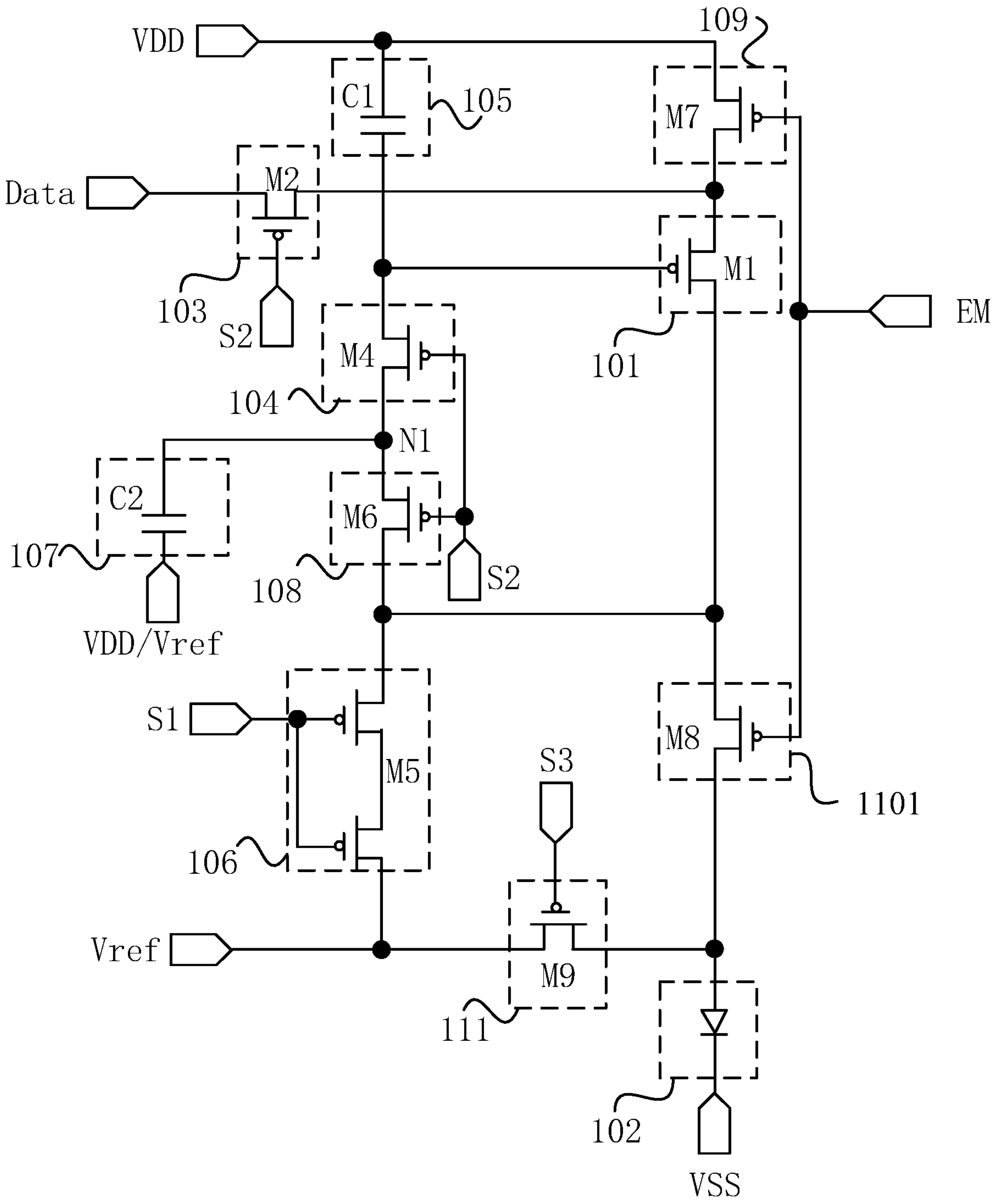
FIG. 27 is a schematic diagram showing a circuit structure of a pixel driving circuit according to another embodiment of the present application.

Optionally, FIG. 27 is a schematic diagram showing a circuit structure of a pixel driving circuit according to another embodiment of the present application. Referring to FIG. 27, the pixel driving circuit may further include a second initialization module 111. A first terminal of the second initialization module 111 is electrically connected to an initialization signal input terminal Vref, a second terminal of the second initialization module 111 is electrically connected to a first terminal of the light-emitting module 102, and a control terminal of the second initialization module 111 is electrically connected to a third scan signal input terminal S3 of the pixel driving circuit.

Exemplarily, the second initialization module 111 may include a ninth transistor M9, a first terminal of the ninth transistor M9 serves as the first terminal of the second initialization module 111, a second terminal of the ninth transistor M9 serves as the second terminal of the second initialization module 111, a control terminal of the ninth transistor M9 serves as the control terminal of the second initialization module 111, and the ninth transistor M9 may be, for example, a P-type transistor. The second initialization module 111 is configured to initialize the light-emitting module 102 so as to prevent the potential remaining on the light-emitting module 102 in the previous frame from affecting the light-emitting of the current frame. The third scan signal input from the third scan signal input terminal S3 controls the turn-on or turn-off of the second initialization module 111. The third scan signal may be obtained by multiplexing the first scan signal, may be obtained by multiplexing the second scan signal, or may be an additional scan signal, and the scan signal and the first scan signal are also signals shifted from each other, as long as the light-emitting module 102 is reset before the light-emitting stage.

Figure 28:
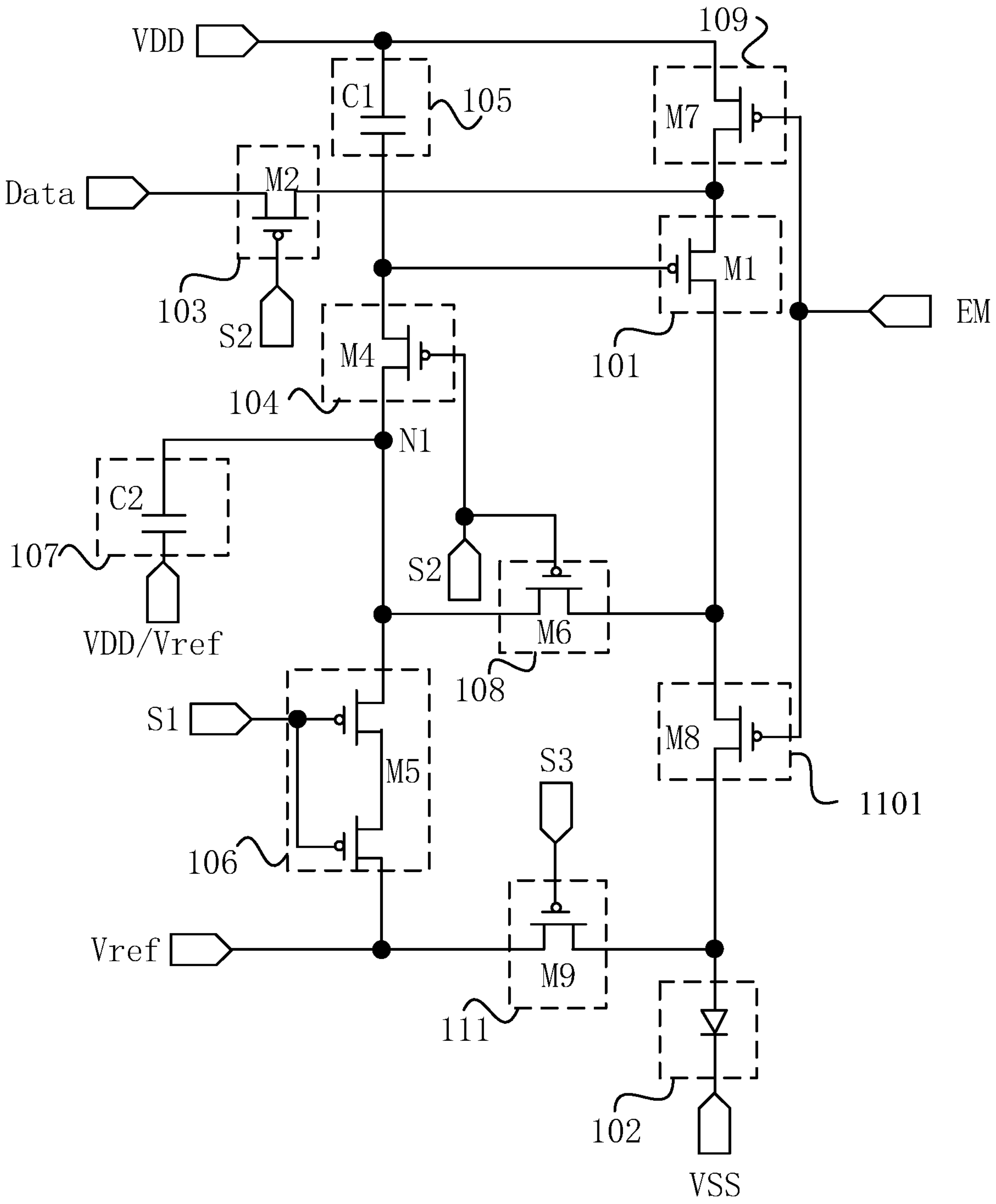
FIG. 28 is a schematic diagram showing a circuit structure of still another pixel driving circuit according to another embodiment of the present application.

Optionally, FIG. 28 is a schematic diagram showing a circuit structure of still another pixel driving circuit according to another embodiment of the present application. Referring to FIG. 28, unlike the pixel driving circuit shown in FIG. 27, the first blocking module 108 of the pixel driving circuit in this embodiment is connected between the electric leakage prevention node N1 and the second terminal of the drive module 101, that is, the second terminal of the threshold compensation module 104 is electrically connected to the electric leakage prevention node N1, the first terminal of the first blocking module 108 is electrically connected to the electric leakage prevention node N1, the second terminal of the first blocking module 108 is electrically connected to the second terminal of the drive module 101, and the control terminal of the first blocking module 108 is electrically connected to the second scan signal input terminal S2. A second terminal of the first initialization module 106 is electrically connected to the electric leakage prevention node N1. The timing diagram of the pixel driving circuit in this embodiment is the same as that of FIG. 26, and the operation principle is the same as that of the pixel driving circuit shown in FIG. 27 and will not be described here in detail.

Figure 29:
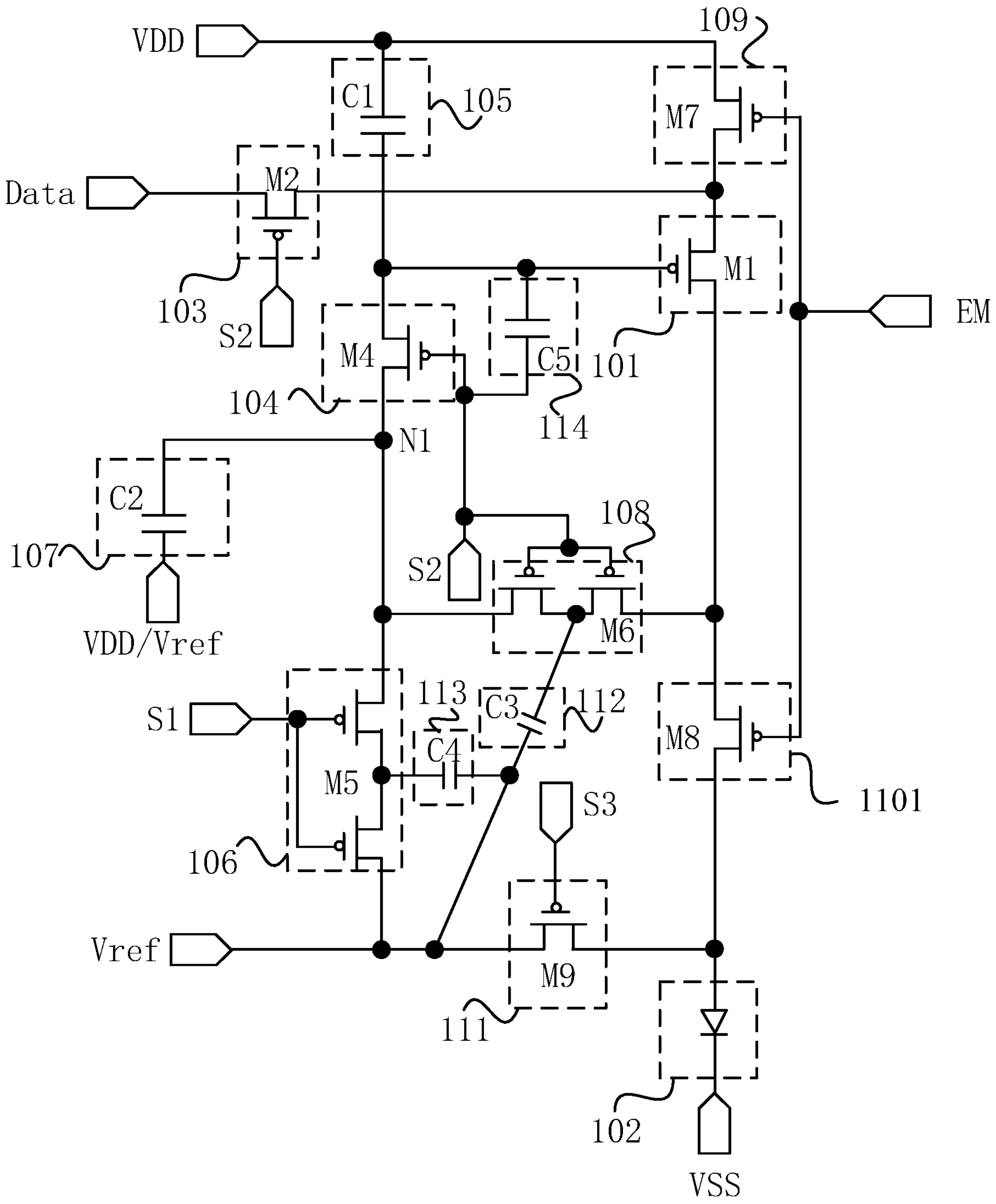
FIG. 29 is a schematic diagram showing a circuit structure of still another pixel driving circuit according to another embodiment of the present application.

Optionally, FIG. 29 is a schematic diagram showing a circuit structure of still another pixel driving circuit according to another embodiment of the present application. Referring to FIG. 29, the first blocking module 108 is a first double-gate transistor, the pixel driving circuit further includes a third holding module 112, and the third holding module 112 is configured to hold the potential of the double-gate node of the first double-gate transistor.

Exemplarily, the double-gate node of the first double-gate transistor is a node in which the source and drain of two sub-transistors of the first double-gate transistor are connected. When the double-gate transistor is turned off, a potential of the double-gate node of the double-gate transistor is unstable. If one potential is not maintained, then the electric leakage phenomenon of the electric leakage prevention node N1 through the double-gate node is also serious, therefore in this embodiment, a third holding module 112 may be arranged at the double-gate node to hold the potential of the double-gate node of the first double-gate transistor, thereby maintaining the potential of the electric leakage prevention node N1 to be stable. Exemplarily, the third holding module 112 may include a third capacitor C3, a first terminal of the third capacitor C3 is electrically connected to the double-gate node of the first double-gate transistor, and a second terminal of the third capacitor C3 may be configured to receive a fixed signal, for example, the second terminal of the third capacitor C3 may be electrically connected to the initialization signal input terminal Vref, or may be electrically connected to the first power supply signal input terminal VDD, thereby reducing a number of signal lines in the pixel driving circuit and facilitating the implementation of the narrow frame of the display panel. In addition, although the first blocking module 108 shown in FIG. 29 is exemplified as the double-gate transistor, in other embodiments, the first blocking module 108 in FIG. 27 may be provided as the double-gate transistor.

Optionally, with continued reference to FIG. 29, the first initialization module 106 is a second double-gate transistor, and the pixel driving circuit further includes a fourth holding module 113 configured to hold the potential of the double-gate node of the second double-gate transistor.

Exemplarily, the double-gate node of the second double-gate transistor is a node in which the source and drain of two sub-transistors of the second double-gate transistor are connected. When the double-gate transistor is turned off, a potential of the double-gate node of the double-gate transistor is unstable. If one potential is not maintained, then the electric leakage phenomenon of the electric leakage prevention node N1 through the double-gate node is also serious, therefore in this embodiment, a fourth holding module 112 may be arranged at the double-gate node of the second double-gate transistor to hold the potential of the double-gate node of the second double-gate transistor, thereby maintaining the potential of the electric leakage prevention node N1 to be stable. Exemplarily, the fourth holding module 113 may include a fourth capacitor C4, a first terminal of the fourth capacitor C4 is electrically connected to the double-gate node of the second double-gate transistor, and a second terminal of the fourth capacitor C4 may be configured to receive a fixed signal, for example, the second terminal of the fourth capacitor C4 may be electrically connected to the initialization signal input terminal Vref, or may be electrically connected to the first power supply signal input terminal VDD, thereby reducing a number of signal lines in the pixel driving circuit and facilitating the implementation of the narrow frame of the display panel.

Optionally, with continued reference to FIG. 29, the pixel driving circuit further includes a coupling module 114 configured to adjust the potential of the control terminal of the drive module 101. A first terminal of the coupling module 114 is electrically connected to the control terminal of the drive module 101, and a second terminal of the coupling module 114 is electrically connected to the control terminal of the threshold compensation module 104.

Exemplarily, in this embodiment, the coupling module 114 may include a fifth capacitor C5, a first terminal of the fifth capacitor C5 serves as the first terminal of the coupling module 114, and a second terminal of the fifth capacitor C5 serves as the second terminal of the coupling module 114. The fifth capacitor C5 is provided so that the capacitor value of the storage module is equivalently increased, which is more favorable for maintaining the stability of the potential of the control terminal of the drive module 101, and thus is more favorable for reducing the flicker phenomenon. On the other hand, since the coupling module 114 is connected to the control terminal of the threshold compensation module 104, when the potential of the control terminal of the threshold compensation module 104 is changed from a low level to a high level, the potential of the control terminal of the drive module 101 may be increased, thereby compensating for the loss of the potential of the control terminal of the drive module 101, and maintaining the stability of the potential of the control terminal of the drive module 101.

Optionally, in order to ensure that the third holding module 112, the fourth holding module 113 and the coupling module 114 have a good holding action, the third capacitor C3, the fourth capacitor C4, and the fifth capacitor C5 may be set to be large, typically, may be set to be greater than the capacitor value of the storage module 105, so that the influence of the leakage current on the potential of the corresponding node can be reduced, that is, the potential holding action of the corresponding node can be achieved.

Figure 30:
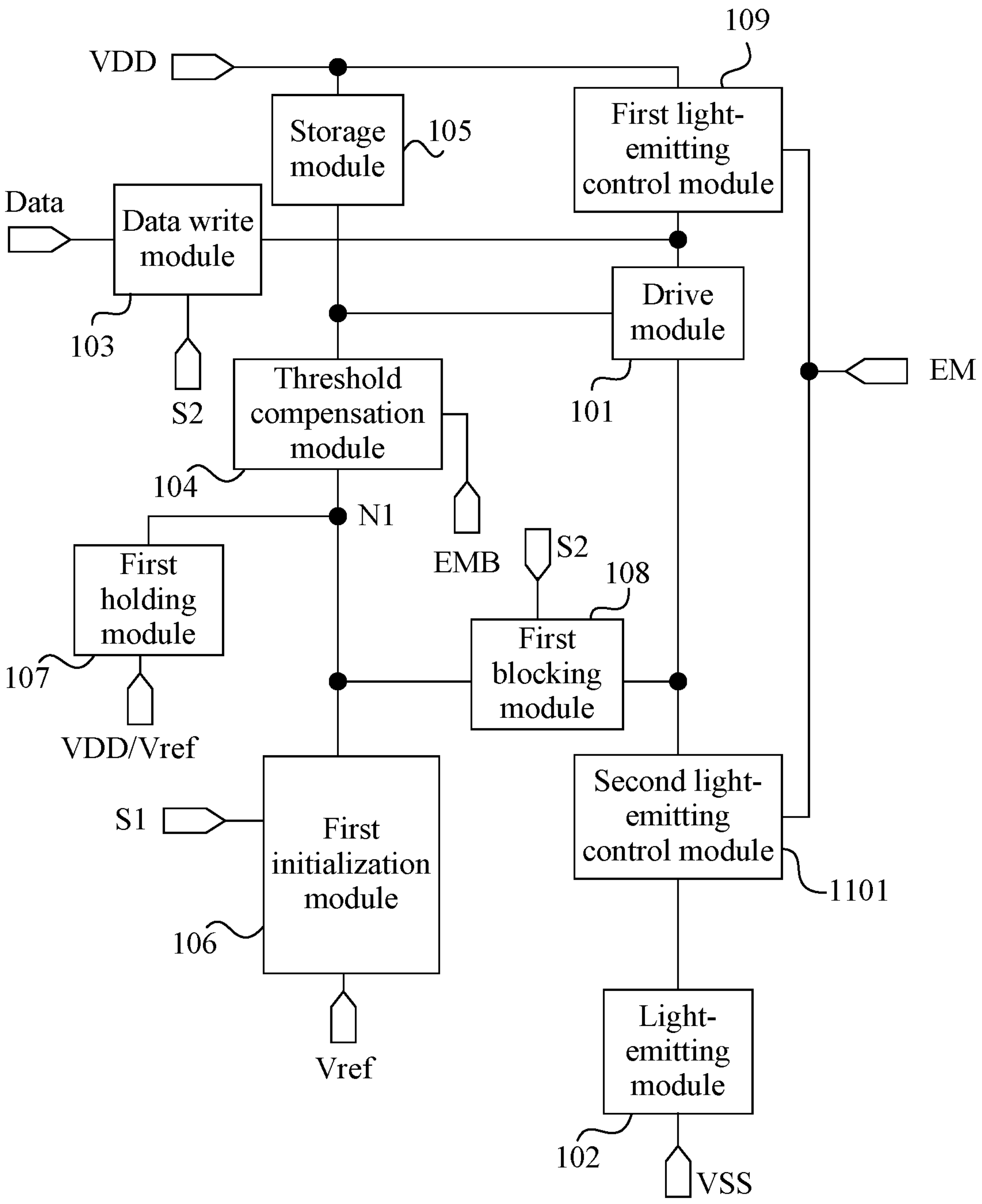
FIG. 30 is a schematic diagram showing a circuit structure of a pixel driving circuit according to another embodiment of the present application.

FIG. 30 is a schematic diagram showing a circuit structure of a pixel driving circuit according to another embodiment of the present application. Referring to FIG. 30, in this embodiment, the same parts as the connection relationship between the pixel driving circuits in the above-described embodiments is as follows: the connection relationship of the pixel driving circuit in the above-described embodiment is as follows: the first terminal of the first initialization module 106 is electrically connected to the initialization signal input terminal Vref, and the control terminal of the first initialization module 106 is electrically connected to the first scan signal S1 of the pixel driving circuit; the first terminal of the data write module 103 is electrically connected to the data signal input terminal Data of the pixel driving circuit, the second terminal of the data write module 103 is electrically connected to the first terminal of the drive module 101, and the control terminal of the data write module 101 is electrically connected to the second scan signal input S2 of the pixel driving circuit; the first terminal of the storage module 105 is electrically connected to the first power supply signal input terminal VDD of the pixel driving circuit, and the second terminal of the storage module 105 is electrically connected to the control terminal of the drive module 101; the pixel driving circuit further includes the first light-emitting control module 109 and the second light-emitting control module 1101, where the first terminal of the first light-emitting control module 109 is electrically connected to the first power supply signal input terminal VDD, the second terminal of the first light-emitting control module 109 is electrically connected to the first terminal of the drive module 101, and the control terminal of the first light-emitting control module 109 is electrically connected to the enable signal input terminal EM of the pixel driving circuit; the first terminal of the second light-emitting control module 1101 is electrically connected to the second terminal of the drive module 101, the second terminal of the second light-emitting control module 1101 is electrically connected to the first terminal of the light-emitting module 102, and the control terminal of the second light-emitting control module 1101 is electrically connected to the enable signal input terminal EM; the second terminal of the light-emitting module 102 is electrically connected to the second power signal input terminal VSS of the pixel driving circuit; and the first terminal of the first holding module 107 is electrically connected to the initialization signal input terminal Vref or the first power supply signal input terminal VDD, and the second terminal of the first holding module 107 is electrically connected to the electric leakage prevention node N1. The first terminal of the first holding module 107 is configured to receive a signal of a fixed potential, in this embodiment, the first terminal of the first holding module 107 is connected to the initialization signal input terminal Vref or the first power supply signal input terminal VDD in order to facilitate the wiring and reduce a number of signal lines.

In addition, in this embodiment, the first terminal of the threshold compensation module 104 is electrically connected to the control terminal of the drive module 101, the second terminal of the threshold compensation module 104 is electrically connected to the electric leakage prevention node N1, and the control terminal of the threshold compensation module 104 is electrically connected to a long scan signal input terminal EMB of the pixel driving circuit. The first terminal of the first blocking module 108 is electrically connected to the electric leakage prevention node N1, the second terminal of the first blocking module 108 is electrically connected to the second terminal of the drive module 101, and the control terminal of the first blocking module 108 is electrically connected to the second scan signal input terminal S2. The long scan signal input terminal EMB is configured to input a turn-on signal at both the initialization stage and the charging stage.

Exemplarily, in this embodiment, the first scan signal input from the first scan signal input terminal S1 and the second scan signal input from the second scan signal input terminal S2 are a same group of scan signals, that is, the first scan signal and the second scan signal are generated by a same group of GIP circuits, whose pulse widths are the same and are shifted from each other. A long scan signal input from the long scan signal input terminal EMB has a long pulse width, and the duration of the pulse width covers at least the initialization stage and the charging stage. In the initialization stage, the threshold compensation module 104 and the first initialization module 106 are both turned on, so that the initialization signal is input to the control terminal of the drive module 101, the control terminal of the drive module 101 is initialized, and the drive module 101 is conveniently turned on in the charging stage. In the charging stage, the data write module 103, the first blocking module 108 and the threshold compensation module 104 are all turned on, so that the data signal is written into the control terminal of the drive module 101 after passing through the data write module 103, the drive module 101, the first blocking module 108 and the threshold compensation module 104. When the potential difference between the control terminal of the drive module 101 and the first terminal of the drive module 101 is the threshold voltage of the drive module 101, the drive module 101 is turned off, and the data signal stops being written. At this time, the potential of the control terminal of the drive module 101 is related to the threshold voltage of the drive module 101, and the potential is stored on the storage module 105. In the light-emitting stage, the drive module generates a drive current independent of its threshold voltage, thereby controlling the light-emitting module to emit light. In the pixel driving circuit of this embodiment, except that there is only one leakage current path and the potential of the electric leakage prevention node N1 may be maintained, since a new scan signal is additionally provided at the control terminal of the threshold compensation module 104, it is possible to ensure that the time of both the initialization stage and the charging stage is long, so that the drive module 101 can be sufficiently initialized and charged. The turn-on signal indicates that the corresponding module may be controlled to be turned on.

Figure 31:
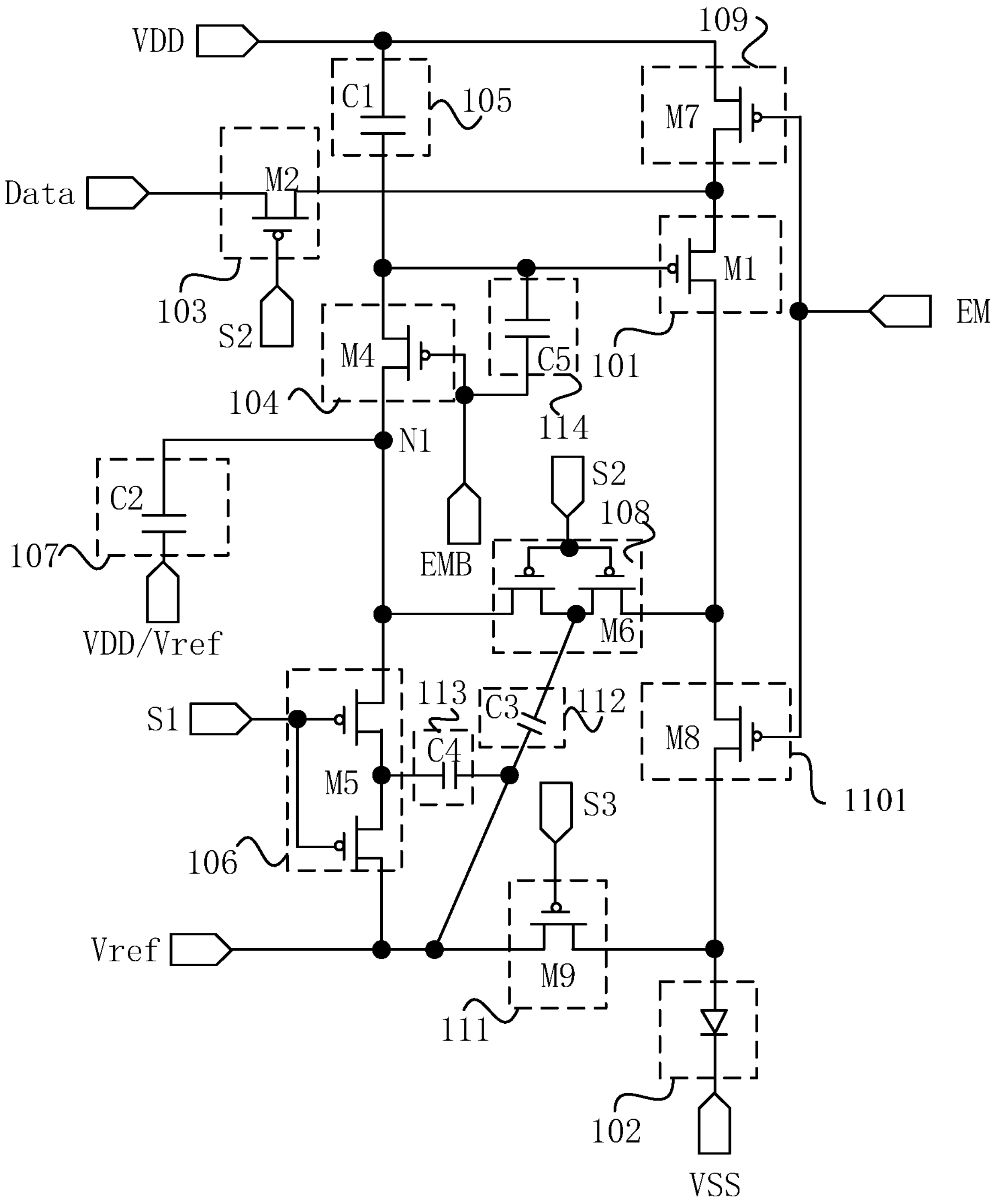
FIG. 31 is a schematic diagram showing a circuit structure of still another pixel driving circuit according to another embodiment of the present application.
Figure 32:
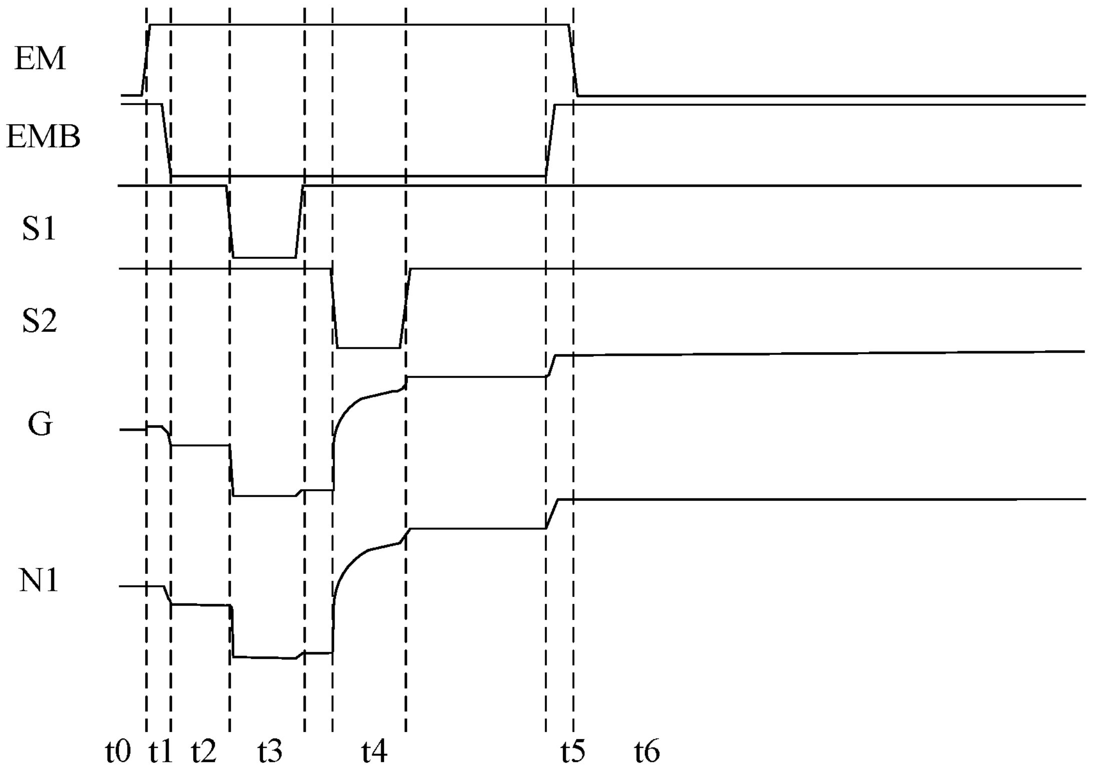
FIG. 32 is a timing diagram of a pixel driving circuit according to another embodiment of the present application.

Exemplarily, FIG. 31 is a schematic diagram showing a circuit structure of still another pixel driving circuit according to another embodiment of the present application. FIG. 32 is a timing diagram of a pixel driving circuit according to another embodiment of the present application. FIG. 32 corresponds to FIG. 31. In conjunction with FIGS. 31 and 32, a drive module 101 includes a first transistor M1. A first terminal of the first transistor M1 serves as the first terminal of the drive module 101, a second terminal of the first transistor M1 serves as the second terminal of the drive module 101, and a control terminal of the first transistor M1 serves as the control terminal of the drive module 101. The light-emitting module 102 is an OLED. The data write module 103 includes a second transistor M2, a first terminal of the second transistor M2 serves as the first terminal of the data write module 103, a second terminal of the second transistor M2 serves as the second terminal of the data write module 103, and a control terminal of the second transistor M2 serves as the control terminal of the data write module 103. The threshold compensation module 104 includes a third transistor M4, a first terminal of the third transistor M4 serves as the first terminal of the threshold compensation module 104, a second terminal of the third transistor M4 serves as the second terminal of the threshold compensation module 104, and a control terminal of the third transistor M4 serves as the control terminal of the threshold compensation module 104. The storage module 105 includes a first capacitor C1, a first terminal of the first capacitor C1 serves as the first terminal of the storage module 105, and a second terminal of the first capacitor C1 serves as the second terminal of the storage module 105. The first initialization module 106 includes a fifth transistor M5, a first terminal of the fifth transistor M5 serves as the first terminal of the first initialization module 106, a second terminal of the fifth transistor M5 serves as the second terminal of the first initialization module 106, and a control terminal of the fifth transistor M5 serves as the control terminal of the first initialization module 106. The first holding module 107 includes a second capacitor C2, a first terminal of the second capacitor C2 serves as the first terminal of the first holding module 107, and a second terminal of the second capacitor C2 serves as the second terminal of the first holding module 107. The first blocking module 108 includes a sixth transistor M6, a first terminal of the sixth transistor M6 serves as the first terminal of the first blocking module 108, a second terminal of the sixth transistor M6 serves as the second terminal of the first blocking module 108, and a control terminal of the sixth transistor M6 serves as the control terminal of the first blocking module 108. The first light-emitting control module 109 includes a seventh transistor M7, a first terminal of the seventh transistor M7 serves as the first terminal of the first light-emitting control module 109, a second terminal of the seventh transistor M7 serves as the second terminal of the first light-emitting control module 109, and a control terminal of the seventh transistor M7 serves as the control terminal of the first light-emitting control module 109. The second light-emitting control module 1101 includes an eighth transistor M8, a first terminal of the eighth transistor M8 serves as the first terminal of the second light-emitting control module 1101, a second terminal of the eighth transistor M8 serves as the second terminal of the second light-emitting control module 1101, and a control terminal of the eighth transistor M8 serves as the control terminal of the second light-emitting control module 1101.

Exemplarily, each of the first transistor to the eighth transistor may be a P-type transistor or an N-type transistor. Since the manufacturing process of the P-type transistor in the display panel is mature and low in cost, optionally, the first transistor to the eighth transistor may be all P-type transistors. The P-type transistor has the characteristics of being turned off when the control terminal is at a high level, and being turned on when the control terminal is at a low level. Of course, in other embodiments, the first transistor to the eighth transistor may also be N-type transistors. At this time, it is necessary to set each of the scan signal, the enable signal and the power supply signal to a signal of opposite polarity to that when the first transistor to the eighth transistor are P-type transistors. The operation principle of the pixel driving circuit according to the embodiments of the present application will be described below in conjunction with FIGS. 31 and 32.

In t0 stage, the t0 stage is a light-emitting stage of a previous frame signal.

In t1 stage, in this stage, a rising edge of the enable signal input from the enable signal input terminal EM comes, the first light-emitting control module 109 and the second light-emitting control module 1101 are turned off, the light-emitting module 102 stops emitting light, thereby turning on the display of the present frame.

In t2 stage, a falling edge of the long scan signal arrives in this stage, and the threshold compensation module 104 is turned on to facilitate the subsequent initialization and charging. The threshold compensation module 104 is set to be turned on before the initialization stage, the initialization time can be maximized, and the initialization effect can be ensured.

In t3 stage, this stage is an initialization stage, that is, the long scan signal and the first scan signal are both low levels in the t3 stage. The threshold compensation module 104 and the first initialization module 106 are both turned on. The initialization signal is written into the control terminal of the drive module 101 to initialize the drive module 101 and ensure that the drive module 101 is turned on in the charging stage.

In t4 stage, this stage is a charging stage. In the stage t4, the first scan signal input from the first scan signal input terminal S1 becomes a high level, the first initialization module 106 is turned off, and the second scan signal input from the second scan signal input terminal S2 is at a low level level. At this time, the data write module 103 and the first blocking module 108 are turned on. Since the long scan signal is still at a low level, the threshold compensation module 104 continues to be turned on. The data signal input from the data signal input terminal Data is written into the control terminal of the drive module 101 after passing through the drive module 101, the first blocking module 108 and the threshold compensation module 104, so that the potential of the control terminal of the drive module 101 is changed. When the potential of the control terminal of the drive module 101 is changed to a condition that a potential difference between the potential of the control terminal of the drive module 101 and the potential of the first terminal of the drive module 101 is the threshold voltage of the drive module 101, the drive module 101 is turned off, and the data signal stops being written. At this time, the potential of the control terminal of the drive module 101 is related to the threshold voltage of the drive module 101 and is stored in the storage module 105.

In t5 stage, in this stage, both the first scan signal and the second scan signal are at high levels, and the enable signal input from the enable signal input terminal EM is also at a high level, and the ready-to-light-emitting stage is entered.

In t6 stage, the enable signal becomes a low level in this stage, the first light-emitting control module 109 and the second light-emitting control module 1101 are turned on, and the light-emitting module 102 starts to emit light, and the drive current does not change with the shift of the threshold voltage of the drive module, so that the light-emitting module has good light-emitting stability. In addition, the potential of the electric leakage prevention node N1 is relatively stable due to the holding action of the first holding module 107, so that the potential of the control terminal of the drive module 101 is relatively stable, that is, the waveform G of the control terminal of the drive module 101 is relatively flat, thereby greatly improving the flickering problem.

Optionally, with continued reference to FIG. 8, the pixel driving circuit may further include a second initialization module 111, the first terminal of the second initialization module 111 is electrically connected to the initialization signal input terminal Vref, the second terminal of the second initialization module 111 is electrically connected to the first terminal of the light-emitting module 102, and the control terminal of the second initialization module 111 is electrically connected to the third scan signal input terminal S3 of the pixel driving circuit.

Exemplarily, the second initialization module 111 may include a ninth transistor M9, a first terminal of the ninth transistor M9 serves as the first terminal of the second initialization module 111, a second terminal of the ninth transistor M9 serves as the second terminal of the second initialization module 111, a control terminal of the ninth transistor M9 serves as the control terminal of the second initialization module 111, and the ninth transistor M9 may be, for example, a P-type transistor. The second initialization module 111 is configured to initialize the light-emitting module 102 so as to prevent the potential remaining on the light-emitting module 102 in the previous frame from affecting the light-emitting of the current frame. The third scan signal input from the third scan signal input terminal S3 controls the turn-on or turn-off of the second initialization module 111. The third scan signal may be obtained by multiplexing the first scan signal, may be obtained by multiplexing the second scan signal, or may be an additional scan signal, and the scan signal and the first scan signal are also signals shifted from each other, as long as the light-emitting module 102 is reset before the light-emitting stage.

Optionally, with continued reference to FIG. 31, the first blocking module 108 is a first double-gate transistor, the pixel driving circuit further includes a third holding module 112, and the third holding module 112 is configured to hold the potential of the double-gate node of the first double-gate transistor.

Exemplarily, the double-gate node of the first double-gate transistor is a node in which the source and drain of two sub-transistors of the first double-gate transistor are connected. When the double-gate transistor is turned off, a potential of the double-gate node of the double-gate transistor is unstable. If one potential is not maintained, then the electric leakage phenomenon of the electric leakage prevention node N1 through the double-gate node is also serious. therefore in this embodiment, a third holding module 112 may be arranged at the double-gate node to hold the potential of the double-gate node of the first double-gate transistor, thereby maintaining the potential of the electric leakage prevention node N1 to be stable. Exemplarily, the third holding module 112 may include a third capacitor C3, a first terminal of the third capacitor C3 is electrically connected to the double-gate node of the first double-gate transistor, and a second terminal of the third capacitor C3 may be configured to receive a fixed signal, for example, the second terminal of the third capacitor C3 may be electrically connected to the initialization signal input terminal Vref, or may be electrically connected to the first power supply signal input terminal VDD, thereby reducing a number of signal lines in the pixel driving circuit and facilitating the implementation of the narrow frame of the display panel.

Optionally, with continued reference to FIG. 31, the first initialization module 106 is a second double-gate transistor, the pixel driving circuit further includes a fourth holding module 113, and the fourth holding module 113 is configured to hold the potential of the double-gate node of the second double-gate transistor.

Exemplarily, the double-gate node of the second double-gate transistor is a node in which the source and drain of two sub-transistors of the second double-gate transistor are connected. When the double-gate transistor is turned off, a potential of the double-gate node of the double-gate transistor is unstable. If one potential is not maintained, then the electric leakage phenomenon of the electric leakage prevention node N1 through the double-gate node is also serious, therefore in this embodiment, a fourth holding module 112 may be arranged at the double-gate node of the second double-gate transistor to hold the potential of the double-gate node of the second double-gate transistor, thereby maintaining the potential of the electric leakage prevention node N1 to be stable. Exemplarily, the fourth holding module 113 may include a fourth capacitor C4, a first terminal of the fourth capacitor C4 is electrically connected to the double-gate node of the second double-gate transistor, and a second terminal of the fourth capacitor C4 may be configured to receive a fixed signal, for example, the second terminal of the fourth capacitor C4 may be electrically connected to the initialization signal input terminal Vref, or may be electrically connected to the first power supply signal input terminal VDD, thereby reducing a number of signal lines in the pixel driving circuit and facilitating the implementation of the narrow frame of the display panel.

Optionally, with continued reference to FIG. 31, the pixel driving circuit further includes a coupling module 114 configured to hold the potential of the control terminal of the drive module 101. A first terminal of the coupling module 114 is electrically connected to the control terminal of the drive module 101, and a second terminal of the coupling module 114 is electrically connected to the control terminal of the threshold compensation module 104.

Exemplarily, in this embodiment, the coupling module 114 may include a fifth capacitor C5, a first terminal of the fifth capacitor C5 serves as the first terminal of the coupling module 114, and a second terminal of the fifth capacitor C5 serves as the second terminal of the coupling module 114. The fifth capacitor C5 is provided so that the capacitor value of the storage module is equivalently increased, which is more favorable for maintaining the stability of the potential of the control terminal of the drive module 101, and thus is more favorable for reducing the flicker phenomenon. On the other hand, since the coupling module 114 is connected to the control terminal of the threshold compensation module 104, when the potential of the control terminal of the threshold compensation module 104 is changed from a low level to a high level, the potential of the control terminal of the drive module 101 may be increased, thereby compensating for the loss of the potential of the control terminal of the drive module 101, and maintaining the stability of the potential of the control terminal of the drive module 101. For ease of wiring, the second terminal of the fifth capacitor C5 may be electrically connected to the control terminal of the threshold compensation module 104.

In this embodiment, the third capacitor C3, the fourth capacitor C4 and the fifth capacitor C5 are provided so that the potential of the corresponding node can be stabilized, and moreover, the amplitude of the capacitive coupling can be reduced.

Figure 33:
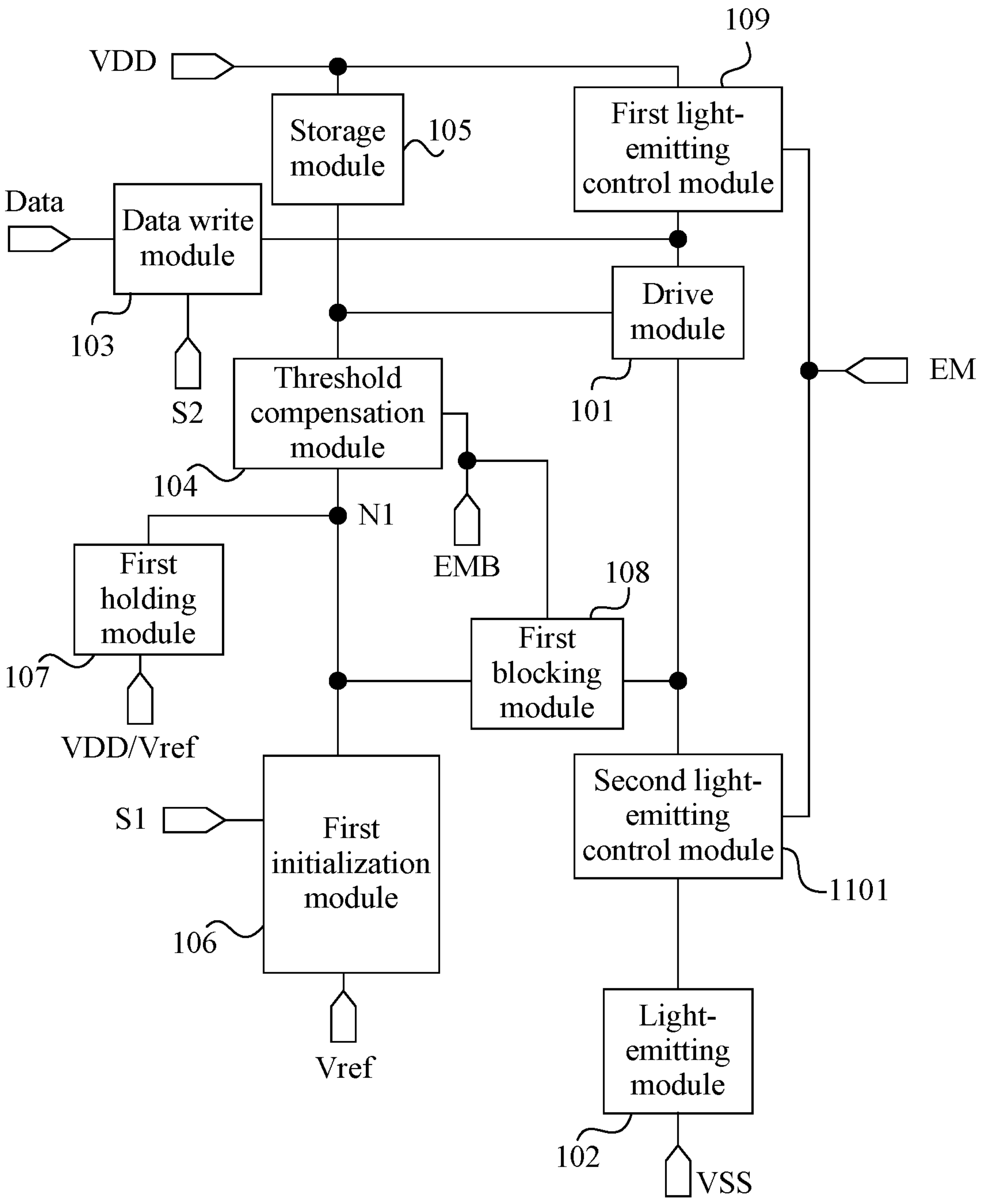
FIG. 33 is a schematic diagram showing a circuit structure of a pixel driving circuit according to another embodiment of the present application.

FIG. 33 is a schematic diagram showing a circuit structure of a pixel driving circuit according to another embodiment of the present application. Referring to FIG. 33, unlike the pixel driving circuit shown in the foregoing embodiments, the control terminal of the first blocking module 108 of the pixel driving circuit in this embodiment is also electrically connected to the long scan signal input terminal EMB. The connection relationship of the pixel driving circuit in this embodiment is as follows. The first terminal of the first initialization module 106 is electrically connected to the initialization signal input terminal Vref, and the control terminal of the first initialization module 106 is electrically connected to the first scan signal S1 of the pixel driving circuit. The first terminal of the data write module 103 is electrically connected to the data signal input terminal Data of the pixel driving circuit, the second terminal of the data write module 103 is electrically connected to the first terminal of the drive module 101, and the control terminal of the data write module 101 is electrically connected to the second scan signal input S2 of the pixel driving circuit. The first terminal of the storage module 105 is electrically connected to the first power supply signal input terminal VDD of the pixel driving circuit, and the second terminal of the storage module 105 is electrically connected to the control terminal of the drive module 101. The pixel driving circuit further includes a first light-emitting control module 109 and a second light-emitting control module 1101. A first terminal of the first light-emitting control module 109 is electrically connected to the first power supply signal input terminal VDD, a second terminal of the first light-emitting control module 109 is electrically connected to the first terminal of the drive module 101, and a control terminal of the first light-emitting control module 109 is electrically connected to the enable signal input terminal EM of the pixel driving circuit. A first terminal of the second light-emitting control module 1101 is electrically connected to the second terminal of the drive module 101, a second terminal of the second light-emitting control module 1101 is electrically connected to the first terminal of the light-emitting module 102, and a control terminal of the second light-emitting control module 1101 is electrically connected to the enable signal input terminal EM. The second terminal of the light-emitting module 102 is electrically connected to the second power signal input terminal VSS of the pixel driving circuit. The first terminal of the first holding module 107 is electrically connected to the initialization signal input terminal Vref or the first power supply signal input terminal VDD, and the second terminal of the first holding module 107 is electrically connected to the electric leakage prevention node N1. The first terminal of the threshold compensation module 104 is electrically connected to the control terminal of the drive module 101, the second terminal of the threshold compensation module 104 is electrically connected to the electric leakage prevention node N1, and the control terminal of the threshold compensation module 104 is electrically connected to the long scan signal input terminal EMB of the pixel driving circuit. The first terminal of the first blocking module 108 is electrically connected to the electric leakage prevention node N1, the second terminal of the first blocking module 108 is electrically connected to the second terminal of the drive module 101, and the control terminal of the first blocking module 108 is electrically connected to the long scan signal input terminal EMB. The long scan signal input terminal EMB is configured to input a turn-on signal at both the initialization stage and the charging stage. The first terminal of the first holding module 107 is configured to receive a signal of the fixed potential, and the first terminal of the first holding module 107 is connected to the initialization signal input terminal Vref or the first power supply signal input terminal VDD in order to facilitate wiring and reduce the number of signal lines.

Exemplarily, in this embodiment, the first scan signal input from the first scan signal input terminal S1 and the second scan signal input from the second scan signal input terminal S2 are a same group of scan signals, that is, the first scan signal and the second scan signal are generated by a same group of GIP circuits, whose pulse widths are the same and are shifted from each other. A long scan signal input from the long scan signal input terminal EMB has a long pulse width, and the duration of the pulse width covers at least the initialization stage and the charging stage. In the initialization stage, the threshold compensation module 104 and the first initialization module 106 are both turned on, so that the initialization signal is input to the control terminal of the drive module 101, and the control terminal of the drive module 101 is initialized, and the drive module 101 is conveniently turned on in the charging stage. In the charging stage, the data write module 103, the first blocking module 108 and the threshold compensation module 104 are all turned on, so that the data signal is written into the control terminal of the drive module 101 after passing through the data write module 103, the drive module 101, the first blocking module 108 and the threshold compensation module 104. When the potential difference between the control terminal of the drive module 101 and the first terminal of the drive module 101 is the threshold voltage of the drive module 101, the drive module 101 is turned off, and the data signal stops being written. At this time, the potential of the control terminal of the drive module 101 is related to the threshold voltage of the drive module 101, and the potential is stored on the storage module 105. In the light-emitting stage, the drive module generates a drive current independent of its threshold voltage, thereby controlling the light-emitting module to emit light. In the pixel driving circuit of this embodiment, except that there is only one electric leakage path and the potential of the electric leakage prevention node N1 may be maintained, since a new scan signal is additionally provided at the control terminal of the threshold compensation module 104 and the control terminal of the first blocking module 108, it is possible to ensure that the time of both the initialization stage and the charging stage is long, so that the drive module 101 can be sufficiently initialized and charged.

Figure 34:
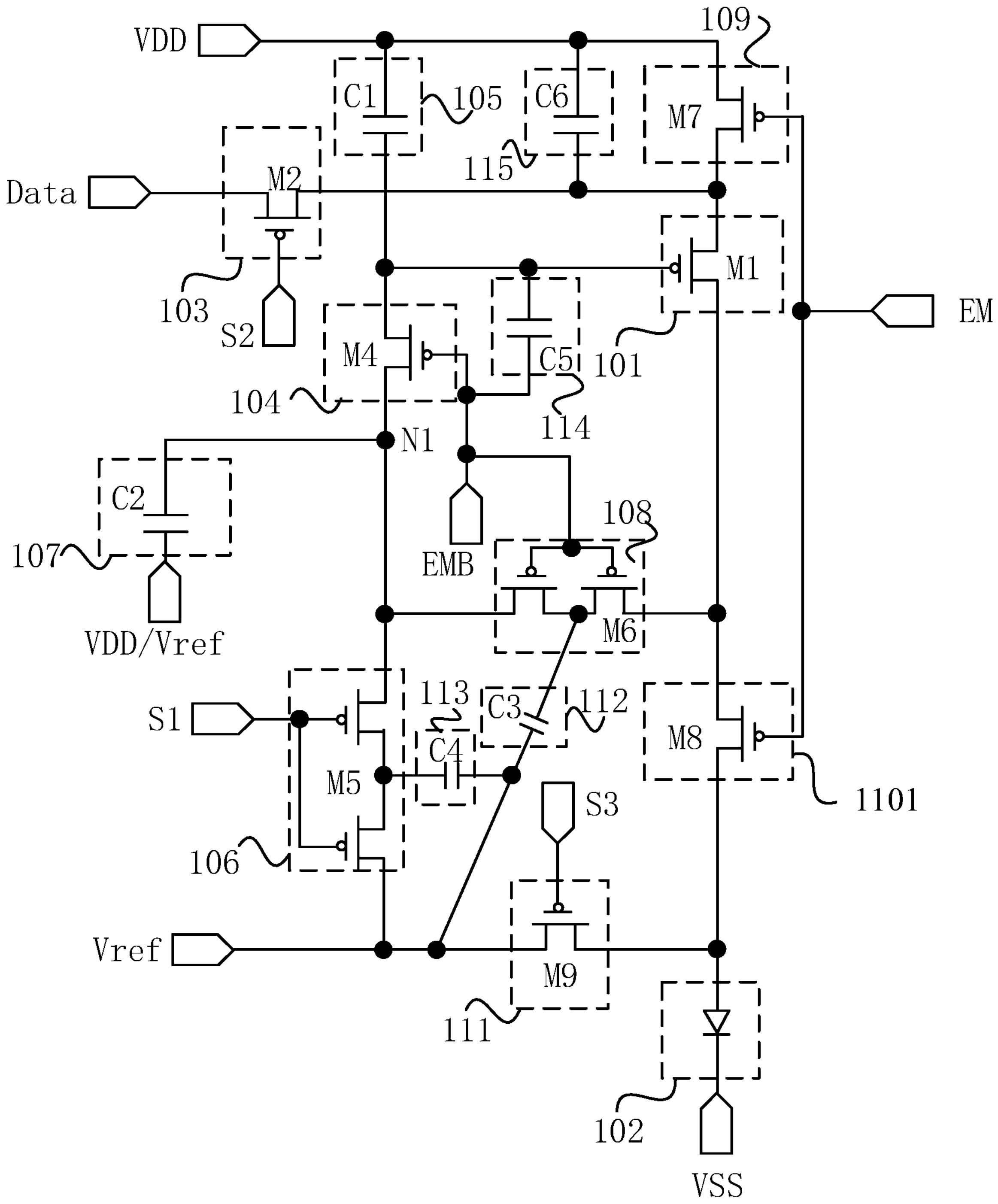
FIG. 34 is a schematic diagram showing a circuit structure of still another pixel driving circuit according to another embodiment of the present application.
Figure 35:
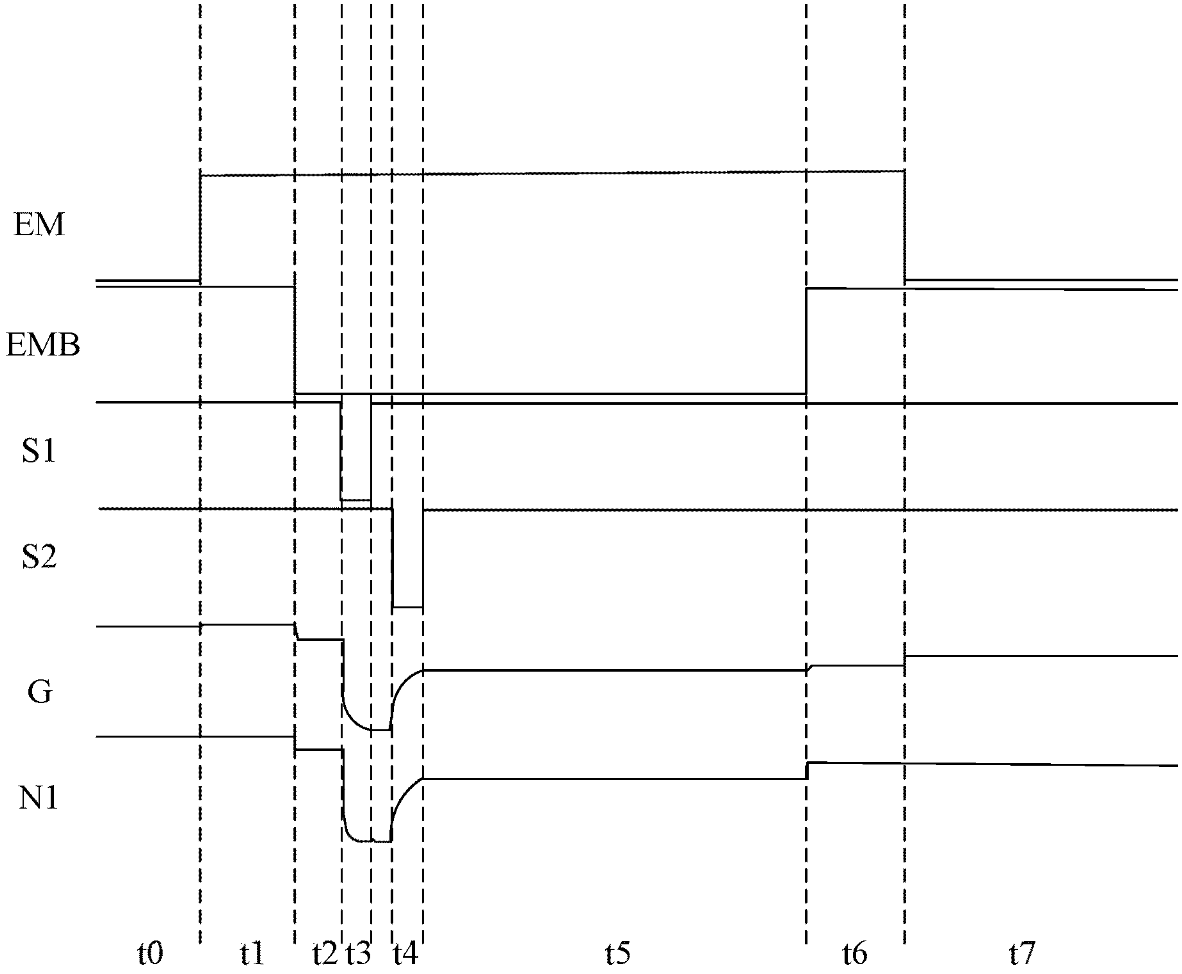
FIG. 35 is a timing diagram of a pixel driving circuit according to another embodiment of the present application.

Exemplarily, FIG. 34 is a schematic diagram showing a circuit structure of still another pixel driving circuit according to another embodiment of the present application. FIG. 35 is a timing diagram of a pixel driving circuit according to another embodiment of the present application. FIG. 35 corresponds to FIG. 34. In conjunction with FIGS. 35 and 34, a drive module 101 includes a first transistor M1. A first terminal of the first transistor M1 serves as the first terminal of the drive module 101, a second terminal of the first transistor M1 serves as the second terminal of the drive module 101, and a control terminal of the first transistor M1 serves as the control terminal of the drive module 101. The light-emitting module 102 is an OLED. The data write module 103 includes a second transistor M2, a first terminal of the second transistor M2 serves as the first terminal of the data write module 103, a second terminal of the second transistor M2 serves as the second terminal of the data write module 103, and a control terminal of the second transistor M2 serves as the control terminal of the data write module 103. The threshold compensation module 104 includes a third transistor M4, a first terminal of the third transistor M4 serves as the first terminal of the threshold compensation module 104, a second terminal of the third transistor M4 serves as the second terminal of the threshold compensation module 104, and a control terminal of the third transistor M4 serves as the control terminal of the threshold compensation module 104. The storage module 105 includes a first capacitor C1, a first terminal of the first capacitor C1 serves as the first terminal of the storage module 105, and a second terminal of the first capacitor C1 serves as the second terminal of the storage module 105. The first initialization module 106 includes a fifth transistor M5, a first terminal of the fifth transistor M5 serves as the first terminal of the first initialization module 106, a second terminal of the fifth transistor M5 serves as the second terminal of the first initialization module 106, and a control terminal of the fifth transistor M5 serves as the control terminal of the first initialization module 106. The first holding module 107 includes a second capacitor C2, a first terminal of the second capacitor C2 serves as the first terminal of the first holding module 107, and a second terminal of the second capacitor C2 serves as the second terminal of the first holding module 107. The first blocking module 108 includes a sixth transistor M6, a first terminal of the sixth transistor M6 serves as the first terminal of the first blocking module 108, a second terminal of the sixth transistor M6 serves as the second terminal of the first blocking module 108, and a control terminal of the sixth transistor M6 serves as the control terminal of the first blocking module 108. The first light-emitting control module 109 includes a seventh transistor M7, a first terminal of the seventh transistor M7 serves as the first terminal of the first light-emitting control module 109, a second terminal of the seventh transistor M7 serves as the second terminal of the first light-emitting control module 109, and a control terminal of the seventh transistor M7 serves as the control terminal of the first light-emitting control module 109. The second light-emitting control module 1101 includes an eighth transistor M8, a first terminal of the eighth transistor M8 serves as the first terminal of the second light-emitting control module 1101, a second terminal of the eighth transistor M8 serves as the second terminal of the second light-emitting control module 1101, and a control terminal of the eighth transistor M8 serves as the control terminal of the second light-emitting control module 1101.

Exemplarily, each of the first transistor to the eighth transistor may be a P-type transistor or an N-type transistor. Since the manufacturing process of the P-type transistor in the display panel is mature and low in cost, optionally, the first transistor to the eighth transistor may be all P-type transistors. The P-type transistor has the characteristics of being turned off when the control terminal is at a high level, and being turned on when the control terminal is at a low level. Of course, in other embodiments, the first transistor to the eighth transistor may also be N-type transistors. At this time, it is necessary to set each of the scan signal, the enable signal and the power supply signal to a signal of opposite polarity to that when the first transistor to the eighth transistor are P-type transistors. The operation principle of the pixel driving circuit according to the embodiments of the present application will be described below with reference to FIGS. 35 and 34.

In t0 stage, the t0 stage is a light-emitting stage of a previous frame signal.

In t1 stage, in this stage, a rising edge of the enable signal input from the enable signal input terminal EM comes, the first light-emitting control module 109 and the second light-emitting control module 1101 are turned off, the light-emitting module 102 stops emitting light, thereby turning on the display of the present frame.

In t2 stage, a falling edge of the long scan signal arrives in this stage, and the threshold compensation module 104 is turned on to facilitate the subsequent initialization and charging. The threshold compensation module 104 is set to be turned on before the initialization stage, the initialization time can be maximized, and the initialization effect can be ensured.

In t3 stage, this stage is an initialization stage, that is, the long scan signal and the first scan signal are both low levels in the t3 stage. The threshold compensation module 104 and the first initialization module 106 are both turned on. The initialization signal is written into the control terminal of the drive module 101 to initialize the drive module 101 and ensure that the drive module 101 is turned on in the charging stage.

In t4 stage, this stage is a charging stage. In the stage t4, the first scan signal input from the first scan signal input terminal S1 becomes a high level, the first initialization module 106 is turned off, and the second scan signal input from the second scan signal input terminal S2 is at a low level level. At this time, the data write module 103 and the first blocking module 108 are turned on. Since the long scan signal is still at a low level, the threshold compensation module 104 continues to be turned on. The data signal input from the data signal input terminal Data is written into the control terminal of the drive module 101 after passing through the drive module 101, the first blocking module 108 and the threshold compensation module 104, so that the potential of the control terminal of the drive module 101 is changed. When the potential of the control terminal of the drive module 101 is changed to a condition that a potential difference between the potential of the control terminal of the drive module 101 and the potential of the first terminal of the drive module 101 is the threshold voltage of the drive module 101, the drive module 101 is turned off, and the data signal stops being written. At this time, the potential of the control terminal of the drive module 101 is related to the threshold voltage of the drive module 101 and is stored in the storage module 105.

In t5 stage, in this stage, the second scan signal is at a high level, and the data signal stops being written, that is, the charging time ends.

In t6 stage, in this stage, both the first scan signal and the second scan signal are at high levels, and the enable signal input from the enable signal input terminal EM is also at a high level, and the ready-to-light-emitting stage is entered.

In t7 stage, the enable signal becomes a low level in this stage, the first light-emitting control module 109 and the second light-emitting control module 1101 are turned on, and the light-emitting module 102 starts to emit light, and the drive current does not change with the shift of the threshold voltage of the drive module, so that the light-emitting module has good light-emitting stability. In addition, the potential of the electric leakage prevention node N1 is relatively stable due to the holding action of the first holding module 107, so that the potential of the control terminal of the drive module 101 is relatively stable, that is, the waveform G of the control terminal of the drive module 101 is relatively flat, thereby greatly improving the flickering problem.

Optionally, with continued reference to FIG. 34, the pixel driving circuit further includes a second holding module 115. The second holding module 115 is configured to hold the potential of the first terminal of the drive module 101, and a long scan signal input terminal EMB is configured to input a turn-on signal for a predetermined time between the charging stage and the light-emitting stage.

Exemplarily, in conjunction with FIGS. 35 and 34, in the pixel driving circuit, the duration of the first scan signal and the second scan signal is generally short, at a low refresh frequency, the drive module 101 may not be turned off during the charging stage due to insufficient charging, so that the threshold compensation effect cannot be achieved. In this embodiment, the second holding module 115 is provided, and a preset time (t5 stage) is set between the charging stage (t4 stage) and the light-emitting stage (t7 stage). The long scan signal is still at a low level within the preset time. In the charging stage, the data signal is written into the second holding module 115. In the t5 stage, since the drive module 101 continues to be turned on, the data signal stored on the second holding module 115 continues to charge the control terminal of the drive module 101 through the drive module 101, the first blocking module 108 and the threshold compensation module 104, thereby ensuring that the threshold voltage of the drive module 101 can be sufficiently compensated and ensuring the stability of the light-emitting module 102. Exemplarily, the first terminal of the second holding module 115 is electrically connected to the first terminal of the drive module 101, and a second terminal of the second holding module 115 is electrically connected to the first power supply signal input terminal VDD. The second holding module 115 may include a sixth capacitor C6, a first terminal of the sixth capacitor C6 serves as the first terminal of the second holding module 115, and a second terminal of the sixth capacitor C6 serves as the second terminal of the second holding module 115. In this embodiment, the sixth capacitor C6 is connected to the first power supply signal input terminal VDD in order to reduce a number of signal lines and to facilitate wiring. Of course, in other some embodiments, the second terminal of the sixth capacitor C2 is configured to receive one fixed signal.

Optionally, with continued reference to FIG. 34, the pixel driving circuit may further include a second initialization module 111. A first terminal of the second initialization module 111 is electrically connected to an initialization signal input terminal Vref, a second terminal of the second initialization module 111 is electrically connected to a first terminal of the light-emitting module 102, and a control terminal of the second initialization module 111 is electrically connected to a third scan signal input terminal S3 of the pixel driving circuit.

Exemplarily, the second initialization module 111 may include a ninth transistor M9, a first terminal of the ninth transistor M9 serves as the first terminal of the second initialization module 111, a second terminal of the ninth transistor M9 serves as the second terminal of the second initialization module 111, a control terminal of the ninth transistor M9 serves as the control terminal of the second initialization module 111, and the ninth transistor M9 may be, for example, a P-type transistor. The second initialization module 111 is configured to initialize the light-emitting module 102 so as to prevent the potential remaining on the light-emitting module 102 in the previous frame from affecting the light-emitting of the current frame. The third scan signal input from the third scan signal input terminal S3 controls the turn-on or turn-off of the second initialization module 111. The third scan signal may be obtained by multiplexing the first scan signal, may be obtained by multiplexing the second scan signal, or may be an additional scan signal, and the scan signal and the first scan signal are also signals shifted from each other, as long as the light-emitting module 102 is reset before the light-emitting stage.

Exemplarily, at least one of the threshold compensation module 104, the first initialization module 106 and the first blocking module108 includes a double-gate transistor.

Optionally, with continued reference to FIG. 34, the first blocking module 108 is a first double-gate transistor, the pixel driving circuit further includes a third holding module 112, and the third holding module 112 is configured to hold the potential of the double-gate node of the first double-gate transistor.

Exemplarily, the double-gate node of the first double-gate transistor is a node in which the source and drain of two sub-transistors of the first double-gate transistor are connected. When the double-gate transistor is turned off, a potential of the double-gate node of the double-gate transistor is unstable. If one potential is not maintained, then the electric leakage phenomenon of the electric leakage prevention node N1 through the double-gate node is also serious, therefore in this embodiment, a third holding module 112 may be arranged at the double-gate node to hold the potential of the double-gate node of the first double-gate transistor, thereby maintaining the potential of the electric leakage prevention node N1 to be stable. Exemplarily, the third holding module 112 may include a third capacitor C3, a first terminal of the third capacitor C3 is electrically connected to the double-gate node of the first double-gate transistor, and a second terminal of the third capacitor C3 may be configured to receive a fixed signal, for example, the second terminal of the third capacitor C3 may be electrically connected to the initialization signal input terminal Vref, or may be electrically connected to the first power supply signal input terminal VDD, thereby reducing a number of signal lines in the pixel driving circuit and facilitating the implementation of the narrow frame of the display panel.

Optionally, with continued reference to FIG. 34, the first initialization module 106 is a second double-gate transistor, and the pixel driving circuit further includes a fourth holding module 113 configured to hold the potential of the double-gate node of the second double-gate transistor.

Exemplarily, the double-gate node of the second double-gate transistor is a node in which the source and drain of two sub-transistors of the second double-gate transistor are connected. When the double-gate transistor is turned off, a potential of the double-gate node of the double-gate transistor is unstable. If one potential is not maintained, then the electric leakage phenomenon of the electric leakage prevention node N1 through the double-gate node is also serious, therefore, in this embodiment, a fourth holding module 113 may be arranged at the double-gate node of the second double-gate transistor to hold the potential of the double-gate node of the second double-gate transistor, thereby maintaining the potential of the electric leakage prevention node N1 to be stable. Exemplarily, the fourth holding module 113 may include a fourth capacitor C4, a first terminal of the fourth capacitor C4 is electrically connected to the double-gate node of the second double-gate transistor, and a second terminal of the fourth capacitor C4 may be configured to receive a fixed signal, for example, the second terminal of the fourth capacitor C4 may be electrically connected to the initialization signal input terminal Vref, or may be electrically connected to the first power supply signal input terminal VDD, thereby reducing the number of signal lines in the pixel driving circuit and facilitating the implementation of the narrow frame of the display panel.

Optionally, with continued reference to FIG. 34, the pixel driving circuit further includes a coupling module 114 configured to hold the potential of the control terminal of the drive module 101. A first terminal of the coupling module 114 is electrically connected to the control terminal of the drive module 101, and a second terminal of the coupling module 114 is electrically connected to the control terminal of the threshold compensation module 104.

Exemplarily, in this embodiment, the coupling module 114 may include a fifth capacitor C5, a first terminal of the fifth capacitor C5 serves as the first terminal of the coupling module 114, and a second terminal of the fifth capacitor C5 serves as the second terminal of the coupling module 114. The fifth capacitor C5 is provided so that the capacitor value of the storage module is equivalently increased, which is more favorable for maintaining the stability of the potential of the control terminal of the drive module 101, and thus is more favorable for reducing the flicker phenomenon. On the other hand, since the coupling module 114 is connected to the control terminal of the threshold compensation module 104, when the potential of the control terminal of the threshold compensation module 104 is changed from a low level to a high level, the potential of the control terminal of the drive module 101 may be increased, thereby compensating for the loss of the potential of the control terminal of the drive module 101, and maintaining the stability of the potential of the control terminal of the drive module 101. For ease of wiring, the second terminal of the fifth capacitor C5 may be configured to be electrically connected to the control terminal of the threshold compensation module 104.

In some other embodiments, the threshold compensation module 104 may also be a double-gate transistor, and in some embodiments, the electric leakage prevention node N1 may be a double-gate node of the threshold compensation module 104, the first initialization module 104 and the first blocking module 108 are no longer directly electrically connected to the electric leakage prevention node N1, and the first initialization module 104 and the first blocking module 108 are electrically connected to the second terminal of the threshold compensation module 104. The threshold compensation module 104 is provided as the double-gate transistor, to reduce the leakage current. In this embodiment, the connection manner of other modules of the pixel driving circuit may refer to the connection manner of any of the above embodiments, and will not be described here in detail.

Figure 36:
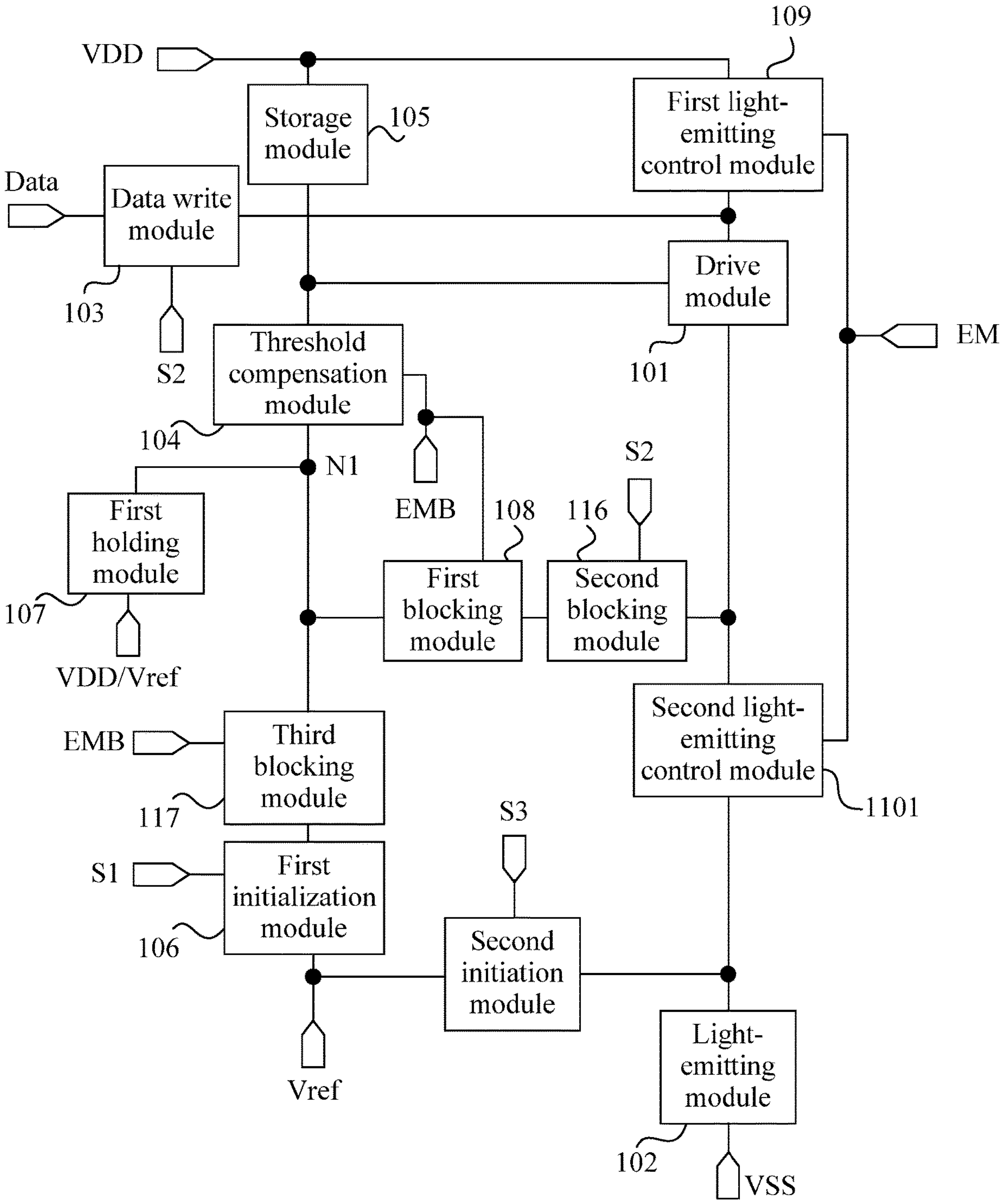
FIG. 36 is a schematic diagram showing a circuit structure of a pixel driving circuit according to another embodiment of the present application.

FIG. 36 is a schematic diagram showing a circuit structure of a pixel driving circuit according to another embodiment of the present application. Referring to FIG. 36, the pixel driving circuit further includes a second blocking module 116, a third blocking module 117 and a second initialization module 111. A first terminal of the threshold compensation module 104 is electrically connected to the control terminal of the drive module 101, a second terminal of the threshold compensation module 104 is electrically connected to the electric leakage prevention node N1, and a control terminal of the threshold compensation module 104 is electrically connected to the long scan signal input terminal EMB of the pixel driving circuit. The first terminal of the first blocking module 108 is electrically connected to the electric leakage prevention node N1, the second terminal of the first blocking module 108 is electrically connected to the first terminal of the second blocking module 116, and the control terminal of the first blocking module 108 is electrically connected to the input terminal of the long scan signal EMB. The second terminal of the second blocking module 116 is electrically connected to the second terminal of the drive module 101, and the control terminal of the second blocking module 116 is electrically connected to the second scan signal input S2 of the pixel driving circuit. A first terminal of the third blocking module 117 is electrically connected to the electric leakage prevention node N1, a second terminal of the third blocking module 117 is electrically connected to a second terminal of the first initialization module 106, and a control terminal of the third blocking module 117 is electrically connected to the long scan signal input terminal EMB. A first terminal of the second initialization module 111 is electrically connected to the first initialization signal input terminal Vref, a second terminal of the second initialization module 111 is electrically connected to the first terminal of the light-emitting module 102, and a control terminal of the second initialization module 111 is electrically connected to the third scan signal input terminal S3. The long scan signal input terminal EMB is configured to input a turn-on signal at both the initialization stage and the charging stage.

Exemplarily, in this embodiment, the first terminal of the first initialization module 106 is electrically connected to the initialization signal input terminal Vref, and the control terminal of the first initialization module 106 is electrically connected to the first scan signal S1 of the pixel driving circuit. A first terminal of the data write module 103 is electrically connected to the data signal input terminal Data of the pixel driving circuit, a second terminal of the data write module 103 is electrically connected to the first terminal of the drive module 101, and a control terminal of the data write module 103 is electrically connected to the second scan signal input S2 of the pixel driving circuit. A first terminal of the storage module 105 is electrically connected to the first power supply signal input terminal VDD of the pixel driving circuit, and a second terminal of the storage module 105 is electrically connected to the control terminal of the drive module 101. The pixel driving circuit further includes a first light-emitting control module 109 and a second light-emitting control module 1101, a first terminal of the first light-emitting control module 109 is electrically connected to the first power supply signal input terminal VDD, a second terminal of the first light-emitting control module 109 is electrically connected to the first terminal of the drive module 101, and a control terminal of the first light-emitting control module 109 is electrically connected to the enable signal input terminal EM of the pixel driving circuit. The first terminal of the second light-emitting control module 1101 is electrically connected to the second terminal of the drive module 101, the second terminal of the second light-emitting control module 1101 is electrically connected to the first terminal of the light-emitting module 102, and the control terminal of the second light-emitting control module 1101 is electrically connected to the enable signal input terminal EM. The second terminal of the light-emitting module 102 is electrically connected to the second power signal input terminal VSS of the pixel driving circuit. The first terminal of the first holding module 107 is electrically connected to the initialization signal input terminal Vref or the first power supply signal input terminal VDD, and the second terminal of the first holding module 107 is electrically connected to the electric leakage prevention node N1. The first scan signal inputted from the first scan signal input terminal S1, the second scan signal inputted from the second scan signal input terminal S2, and the third scan signal inputted from the third scan signal input terminal S3 are a same group of scan signals, that is, the first scan signal, the second scan signal and the third scan signal are generated by a same group of GIP circuits, whose pulse widths are the same and are shifted from each other. Optionally, the third scan signal may be the same as the first scan signal. The long scan signal input from the long scan signal input terminal EMB has a long pulse width, and the duration of the pulse width covers at least an initialization stage and a charging stage. In the initialization stage, the threshold compensation module 104 and the first initialization module 106 are both turned on, so that the initialization signal is input to the control terminal of the drive module 101, and the control terminal of the drive module 101 is initialized, and the drive module 101 is conveniently turned on. In the charging stage, the data write module 103, the first blocking module 108 and the threshold compensation module 104 are all turned on, so that the data signal is written into the control terminal of the drive module 101 after passing through the data write module 103, the drive module 101, the first blocking module 108, and the threshold compensation module 104. When the potential difference between the control terminal of the drive module 101 and the first terminal of the drive module 101 is the threshold voltage of the drive module 101, the drive module 101 is turned off, and the data signal stops being written. At this time, the potential of the control terminal of the drive module 101 is related to the threshold voltage of the drive module 101, and the potential is stored on the storage module 105. In the light-emitting stage, the drive module generates a drive current independent of its threshold voltage, thereby controlling the light-emitting module to emit light. In the pixel driving circuit of this embodiment, except that there is only one leakage current path and the potential of the electric leakage prevention node N1 may be maintained, since a new scan signal is additionally provided at the control terminal of the threshold compensation module 104, it is possible to ensure that the time of both the initialization stage and the charging stage is long, so that the drive module 101 can be sufficiently initialized and charged.

In addition, when the pixel driving circuit is applied to the low refresh frequency, the light-emitting time of the light-emitting module 102 is relatively long and the life of the light-emitting module 102 is relatively short. The light-emitting module 102 may be controlled not to emit light in a black frame insertion manner, that is, in a black frame insertion stage, so that the light-emitting time of the light-emitting module 102 is shortened, and the service life of the light-emitting module is further prolonged. Part of low-frequency brightness components which are sensitive to human eyes may be converted into insensitive high-frequency brightness components in the black frame insertion manner. In this embodiment, the long scan signal input terminal may be set to be controlled to input the turn-off signal in the black frame insertion stage, and the third scan signal input terminal S3 is controlled to input the third scan signal in the black frame insertion stage, so as to reset the light-emitting module, thereby changing the low-frequency brightness component into the high-frequency brightness component, and achieving the effects of high current holding rate and low flicker. Moreover, the second blocking module 116 and the third blocking module 117 are provided, so that when the light-emitting module is reset in the black frame insertion stage, since the first scan signal, the second scan signal and the third scan signal are generated by a group of GIP circuits, that is, pulses of the first scan signal and the second scan signal will arrive successively in the black frame insertion stage, the second blocking module 116, the first initializing module 106 and the data write module 103 are turned on, in this embodiment, the second blocking module 116 and the third blocking module 117 are provided, so that the data signal in the black frame insertion stage may be blocked at the second blocking module, and the initializing signal may be blocked at the third blocking module, whereby the potential of the electric leakage prevention node N1 and the potential of the control terminal of the drive module 101 are prevented from being affected, the leakage current is prevented from increasing, and the phenomenon of large leakage current can be improved. In other words, during the black frame insertion, the reset of the light-emitting module 102 does not affect the control terminal of the drive module and the electric leakage prevention node, which not only eliminates the low-frequency brightness component sensitive to human eyes, and but also not change the potential of the electric leakage prevention node N1, so that the threshold compensation module 104 maintains a low electric leakage level, thereby eliminating the flicker problem at the low frequency.

The positions of the first blocking module 108 and the second blocking module 116 may be interchanged, and the positions of the third blocking module 117 and the first initialization module 106 may be interchanged. The first terminal of the first holding module 107 is configured to receive a signal of a fixed potential, in this embodiment, the first terminal of the first holding module 107 is connected to the initialization signal input terminal Vref or the first power supply signal input terminal VDD in order to facilitate wiring and reduce a number of signal lines.

Figure 37:
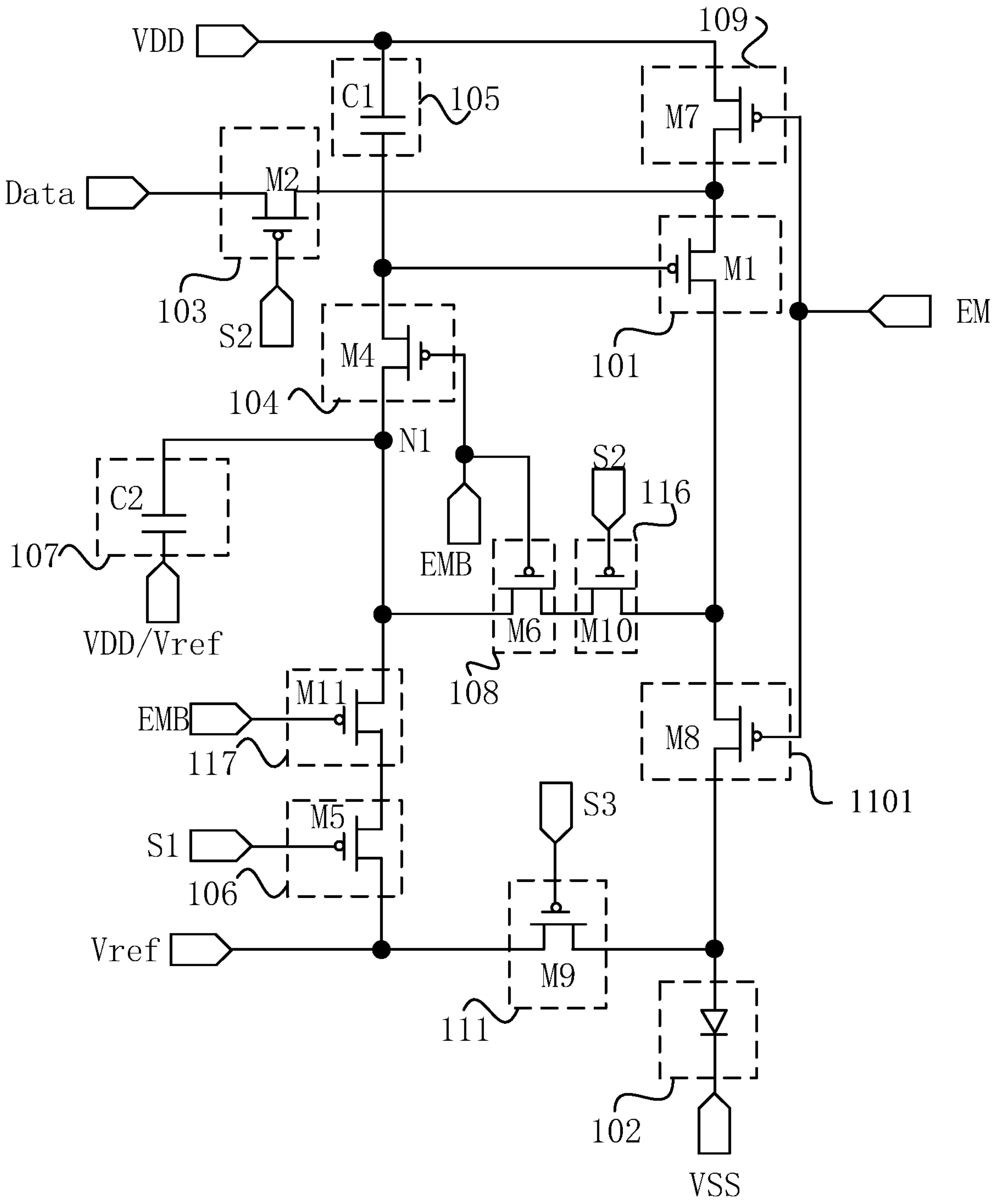
FIG. 37 is a schematic diagram showing a circuit structure of still another pixel driving circuit according to another embodiment of the present application.
Figure 38:
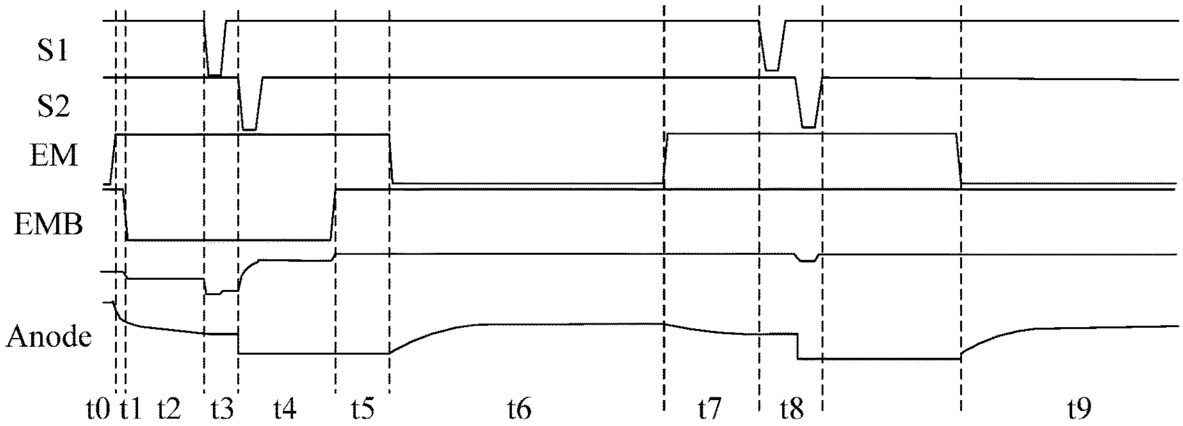
FIG. 38 is a timing diagram of a pixel driving circuit according to another embodiment of the present application.

FIG. 37 is a schematic diagram showing a circuit structure of still another pixel driving circuit according to another embodiment of the present application. FIG. 38 is a timing diagram of a pixel driving circuit according to another embodiment of the present application. In conjunction with FIGS. 37 and 38, a drive module 101 includes a first transistor M1. A first terminal of the first transistor M1 serves as the first terminal of the drive module 101, a second terminal of the first transistor M1 serves as the second terminal of the drive module 101, and a control terminal of the first transistor M1 serves as the control terminal of the drive module 101. The light-emitting module 102 is an OLED. The data write module 103 includes a second transistor M2, a first terminal of the second transistor M2 serves as the first terminal of the data write module 103, a second terminal of the second transistor M2 serves as the second terminal of the data write module 103, and a control terminal of the second transistor M2 serves as the control terminal of the data write module 103. The threshold compensation module 104 includes a third transistor M4, a first terminal of the third transistor M4 serves as the first terminal of the threshold compensation module 104, a second terminal of the third transistor M4 serves as the second terminal of the threshold compensation module 104, and a control terminal of the third transistor M4 serves as the control terminal of the threshold compensation module 104. The storage module 105 includes a first capacitor C1, a first terminal of the first capacitor C1 serves as the first terminal of the storage module 105, and a second terminal of the first capacitor C1 serves as the second terminal of the storage module 105. The first initialization module 106 includes a fifth transistor M5, a first terminal of the fifth transistor M5 serves as the first terminal of the first initialization module 106, a second terminal of the fifth transistor M5 serves as the second terminal of the first initialization module 106, and a control terminal of the fifth transistor M5 serves as the control terminal of the first initialization module 106. The first holding module 107 includes a second capacitor C2, a first terminal of the second capacitor C2 serves as the first terminal of the first holding module 107, and a second terminal of the second capacitor C2 serves as the second terminal of the first holding module 107. The first blocking module 108 includes a sixth transistor M6, a first terminal of the sixth transistor M6 serves as the first terminal of the first blocking module 108, a second terminal of the sixth transistor M6 serves as the second terminal of the first blocking module 108, and a control terminal of the sixth transistor M6 serves as the control terminal of the first blocking module 108. The first light-emitting control module 109 includes a seventh transistor M7, a first terminal of the seventh transistor M7 serves as the first terminal of the first light-emitting control module 109, a second terminal of the seventh transistor M7 serves as the second terminal of the first light-emitting control module 109, and a control terminal of the seventh transistor M7 serves as the control terminal of the first light-emitting control module 109. The second light-emitting control module 1101 includes an eighth transistor M8, a first terminal of the eighth transistor M8 serves as the first terminal of the second light-emitting control module 1101, a second terminal of the eighth transistor M8 serves as the second terminal of the second light-emitting control module 1101, and a control terminal of the eighth transistor M8 serves as the control terminal of the second light-emitting control module 1101. The second initialization module 111 includes a ninth transistor M9, a first terminal of the ninth transistor M9 serves as the first terminal of the second initialization module 111, a second terminal of the ninth transistor M9 serves as the second terminal of the second initialization module 111, and a control terminal of the ninth transistor M9 serves as the control terminal of the second initialization module 111; The second blocking module 116 includes a tenth transistor M10, a first terminal of the tenth transistor M10 serves as the first terminal of the second blocking module 116, a second terminal of the tenth transistor M10 serves as the second terminal of the second blocking module 116, and a control terminal of the tenth transistor M10 serves as the control terminal of the second blocking module 116. The third blocking module 117 includes an eleventh transistor M11, a first terminal of the eleventh transistor M11 serves as the first terminal of the third blocking module 117, a second terminal of the eleventh transistor M11 serves as the second terminal of the third blocking module 117, and a control terminal of the eleventh transistor M11 serves as the control terminal of the third blocking module 117. Each of the first transistor to the eleventh transistor may be a P-type transistor or an N-type transistor. Since the manufacturing process of the P-type transistor in the display panel is mature and low in cost, optionally, the first transistor to the eleventh transistor may be all P-type transistors. The P-type transistor has the characteristics of being turned off when the control terminal is at a high level, and being turned on when the control terminal is at a low level. Of course, in other embodiments, the first transistor to the eleventh transistor may also be N-type transistors. At this time, it is necessary to set each of the scan signal, the enable signal and the power supply signal to a signal of opposite polarity to that when the first transistor to the eleventh transistor are P-type transistors.

The operation principle of the pixel driving circuit according to the embodiments of the present application will be described below in conjunction with FIGS. 37 and 38.

In t0 stage, the t0 stage is a light-emitting stage of a previous frame signal.

In t1 stage, in this stage, a rising edge of the enable signal input from the enable signal input terminal EM comes, the first light-emitting control module 109 and the second light-emitting control module 1101 are turned off, the light-emitting module 102 stops emitting light, thereby turning on the display of the present frame.

In t2 stage, a falling edge of the long scan signal arrives in this stage, and the threshold compensation module 104 is turned on to facilitate the subsequent initialization and charging. The threshold compensation module 104 is set to be turned on before the initialization stage, the initialization time can be maximized, and the initialization effect can be ensured.

In t3 stage, this stage is an initialization stage, that is, the long scan signal and the first scan signal are both low levels in the t3 stage. The threshold compensation module 104 and the first initialization module 106 are both turned on. The initialization signal is written into the control terminal of the drive module 101 to initialize the drive module 101 and ensure that the drive module 101 is turned on in the charging stage.

In t4 stage, this stage is a charging stage. In the stage t4, the first scan signal input from the first scan signal input terminal S1 becomes a high level, the first initialization module 106 is turned off, and the second scan signal input from the second scan signal input terminal S2 is at a low level. At this time, the data write module 103 and the first blocking module 108 are turned on. Since the long scan signal is still at a low level, the threshold compensation module 104 continues to be turned on. The data signal input from the data signal input terminal Data is written into the control terminal of the drive module 101 after passing through the drive module 101, the first blocking module 108 and the threshold compensation module 104, so that the potential of the control terminal of the drive module 101 is changed. When the potential of the control terminal of the drive module 101 is changed to a condition that a potential difference between the potential of the control terminal of the drive module 101 and the potential of the first terminal of the drive module 101 is the threshold voltage of the drive module 101, the drive module 101 is turned off, and the data signal stops being written. At this time, the potential of the control terminal of the drive module 101 is related to the threshold voltage of the drive module 101 and is stored in the storage module 105.

In t5 stage, in this stage, both the first scan signal and the second scan signal are at high levels, and the enable signal input from the enable signal input terminal EM is also at a high level, and the ready-to-light-emitting stage is entered.

In t6 stage, in this stage, the enable signal becomes a low level, the first light-emitting control module 109 and the second light-emitting control module 1101 are turned on, the light-emitting module 102 starts to emit light, and the drive current does not change with the shift of the threshold voltage of the drive module, so that the light-emitting module has the good light-emitting stability. Due to the holding action of the first holding module 107 at this time, the potential of the electric leakage prevention node N1 is more stable, so that the potential of the control terminal of the drive module 101 is also more stable, that is, the waveform G is more flat, thereby greatly improving the flicker problem.

In t7 stage, in this stage, the black frame insertion stage comes, the enable signal in this stage becomes a high level, the first light-emitting control module 109 and the second light-emitting control module 1101 are controlled to be turned off, thereby controlling the light-emitting module 102 to stop emitting light, further reducing the light-emitting time of the light-emitting module 102, and extending the service life of the light-emitting module 102.

In t8 stage, this stage is a reset stage of the light-emitting module, at this stage, the first scan signal and the second scan signal come in succession, thereby resetting the light-emitting module. However, in this stage, the long scan signal is at a high level, that is, the turn-off signal, and the second blocking module 116 and the third blocking module 117 are both turned off. The initialization signal is blocked by the third blocking module 117 between the third blocking module 117 and the first initialization module 106, and the data signal is blocked between the second blocking module 116 and the first blocking module 108, so that the potential of the electric leakage prevention node N1 and the potential of the control terminal of the drive module are not changed, and the electric leakage prevention node N1 and the control terminal of the drive module 101 maintain a low voltage difference and a low electric leakage level, whereby the potential of the control terminal of the drive module is relatively stable.

In t9 stage, after both the first scan signal and the second scan signal are pulled high, the enable signal is set to be low, the black frame insertion stage ends, and the light-emitting module is lit up, so that the current holding rate of the drive module is high.

Anode is a waveform diagram of the signal on the anode of the light-emitting module 102. It can be seen from the timing diagram in FIG. 38 that the current of the anode (Anode) flowing through the light-emitting module 102 does not rapidly drop to 0 after the enable signal in the black frame insertion stage is set to be high, and the current of the Anode is 0 after the low level of the second scan signal arrives. Only when the light-emitting module is reset when the enable signal is in the black frame insertion, the low-frequency brightness component can be completely converted into the high-frequency brightness component, thereby achieving the effect of flicker reduction.

The first blocking module 108 in this embodiment may also be a first double-gate transistor, and the corresponding pixel driving circuit may further include a third holding module, the third holding module may be configured to hold the potential of the double-gate node of the first double-gate transistor. The first initialization module 106 is a second double-gate transistor, the pixel driving circuit further includes a fourth holding module, and the fourth holding module is configured to hold the potential of the double-gate node of the second double-gate transistor. The pixel driving circuit further includes a coupling module configured to hold a potential of a control terminal of the drive module 101, a first terminal of the coupling module is electrically connected to the control terminal of the drive module 101, and a second terminal of the coupling module is electrically connected to the control terminal of the threshold compensation module 104. The third holding module may include a third capacitor, a first terminal of the third capacitor is electrically connected to the double-gate node of the first double-gate transistor, and the second terminal of the third capacitor may be configured to receive one fixed signal, for example, may be electrically connected to the initialization signal input terminal or may be electrically connected to the first power supply signal input terminal, thereby reducing a number of signal lines in the pixel driving circuit and facilitating the implementation of the narrow frame of the display panel. The fourth holding module may include a fourth capacitor, the first terminal of the fourth capacitor is electrically connected to the double-gate node of the second double-gate transistor, and the second terminal of the fourth capacitor may be configured to receive one fixed signal, for example, may be electrically connected to the initialization signal input terminal or may be electrically connected to the first power supply signal input terminal, thereby reducing the number of signal lines in the pixel driving circuit and facilitating the implementation of the narrow frame of the display panel. The coupling module may include a fifth capacitor, a first terminal of the fifth capacitor serves as the first terminal of the coupling module, and a second terminal of the fifth capacitor serves as the second terminal of the coupling module. The connection relationship and function of the third holding module, the fourth holding module and the coupling module are the same as those of the above-described embodiments, and will not be described here in detail.

Optionally, at least one of the first blocking module 108, the first initialization module 106, and the third blocking module 117 in this embodiment may be a thin film transistor (TFT).

Figure 39:
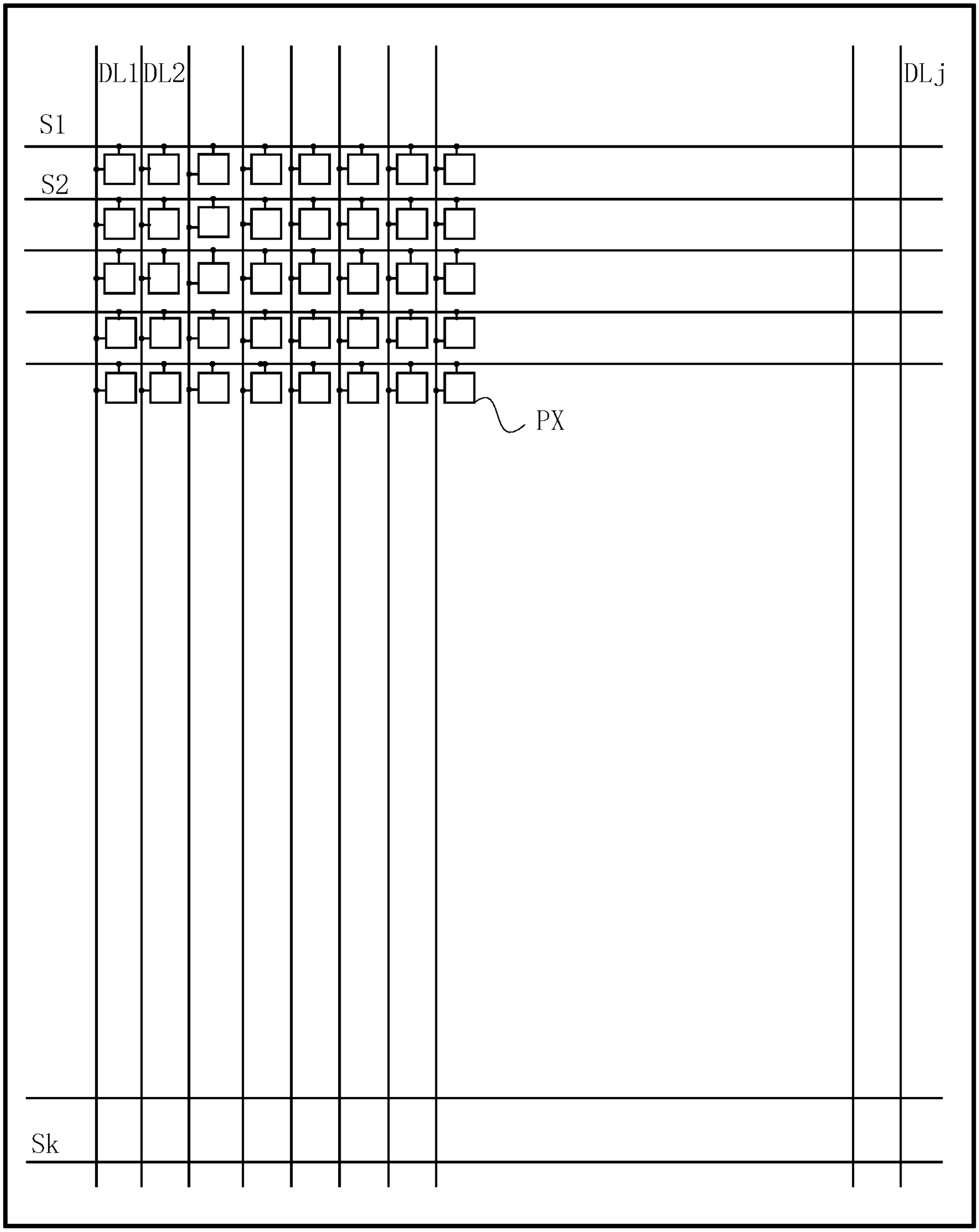
FIG. 39 is a schematic structural diagram of a display panel according to another embodiment of the present application.

This embodiment provides a display panel. FIG. 39 is a schematic structural diagram of a display panel according to another embodiment of the present application. Referring to FIG. 39, the display panel includes multiple pixel driving circuits PX of any of the embodiments of the present application. The display panel may include multiple interleaved scan lines (S1~Sk) and data lines (DL1~DLj), the pixel driving circuit is located in a region defined by the scan lines and the data lines, and the scan lines may include, for example, a first scan line and a second scan line, the first scan line and the second scan line are electrically connected to a first scan signal input terminal and a second scan signal input terminal of the pixel driving circuit, respectively, to provide a scan signal to the pixel driving circuit PX.

Figure 40:
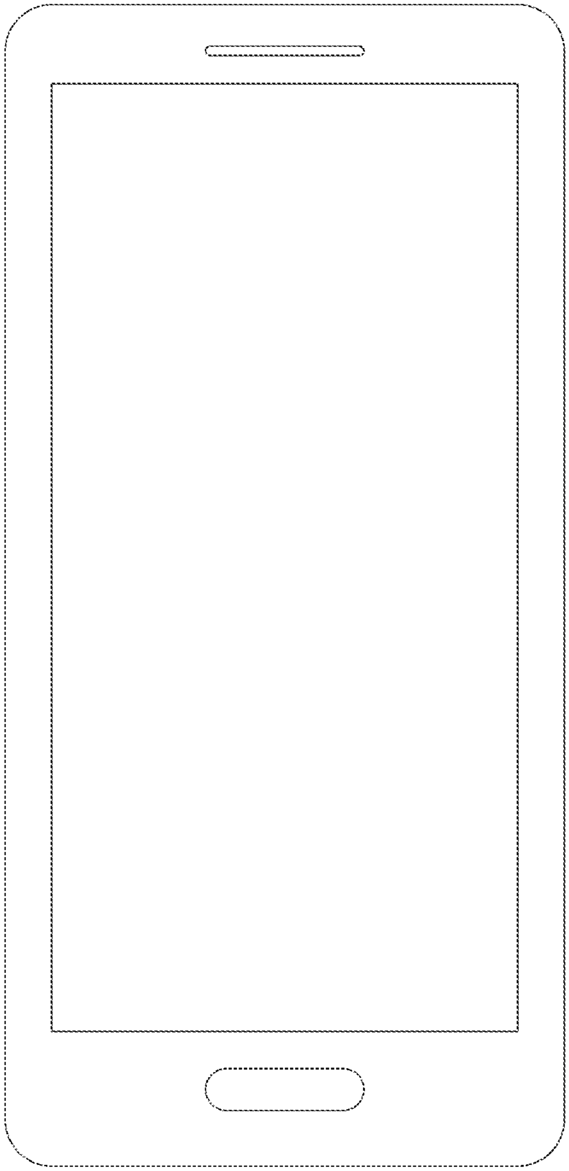
FIG. 40 is a schematic structural diagram of a display device according to another embodiment of the present application.

FIG. 40 is a schematic structural diagram of a display device according to another embodiment of the present application. Referring to FIG. 40, the display device includes the display panel of the embodiments of the present application. The display device may be a mobile phone, a tablet, a display, a smart watch, MP3, MP4, or other wearable apparatuses.

What is claimed is:

1. A pixel circuit comprising:

a drive module;

a data write module, wherein the data write module is configured to, in a data write and threshold compensation stage, write a voltage related to a data voltage to a control terminal of the drive module;

a first compensation module, wherein a second terminal of the first compensation module is connected to a first terminal of the drive module and the first compensation module is configured to, in the data write and threshold compensation stage, perform a threshold compensation on the drive module;

a second compensation module, wherein a first terminal of the second compensation module is connected to the control terminal of the drive module and a second terminal of the second compensation module is connected to a first terminal of the first compensation module;

a light-emitting module, a storage module, wherein the storage module is configured to store the voltage of the control terminal of the drive module; and a coupling module, wherein the coupling module is configured to, in a compensation adjustment stage, couple a jump voltage or a fixed voltage to at least one of the second terminal of the second compensation module or an internal node of the second compensation module and the drive module is configured to provide a drive signal to the light-emitting module according to the voltage of the control terminal to drive the light-emitting module to emit light.

2. The pixel circuit of claim 1, wherein the jump voltage is a pulse voltage, the first compensation module comprises a first transistor, the second compensation module comprises a second transistor, the storage module comprises a first capacitor, the coupling module comprises a second capacitor, a gate of the first transistor is connected to a first scan line, a first electrode of the first transistor is connected to the first terminal of the drive module, a second electrode of the first transistor is connected to a second electrode of the second transistor, a first electrode of the second transistor is connected to the control terminal of the drive module, a gate of the second transistor is connected to a second scan line, a first electrode of the first capacitor is connected to the fixed voltage, a second electrode of the first capacitor is connected to the control terminal of the drive module, a first electrode of the second capacitor is configured to receive the pulse voltage, and a second electrode of the second capacitor is connected to the second electrode of the second transistor.

3. The pixel circuit of claim 1, wherein the jump voltage is a pulse voltage, the first compensation module comprises a first transistor, the second compensation module comprises a second transistor, the storage module comprises a first capacitor, and the coupling module comprises a second capacitor; and wherein a gate of the first transistor is connected to a second scan line, a first electrode of the first transistor is connected to the first terminal of the drive module, a second electrode of the first transistor is connected to a second electrode of the second transistor, a first electrode of the second transistor is connected to the control terminal of the drive module, a gate of the second transistor is connected to the second scan line, a first electrode of the first capacitor is connected to the fixed voltage, a second electrode of the first capacitor is connected to the control terminal of the drive module, a first electrode of the second capacitor is configured to receive the pulse voltage, and a second electrode of the second capacitor is connected to the second electrode of the second transistor.

4. The pixel circuit of claim 3, wherein the first compensation module comprises the first transistor, the second compensation module comprises the second transistor, the first transistor comprises a double-gate transistor, and the first transistor comprises a first sub-transistor and a second sub-transistor; and wherein a gate of the first sub-transistor and a gate of the second sub-transistor are short-circuited, and the gate of the first sub-transistor and the gate of the second sub-transistor are connected to a same scan line.

5. The pixel circuit of claim 1, wherein the first compensation module comprises a first transistor, the second compensation module comprises a second transistor, the second transistor comprises a double-gate transistor, the second transistor comprises a first sub-transistor and a second sub-transistor, a first electrode of the first transistor is connected to the first terminal of the drive module, a second electrode of the first transistor is connected to a second electrode of the second sub-transistor, a first electrode of the second sub-transistor is connected to a second electrode of the first sub-transistor, a first electrode of the first sub-transistor is connected to the control terminal of the drive module, a gate of the first transistor is connected to a first scan line, a gate of the second transistor is connected to a second scan line, and the coupling module is configured to couple the jump voltage to the second electrode of the first sub-transistor or the second electrode of the second sub-transistor.

6. The pixel circuit of claim 5, wherein the jump voltage is a pulse voltage, the storage module comprises a first capacitor, the coupling module comprises a second capacitor, a first electrode of the first capacitor is connected to the fixed voltage, a second electrode of the first capacitor is connected to the control terminal of the drive module, a first electrode of the second capacitor is connected to the pulse voltage, a second electrode of the second capacitor is connected to the second electrode of the first sub-transistor, a first electrode of a third capacitor is configured to receive the pulse voltage or the fixed voltage, and a second electrode of the third capacitor is connected to the second electrode of the second sub-transistor.

7. The pixel circuit of claim 1, wherein the second compensation module comprises a second transistor, a gate of the second transistor is connected to a second scan line, and a pulse of the pulse voltage is followed by a pulse on a signal transmitted by the second scan line.

8. The pixel circuit of claim 1, wherein the jump voltage is a pulse voltage, and either the pulse voltage is jumped from a high level to a low level in a case where the second compensation module is turned off and is jumped from the low level to the high level before the light-emitting module is configured to emit light; or the pulse voltage is jumped from the low level to the high level in the case where the second compensation module is turned off and is jumped from the high level to the low level before the light-emitting module is configured to emit light.

9. The pixel circuit of claim 2, wherein the first compensation module further comprises a third transistor, a gate of the third transistor is connected to the second scan line, a first electrode of the third transistor connected to the second electrode of the first transistor, and a second electrode of the third transistor is connected to a second electrode of the second transistor.

10. The pixel circuit of claim 1, wherein the second compensation module comprises a second transistor, the pixel circuit further comprises a first initialization module and a second initialization module, the first initialization module comprises a fourth transistor, the second initialization module comprises a fifth transistor, a gate of the fourth transistor is connected to a third scan line, a first electrode of the fourth transistor is connected to an initialization signal line, a second electrode of the fourth transistor is connected to a second electrode of the second transistor, a gate of the fifth transistor is connected to a fourth scan line, a first electrode of the fifth transistor is connected to the initialization signal line, and a second electrode of the fifth transistor is connected to a first terminal of the light-emitting module.

11. The pixel circuit of claim 10, wherein a gate of the second transistor is connected to a second scan line, the first initialization module further comprises a sixth transistor, a gate of the sixth transistor is connected to the second scan line, a first electrode of the sixth transistor is connected to the second electrode of the fourth transistor, and a second electrode of the sixth transistor is connected to the second electrode of the second transistor.

12. The pixel circuit of claim 1, wherein the second compensation module comprises a second transistor, a gate of the second transistor is connected to a second scan line, the pixel circuit further comprises a seventh transistor, the data write module comprises an eighth transistor, a gate of the seventh transistor is connected to the second scan line, a first electrode of the seventh transistor is connected to a second electrode of the eighth transistor, and a gate of the eighth transistor is connected to the first scan line.

13. The pixel circuit of claim 12, wherein a second electrode of the seventh transistor is connected to a second terminal of the drive module, and a first electrode of the eighth transistor is connected to a data line.

14. The pixel circuit of claim 10, further comprising a first light-emitting control module and a second light-emitting control module, wherein the drive module comprises a ninth transistor, the first light-emitting control module comprises a tenth transistor, and the second light-emitting control module comprises an eleventh transistor; and wherein a first electrode of the tenth transistor is connected to a first power supply line, a second electrode of the tenth transistor is connected to a first electrode of the ninth transistor, a second electrode of the ninth transistor is connected to the first terminal of the light-emitting module through the eleventh transistor, a second terminal of the light-emitting module is connected to a second power supply line, and a gate of the tenth transistor and a gate of the eleventh transistor each are connected to a light-emitting control signal line.

15. The pixel circuit of claim 14, wherein the first scan line, the second scan line, the third scan line, the fourth scan line and the light-emitting control signal line are configured to transmit a scan signal to satisfy:

in an initialization stage, the first initialization module and the second initialization module are turned on;

in a data write and threshold compensation stage, the first compensation module, the second compensation module and the data write module are turned on;

in a compensation adjustment stage, the first compensation module and the second compensation module are turned off; and in a light-emitting stage, the first light-emitting control module and the second light-emitting control module are turned on.

16. The pixel circuit of claim 1, wherein, the first compensation module comprises a first transistor, the second compensation module comprises a second transistor, the second transistor comprises a double-gate transistor, the double-gate transistor comprises a first sub-transistor and a second sub-transistor, a first electrode of the first transistor is connected to the first terminal of the drive module, a second electrode of the first transistor is connected to a second electrode of the second sub-transistor, a first electrode of the second sub-transistor is connected to a second electrode of the first sub-transistor, a first electrode of the first sub-transistor is connected to the control terminal of the drive module, a gate of the first transistor is connected to a first scan line, a gate of the second transistor is connected to a second scan line, the coupling module comprises a third capacitor, a first electrode of the third capacitor is connected to the jump voltage or the fixed voltage, and a second electrode of the third capacitor is connected to the second electrode of the second sub-transistor.

17. The pixel circuit of claim 16, wherein, the coupling module further comprises a second capacitor, a first electrode of the second capacitor is configured to receive the jump voltage, a second electrode of the second capacitor is connected to the second electrode of the first sub-transistor, the first compensation module further comprises a third transistor, a gate of the third transistor is connected to the second scan line, a first electrode of the third transistor is connected to the second electrode of the first transistor, and a second electrode of the third transistor is connected to a second electrode of the second transistor; and in a case where the first electrode of the third capacitor is configured to receive the fixed voltage, the fixed voltage is a first power supply voltage on a first power supply line or an initialization voltage on an initialization signal line; and in a case where the first electrode of the third capacitor is configured to receive the jump voltage, the jump voltage is a pulse voltage.

18. A driving method for a pixel circuit, wherein the pixel circuit comprises:

a drive module, a data write module connected to the drive module, a first compensation module, wherein a second terminal of the first compensation module is connected to a first terminal of the drive module, a second compensation module, wherein a first terminal of the second compensation module is connected to a control terminal of the drive module, a second terminal of the second compensation module is connected to a first terminal of the first compensation module, a light-emitting module, a storage module connected to the control terminal of the drive module, and a coupling module, wherein a first terminal of the coupling module is configured to receive a jump voltage and a second terminal of the coupling module is connected to the second terminal of the second compensation module or an internal node of the second compensation module, and the driving method for the pixel circuit comprises:

in a data write and threshold compensation stage, controlling the data write module to write a voltage related to a data voltage to a control terminal of the drive module, and controlling the first compensation module to perform a threshold compensation on the drive module; and in a compensation adjustment stage, controlling the coupling module to couple the jump voltage or a fixed voltage to at least one of the second terminal of the second compensation module or the internal node of the second compensation module.

19. The driving method for the pixel circuit of claim 18, wherein a control terminal of the data write module is connected to a first scan line, a control terminal of the first compensation module is connected to the first scan line or a second scan line, a control terminal of the second compensation module is connected to the second scan line, the pixel circuit further comprises a first initialization module, a second initialization module, a first light-emitting control module and a second light-emitting control module, a control terminal of the first initialization module is connected to a third scan line, a first terminal of the first initialization module is connected to an initialization signal line, a second terminal of the first initialization module is connected to the second terminal of the second compensation module, a control terminal of the second initialization module is connected to a fourth scan line, a first terminal of the second initialization module is connected to the initialization signal line, a second terminal of the second initialization module is connected to a first terminal of the light-emitting module, a control terminal of the first light-emitting control module and a control terminal of the second light-emitting control module are connected to a light-emitting control signal line, a first terminal of the first light-emitting control module is connected to a first power supply line, a second terminal of the first light-emitting control module is connected to a second terminal of the drive module, a first terminal of the second light-emitting control module is connected to the first terminal of the drive module, a second terminal of the second light-emitting control module is connected to the first terminal of the light-emitting module, a second terminal of the light-emitting module is connected to a second power supply line, and the driving method for the pixel circuit further comprises:

in an initialization stage, controlling, by a third scan signal output from the third scan line, the first initialization module to be turned on, and controlling, by a fourth scan signal output from the fourth scan line, the second initialization module to be turned on;

in the data write and threshold compensation stage, controlling, by a first scan signal output by the first scan line, the data write module to be turned on, controlling, by the first scan signal output by the first scan line or a second scan signal output by the second scan line, the first compensation module to be turned on, and controlling, by the second scan signal output by the second scan line, the second compensation module to be turned on;

in the compensation adjustment stage, controlling, by the first scan signal output by the first scan line or the second scan signal output by the second scan line, the first compensation module to be turned off, controlling, by the second scan signal output by the second scan line, the second compensation module to be turned off, and coupling, by the coupling module, the jump voltage to at least one of the second terminal of the second compensation module or the internal node of the second compensation module; and in the light-emitting stage, controlling, by a light-emitting control signal output by the light-emitting control signal line, the first light-emitting control module and the second light-emitting control module to be turned on.

20. A display panel, comprising the pixel circuit of claim 1.

* * * * *